(12) United States Patent
Maeda

(10) Patent No.: US 6,512,793 B1
(45) Date of Patent: Jan. 28, 2003

(54) DATA PROCESSING APPARATUS AND METHOD

(75) Inventor: Mitsuru Maeda, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/298,951

(22) Filed: Apr. 26, 1999

(30) Foreign Application Priority Data

| Apr. 28, 1998 | (JP) | ............................................ 10-118737 |
| Nov. 16, 1998 | (JP) | ............................................ 10-325635 |
| Nov. 16, 1998 | (JP) | ............................................ 10-325636 |

(51) Int. Cl.$^7$ .............................................. H04N 7/26
(52) U.S. Cl. ............. 375/240.08; 348/585; 375/240.25; 382/243
(58) Field of Search ........................ 375/240.08, 240.25; 382/243; 348/585, 590; H04N 7/26

(56) References Cited

U.S. PATENT DOCUMENTS

| 4,974,071 A |   | 11/1990 | Maeda .......................... 358/80 |
| 5,359,438 A |   | 10/1994 | Maeda .......................... 358/109 |
| 5,371,606 A |   | 12/1994 | Katayama et al. ........... 358/400 |
| 5,521,717 A |   | 5/1996  | Maeda .......................... 358/426 |
| 5,737,011 A | * | 4/1998  | Lukacs ......................... 348/585 |
| 5,933,249 A |   | 8/1999  | Shimura et al. ............. 358/429 |

OTHER PUBLICATIONS

ISO/IEC JTC1/SC29/WG11: "Information Technology—Coding of audio–visual objects: Visual ISO/IEC 14496–2 Committee Draft", ISO/IEC JTC1/SC29/2G11 N2202 (Mar. 1998), pp. i–v and 328–331.

Yun L C et al: "Architectures for Multi–Source Multi–User Video Compositing" ACM Multimedia, Proceedings of the International Conference (Aug. 1, 1993), pp. 215–223.

Koenen R et al: "MPEG–4: Context and Objectives", Signal Processing. Image Communication, NL, Elsevier Science Publishers, Amsterdam, vol. 9, No. 4, (May 1, 1997), pp. 295–304.

Mon–Song Chen et al: "Multiparty Talks", Image Processing, GB, European Technology Publishing, London, vol. 5, No. 3, 1993, pp. 23–25.

Loui A et al: "Video Combining for Multipoint Videoconferencing", Proceedings of IS&T Annual Conference (May 7, 1995), pp. 48–50.

Shih–Fu Chang et al.: "Manipulation and Composing of MC–DCT Compressed Video", IEEE Journal on Selected Areas in Communications, US, IEEE Inc., New York, vol. 13, No. 1, 1995, p. 1–11.

Mitsuru Maeda and Tadashi Yoshida; "Adaptive Coding with Binary Image Segmentation"; The 1996 Institute of Electronics, Information and Communication Engineers General Conference D–292.

Minoru Etoh; "Current Status and Future Activities of MPEG4"; The Journal of the Institute of Image Electronics Engineers of Japan; vol. 25, No. 3, 1996, pp. 223–228.

* cited by examiner

*Primary Examiner*—Howard Britton
(74) *Attorney, Agent, or Firm*—Fitzpatrick, Cella, Harper & Scinto

(57) ABSTRACT

In decoding code data encoded in object units, decoders corresponding to the number of objects are needed. However, it is impossible to always provide a sufficient number of decoder. Accordingly, when code data 8 is decoded, an object combiner 43 refers to the number s of objects included in the code data 8, detected by an object counter 41, and the number d of object decoders, detected by an object decoder counter 42. If s>d holds, the object combiner 43 regulates the number of the objects of the input code data 8 to d.

42 Claims, 55 Drawing Sheets

FIG. 2
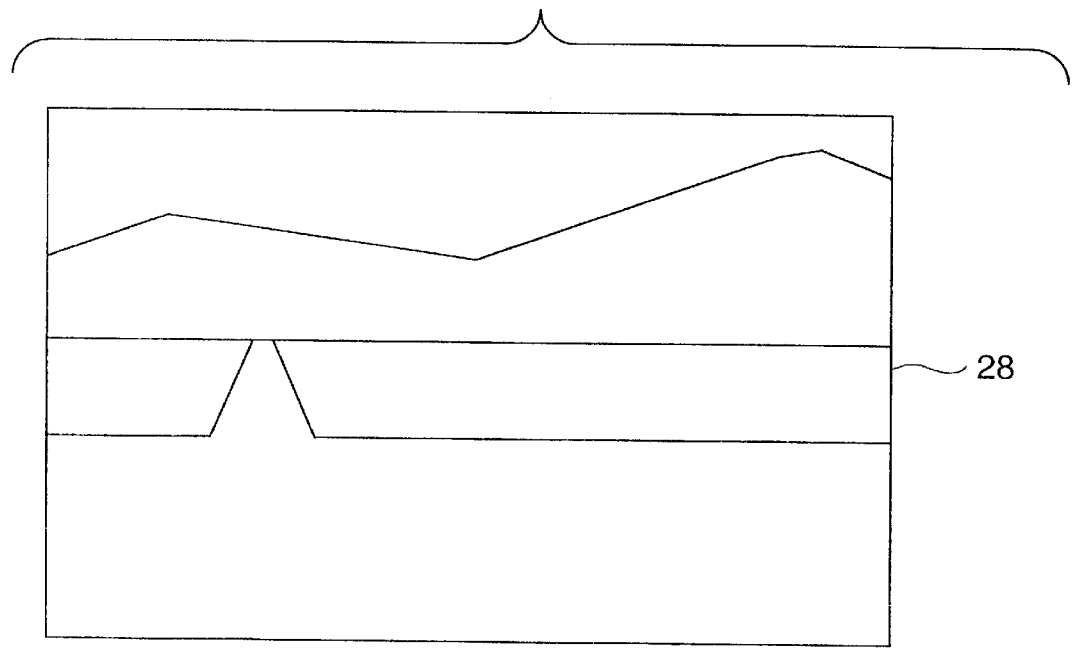
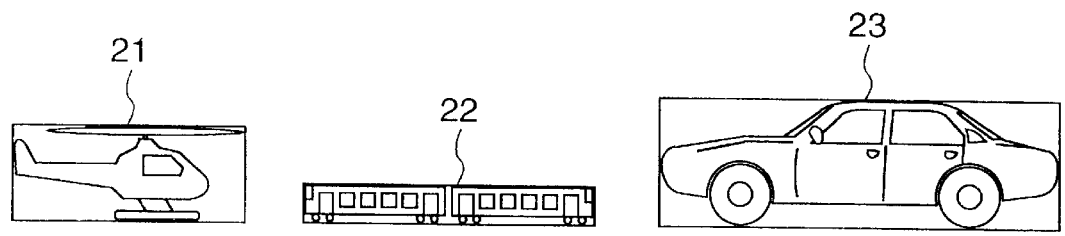
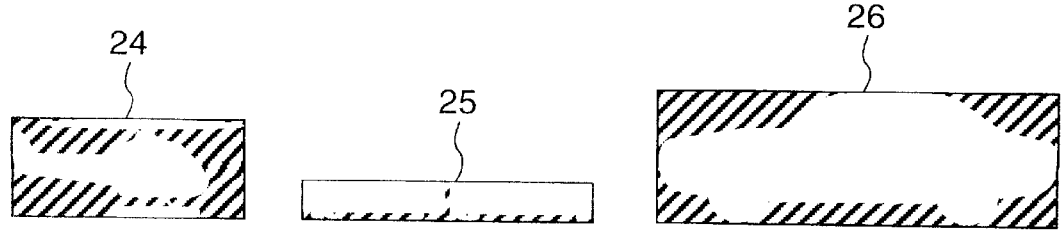

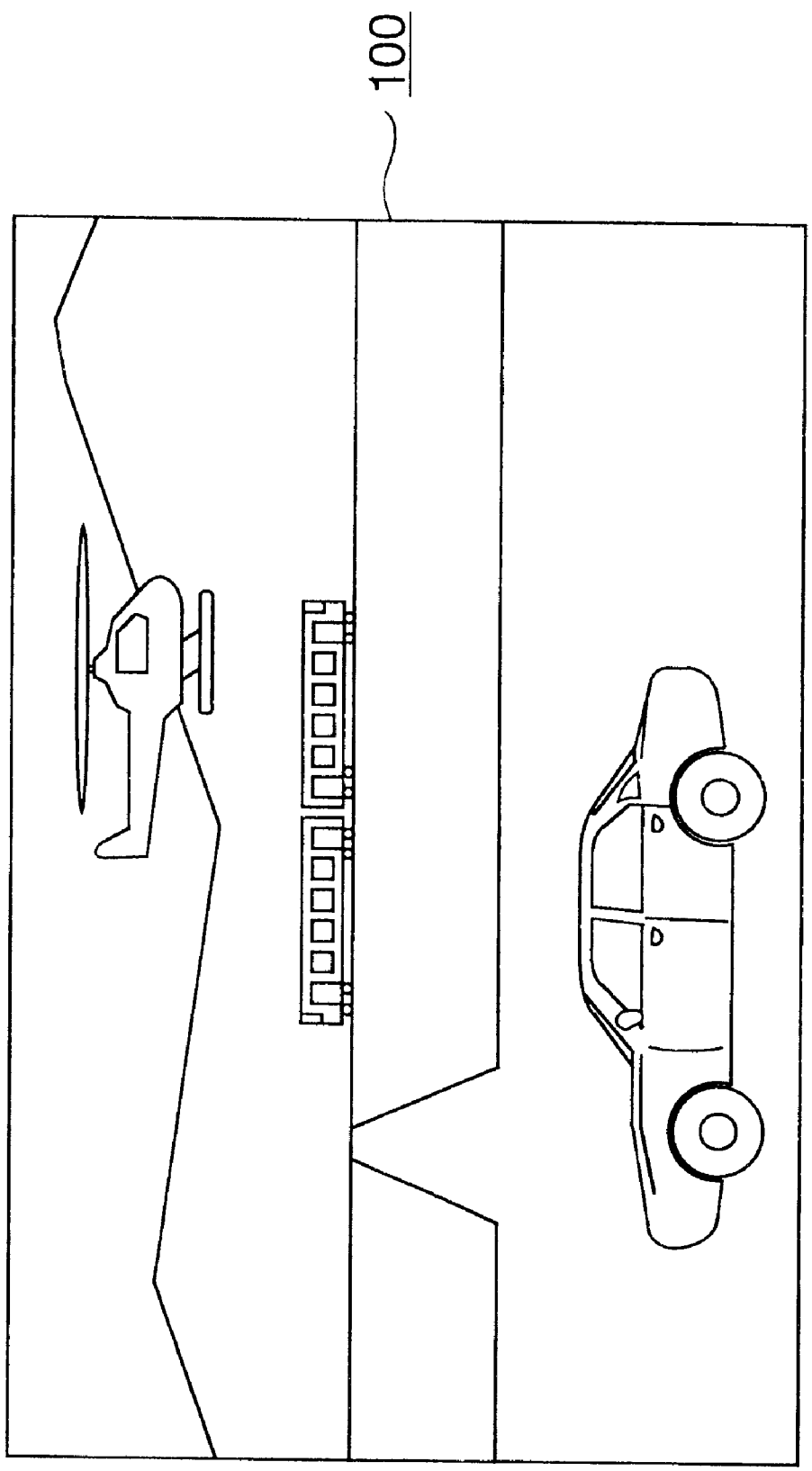

FIG. 28

| PROFILE | LEVEL | MAXIMUM NUMBER OF OBJECTS | MAXIMUM BIT RATE (KBPS) |
|---|---|---|---|
| SIMPLE | 1 | 4 | 64 |
| | 2 | 4 | 128 |
| | 3 | 4 | 384 |
| CORE | 1 | 4 | 384 |
| | 2 | 8 | 2000 |
| MAIN | 2 | 8 | 2000 |
| | 3 | 16 | 15000 |

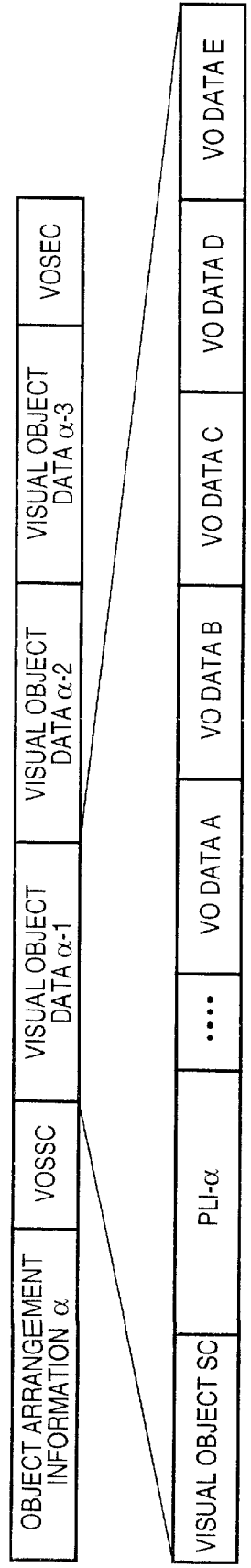
F I G. 31A
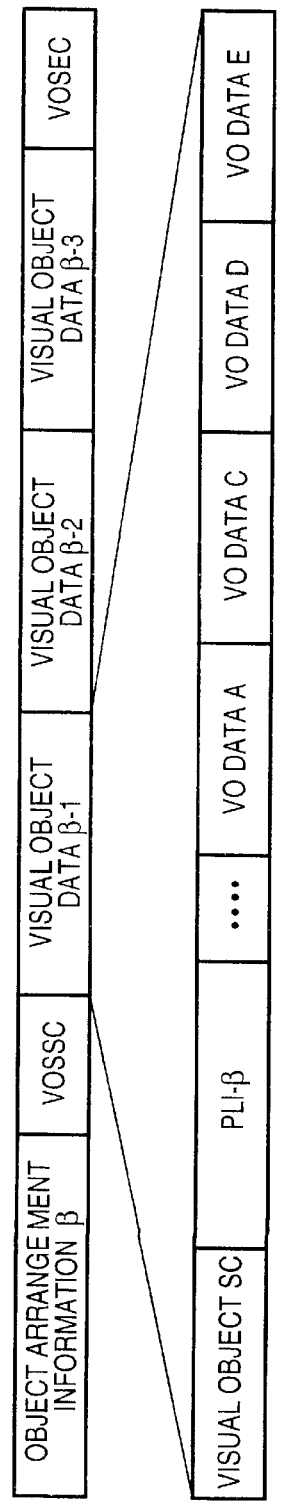
F I G. 31B

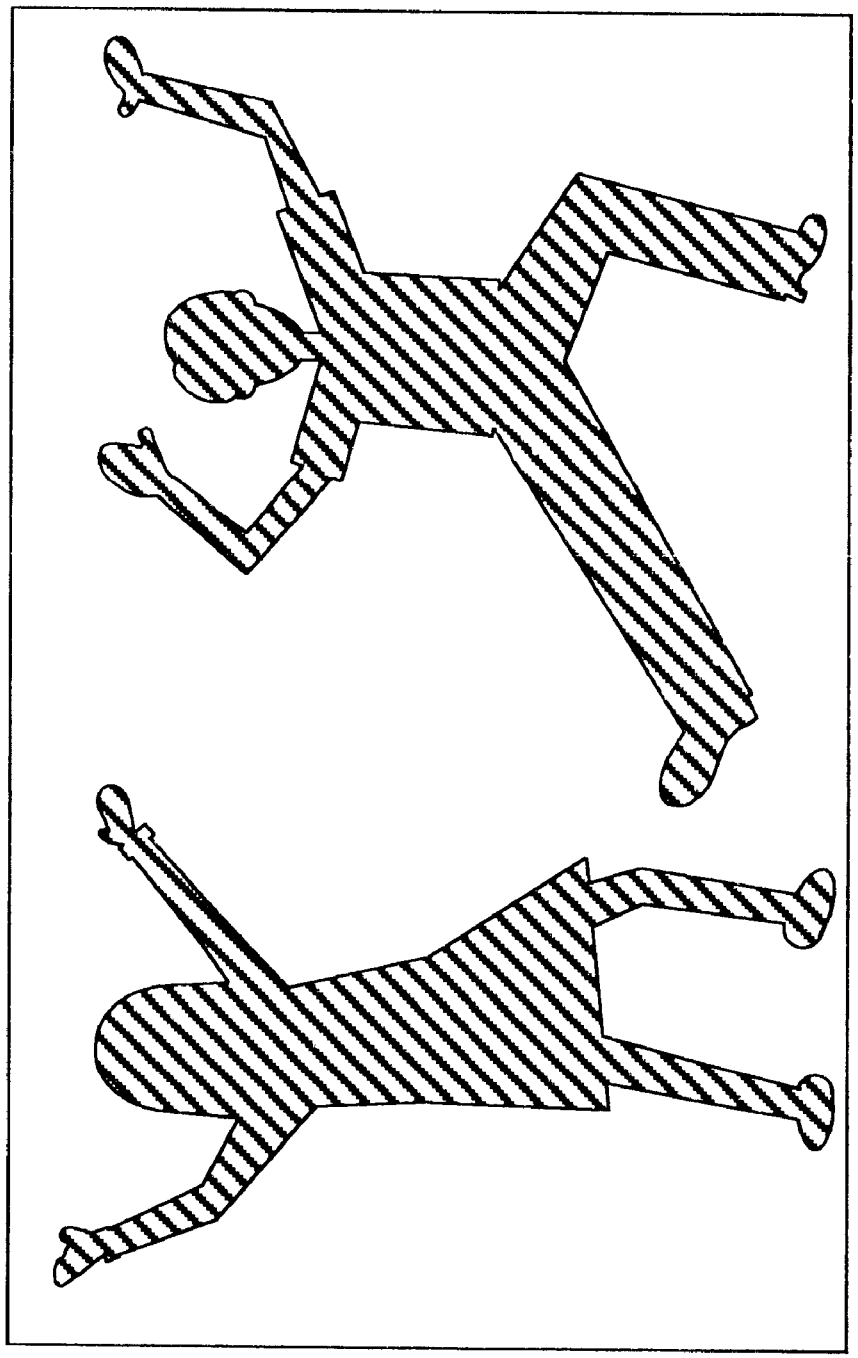
F I G. 37

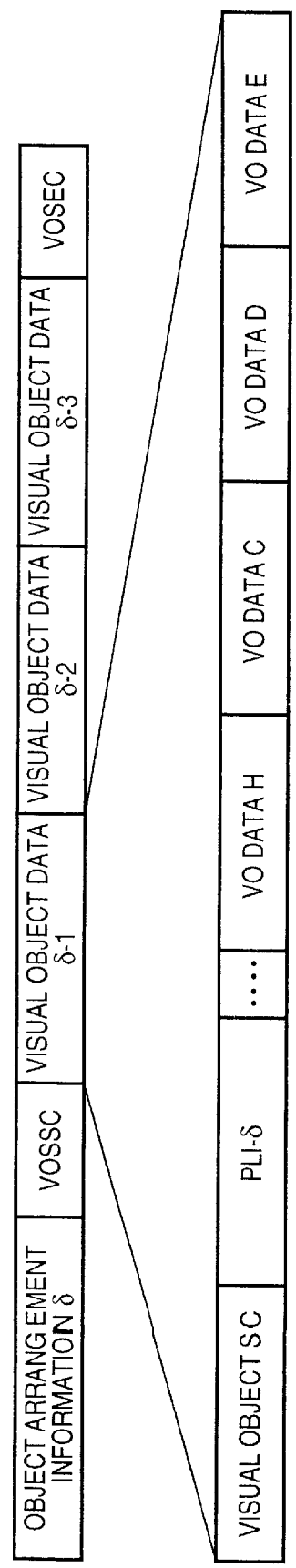
F I G. 42

2300

2304  2305

2301

2306  2307

2302

2303

2308  2309

DATA PROCESSING APPARATUS AND METHOD

BACKGROUND OF THE INVENTION

1. Field of the Invention

The present invention relates to decoding apparatus and method and, more particularly, to data processing apparatus and method which decode code encoded in image object units.

Further, the present invention relates to data processing apparatus and method which process a data array constructing an image with a plurality of coded image objects.

2. Description of Related Art

In recent years, with advancement in image encoding techniques and progress of computer capabilities, an encoding method to separate an image into objects and encode by each object has been proposed. The image encoding in object units enables optimum encoding by each object, thus improving the coding efficiency. At the same time, a function to generate a new image by editing the objects within the image can be obtained. For example, in the technology of still image, a method to separate an image into "character", "line", "frame", "image", "table" and "background", and perform optimum encoding on the respective areas, such as the ACBIS method (by Maeda, and Yoshida in "The 1996 Institute of Electronics, Information and Communication Engineers General Conference D-292") has been proposed. According to this method, the JBIG (Joint Bi-level Image Group) encoding as a binary-image encoding method is performed on the "character", "line", "frame" and "table" areas, and in the "background" area, its representative value is encoded.

Further, in a moving image, a method to perform encoding in object units has been studied as an international standard method, MPEG4 (Moving Picture Experts Group phase 4) (Eto, "MPEG4 Standardization" (The Journal of The Institute of Image Electronics Engineers of Japan, vol. 25, No. 3, 1996, pp. 223–228). FIG. 1 shows an example of a frame of a moving image to be encoded by the MPEG4 coding. In FIG. 1, a frame 20 comprises four objects as shown in FIG. 2, i.e., a background object 28, an object 21 representing a helicopter, an object 22 representing a train, and an object 23 representing a car. To indicate the shapes of the objects except the background, each object is masked such that a black part of a rectangular area surrounding the object is an "outer area", and a white part is an "inner area" (24 to 26 in FIG. 2), and by this masking, an arbitrary shaped object can be handled.

FIG. 3 shows a construction for coding in object units. An input image 1 is inputted into an object segmenter 2, and is separated into respective objects. For example, the image in FIG. 1 is separated by the object segmenter 2 into the objects 28, 21, 22 and 23, and the objects are independently encoded. That is, an object encoder 3 encodes the object 28; an object encoder 4, the object 21; an object encoder 5, the object 22; and an object encoder 6, the object 23. A multiplexer 7 multiplexes code data outputted from the object encoders 3 to 6, and outputs the multiplexed data as code data 8.

FIG. 4 shows a construction for decoding an image encoded in object units. The code data 8 is inputted into a demultiplexer 9, and separated into code data corresponding to the respective objects. The separated code data are independently decoded. That is, an object decoder 10 decodes the object 28; an object decoder 11, the object 21; an object decoder 12, the object 22; and an object decoder 13, the object 23. An object compositer 14 arranges image data outputted from the object decoders 10 to 13 in proper positions for the respective objects, thus composes them as one image, and outputs the image data as a reproduced image 15.

In moving image coding represented by the MPEG2 (Moving Picture Experts Group phase 2) standard, coding is made in frame or field units. To realize reuse or editing of contents (person, building, voice, sound, background and the like) constructing a video image and audio data of a moving image, the MPEG4 standard is characterized by handling video data and audio data as objects. Further, objects included in a video image area independently encoded, and the objects are independently handled.

FIG. 25 shows an example of the structure of object code data. The moving image code data based on the MPEG4 standard has a hierarchical structure, from the point of improvement in coding efficiency and editing operability. As shown in FIG. 25, the head of code data has a visual_object_sequence_start_code (VOSSC in FIG. 25) for identification. Then, code data of respective visual objects follows, and visual_object_sequence_end_code (VOSEC in FIG. 25) indicative of the rear end of the code data is positioned at the end. As well as obtained moving images, computer graphics (CG) data and the like are defined as visual objects.

The visual object data has visual_object_start_code (Visual Object SC in FIG. 25) for identification at its header, then profile_and_level_indication (PLI in FIG. 25) indicative of an encoding level. Then, information on visual objects, is_visual_object_identifier (IVOI in FIG. 25), visual_object_varid (VOVID in FIG. 25), viausl_object_priority (VOPRI in FIG. 25), visual_object_type (VOTYPE in FIG. 25) and the like follow. These data construct header information of the visual object. "VOTYPE" has a value "0001" if the image is a moving image obtained by image pickup. Then, video object (VO) data as a cluster of moving image code data follows.

The VO data is code data indicative of each object. The VO data has video_object_start_code (VOSC in FIG. 25) for identification at its header, further, the VO data has video object layer data (VOL data in FIG. 25) to realize scalability. The VOL data has video_object_layer_start_code (VOLSC in FIG. 25) and video object plane data (VOP data in FIG. 25) corresponding to one frame of moving image. The VOL data has video_object_layer_width (VOL_width in FIG. 25) and video_object_layer_height (VOL_height in FIG. 25) indicative of size, at its header. Also, the VOP data has video_object_plane_width (VOP_width in FIG. 25) and video_object_plane_height (VOP_height in FIG. 25) indicative of size, at its header. Further, the header of the VOL data has bit_rate code indicative of bit rate.

Note that in each layer of the code data structure, data of an arbitrary length which starts with user_data_start_code can be inserted by a user. The user data is distinguished from the code data by recognition of start code VOSC and VOLSC or VOPSC following the user data.

Further, arrangement information, which is information to arrange the respective objects on the decoding side, is called a system code. In the system code, similar to VRML (Virtual Reality Markup Language) as a CG language, information describing arrangement of divided objects, reproduction timing or the like is encoded. The system code describes the relation among the respective objects with conception of nodes. Hereinbelow, the nodes will be specifically described with reference to FIGS. 26 and 27.

FIG. 26 is an example of an image constructed with a plurality of objects. This image comprises a Background object 2000, a Balloon object 2001, a Bird object 2002, a Jet object 2003, a Car object 2004, a Woman object 2005 and a Man object 2006, respectively representing background, a balloon, a bird, an airplane, a car, a woman and a man.

FIG. 27 shows a node tree in the image in FIG. 26. The entire image is represented by a Scene node. The Scene node is connected to the Background object 2000, the Car object 2004, and a People node indicative of people and a Fly node indicative of things flying in the sky. Further, the People node is connected to the Woman object 2005 and the Man object 2006. The Fly node is connected to the Balloon object 2001, the Bird object 2002 and the Jet object 2003. The relation among the objects is described in the data of the system code.

In this manner, according to the MPEG4 standard, by handling objects in a moving image independently, the decoding side can freely arrange various objects. Further, in broadcasting companies, contents producing companies and the like, by generating code data of objects beforehand, a very large number of moving image data can be generated from limited contents.

However, the above-described techniques have the following problems. To decode respective objects independently, decoders corresponding to the number of separated objects are required. However, on the decoding side, it is impossible to prepare an arbitrary number of decoders. Accordingly, the number of independently encoded objects may be larger than the number of prepared decoders. The decoding apparatus as shown in FIG. 5 has three object decoders. A demultiplexer 9 allocates the object decoders to the code data 8 in input order. If the code data 8 includes four objects, the demultiplexer 9 allocates the object 28 to the object decoder 10, the object 21, to the object decoder 11, and the object 22, to the object decoder 12. However, regarding the object 23, as there is no available object decoder, the object 23 is not decoded. Accordingly, in an image obtained by decoding the objects and synthesizing them, the object 23 is omitted, as in a frame 38 in FIG. 6.

That is, in the coding based on the MPEG4 standard, as an unspecified number of objects are handled, the number of decoding means to decode all the objects cannot be determined especially on the decoding side, accordingly, it is very difficult to construct an apparatus or system. For this reason, in the standardized MPEG4 coding, to determine the specifications upon designing of code data and encoder/decoder, the concepts of profile and level are defined and the number of objects and the upper limit value of bit rate are provided as coding specifications. FIG. 28 shows an example of a profile table defining the number of objects and the bit rate upper limits of profiles and levels.

In the MPEG4 standard, a coding tool differs in accordance with profile. Further, as shown in FIG. 28, the amount of code data of handled image is determined stepwisely in accordance with level. Note that the maximum number of objects to be handled and the maximum bit rate value are upper limits in the coding specifications, and all the values are included in the coding specifications as long as they are less than the above maximum values. For example, in a case where a coding tool is available in a Core profile, the number of objects is six, and coding is performed at a bit rate of 300 kbps, the code data and the coding tool correspond to level 2 (Core profile and level 2).

The above-described profile and level are indicated in the PLI in a bit stream of MPEG4 code data as shown in FIG. 25. Accordingly, a decoder which decodes a bit stream of MPEG code data can determine whether or not decoding is possible by referring to the PLI. The decoding is impossible in the following case.

For example, a decoder corresponding to of Core profile and level 1 cannot decode code data of Core profile and level 2 since the maximum bit rate of Core profile and level 2 is 2000 kbps, far higher than 384 kbps as the maximum bit rate of Core profile and level 1.

Further, in an image including four objects, by synthesizing two code data of Simple profile and level 1, two code data of Simple profile and level 2 can be generated. However, as the maximum number of objects of Simple profile and level 2 is 4, code data which cannot belong to any profile or level of the MPEG4 standard is generated. Accordingly, such coded data cannot be decoded.

Further, for example, if a new bit stream is generated by multiplexing two code data of Simple profile, with bit rates 48 kbps and 8 kbps, of two images respectively including two objects, the bit rate of the new bit stream may be over 64 kbps. In this case, the level of the code data must be raised to level 2, and it cannot be decoded by a decoder of Simple profile and level 1.

That is, if the coding specifications (profile and level) of a decoder do not sufficiently cover the coding specifications (profile and level) of code data, the decoder cannot decode the code data.

This problem becomes especially outstanding upon synthesizing a plurality of images. For example, when a plurality of code data, respectively decodable by a decoder are synthesized, occasionally the decoder cannot decode the synthesized code data. Further, if the synthesized code data does not correspond to any of MPEG4 Profiles and levels, it cannot be decoded by a decoder based on the MPEG4 standard.

SUMMARY OF THE INVENTION

The present invention has been made to solve the above-described problems, and has its object to provide data processing apparatus and method which decode all the image objects even if the number of decoders is limited.

According to the present invention, the foregoing object is attained by providing a data processing apparatus having decoding means for decoding code encoded in image object units, said apparatus comprising: detection means for detecting the number of objects included in input code and the number of objects decodable by said decoding means; and control means for controlling the number of objects of the input code, based on the number of objects and the number of decodable objects detected by said detection means.

Further, another object of the present invention is to provide data processing apparatus and method which decode coded still image and/or moving image without degrading the image quality even if the number of decoders is limited.

According to the present invention, to attain the foregoing object, the above-described apparatus further comprises: extraction means for extracting location information of the objects included in said code; and combining means for combining code of a plurality of objects, based on an instruction from said control means and the location information extracted by said extraction means.

Further, to attain the foregoing object, the above-described apparatus further comprises: extraction means for extracting motion information indicative of motions of the objects included in said code; and combining means for combining a plurality of objects based on an instruction from said control means and the motion information extracted by said extraction means.

Further, another object of the present invention is to provide data processing apparatus and method which decode code data, encoded by each of plural image objects, with decoders of arbitrary coding specifications.

Further, another object of the present invention is to provide data processing apparatus and method which control the number of objects included in code data.

According to the present invention, the foregoing objects are attained by providing a data processing apparatus for processing a data array to reproduce an image with a plurality of coded image objects, said apparatus comprising: detection means for detecting the number of image objects included in said data array; and control means for controlling the number of image objects included in said data array based on the number of image objects detected by said detection means.

Further, another object of the present invention is to provide data processing apparatus and method which synthesize a plurality of code data, encoded by each of plural image objects, to obtain one code data based on a predetermined coding standard.

According to the present invention, the foregoing object is attained by providing a data processing apparatus comprising: input means for inputting a plurality of image data to construct one frame, wherein said image data respectively including N image objects, where $N \geq 1$ holds; and generation means for generating image data having M image objects, where $M \geq 1$ holds, constructing said one frame, by integrating at least a part of said N image objects based on additional information indicative of relation among the image objects.

Further, another object of the present invention is to provide data processing apparatus and method which decode synthesized code data with decoders of arbitrary coding specifications.

Further, another object of the present invention is to provide data processing apparatus and method which control the number of objects included in code data and/or the information amount of the code data.

According to the present invention, the foregoing objects are attained by providing a data processing apparatus for processing a data array to reproduce one frame image with a plurality of coded image objects, said apparatus comprising: input means for inputting a plurality of data arrays; instruction means for instructing synthesizing of a plurality of data arrays inputted by said input means; designation means for designating coding specifications of a processed data array; control means for controlling information amounts of the plurality of data arrays inputted by said input means, based on the coding specifications designated by said designation means; and synthesizing means for synthesizing the plurality of data arrays with information amounts controlled by said control means, based on the coding specifications designated by said designation means.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specifications, illustrate embodiments of the invention and, together with the description, serve to explain the principles of the invention.

FIG. 2 is an explanatory view showing the objects of the image in FIG. 1;

FIG. 15 is an example of 1 frame of a moving image;

FIG. 28 is an example of the profile table defining the number of objects and the bit rate upper limits by profile and level;

FIGS. 31A and 31B are examples of the structure of code data of moving image;

FIG. 37 is an example of synthesized color image information according to the seventh embodiment;

FIG. 42 is an example of the structure of synthesized moving image code data according to the ninth embodiment;

DETAILED DESCRIPTION OF THE PREFERRED EMBODIMENTS

Preferred embodiments of the present invention will now be described in detail in accordance with the accompanying drawings.

First Embodiment

[Construction]

Figure 5:
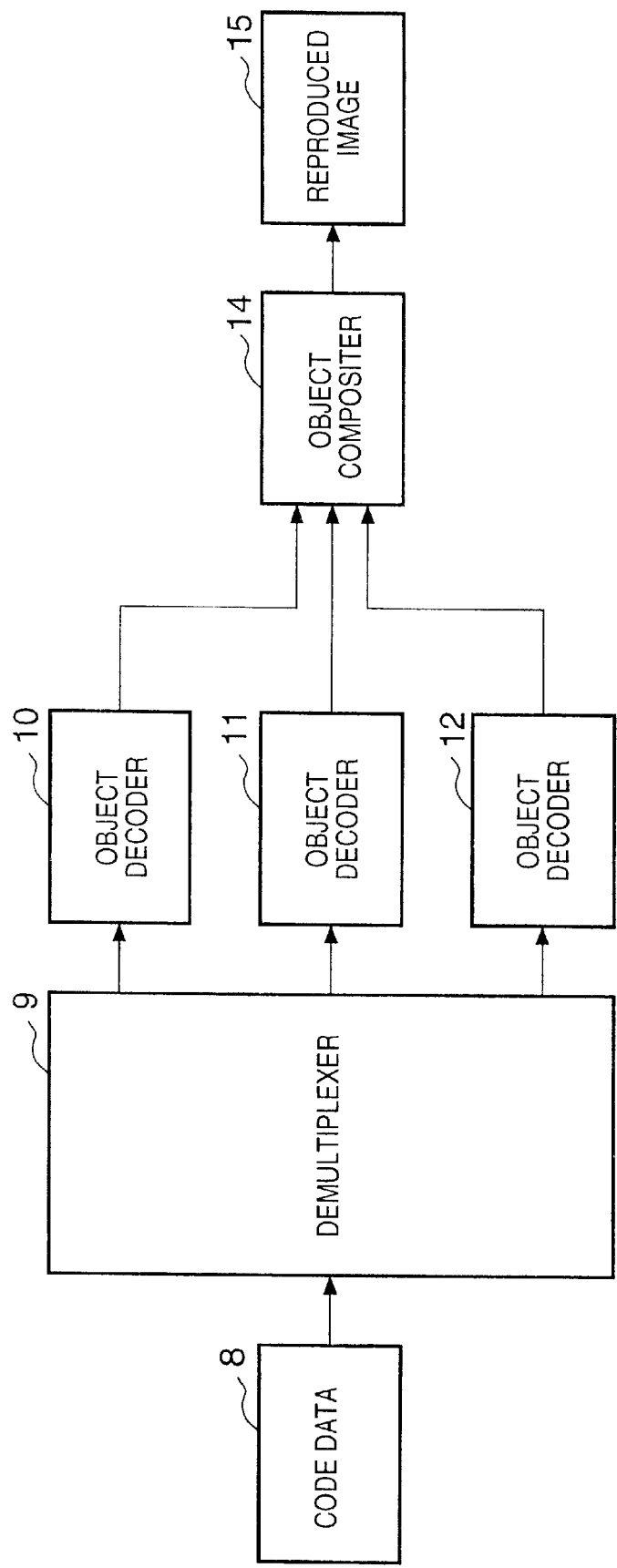
FIG. 5 is a block diagram showing the construction for decoding an image encoded in object units.
Figure 6:
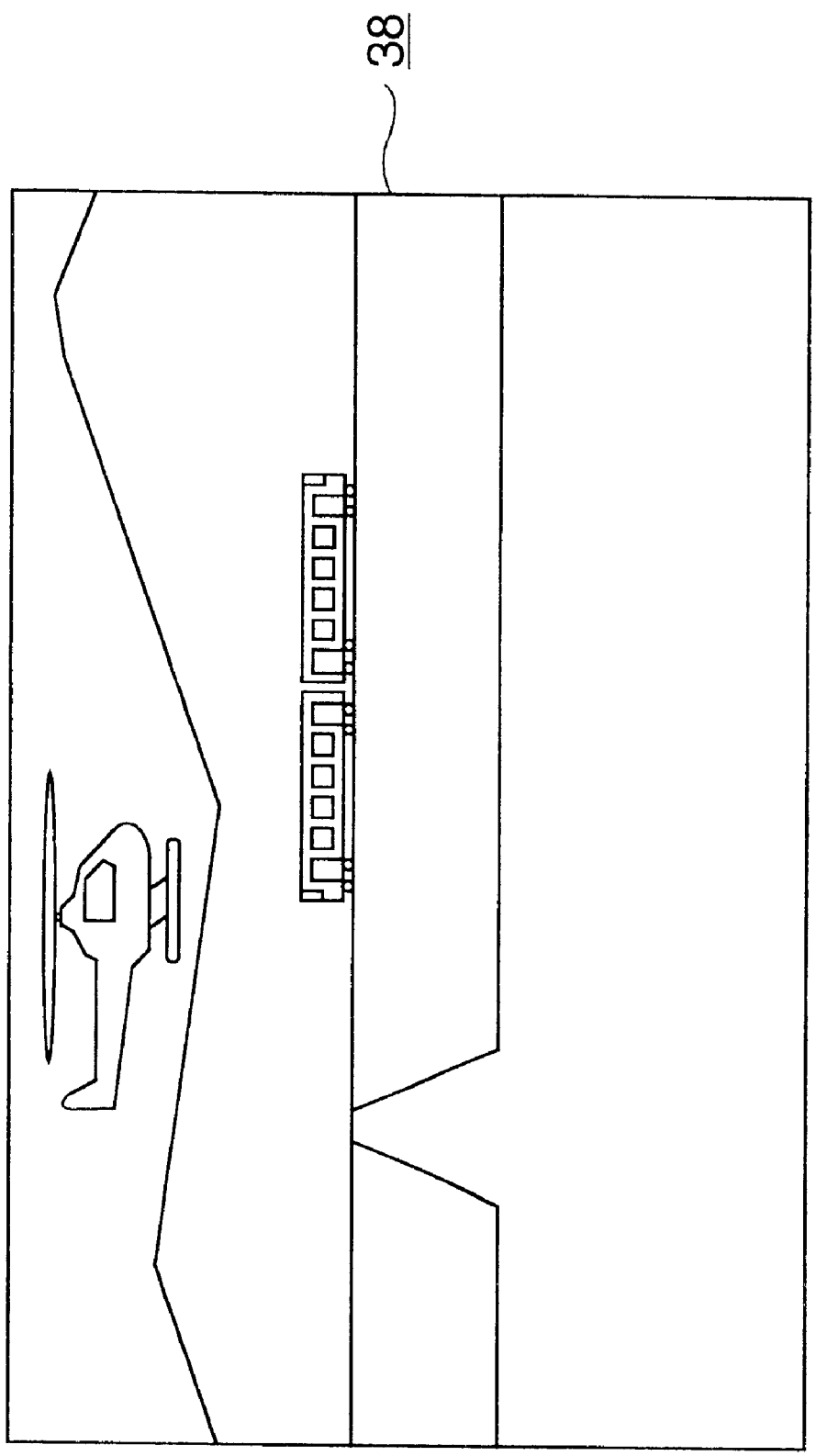
FIG. 6 is an example of decoded image where an object is omitted.
Figure 7:
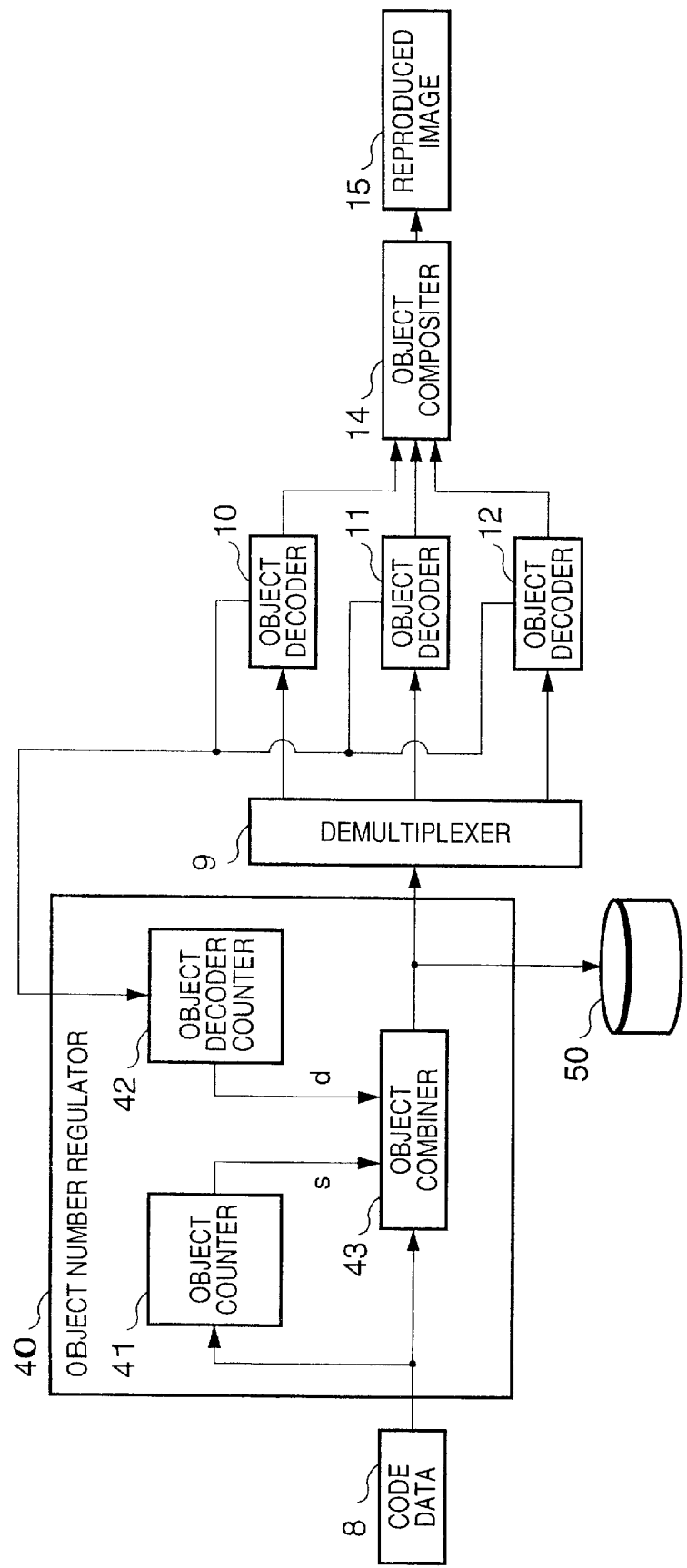
FIG. 7 is a block diagram showing the construction of a decoding apparatus according to the present invention.

FIG. 7 is a block diagram showing the construction of a decoding apparatus according to the present invention. Note that elements approximately corresponding to those in FIGS. 3 and 5 have the same reference numerals and detailed explanations of the elements will be omitted.

In FIG. 7, an object number regulator 40 includes an object counter 41 which counts the number s of objects, an object decoder counter 42 which counts the number d of object decoders, and an object combiner 43 which combines the plurality of objects included in the code data 8. Numeral 50 denotes a storage device comprising a magnetic disk or the like.

Figure 1:
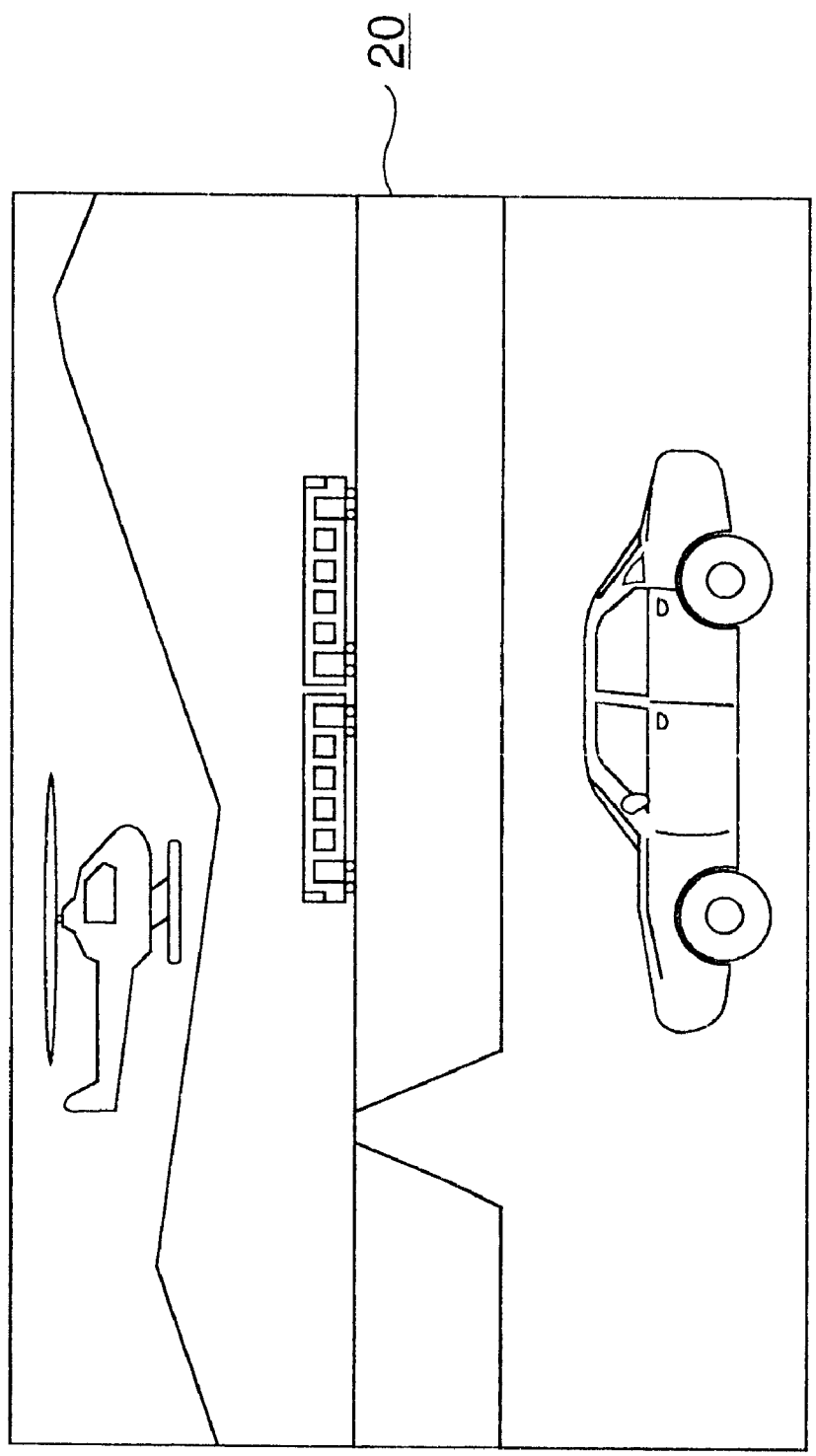
FIG. 1 is an example of the image processed by the MPEG4 coding.
Figure 3:
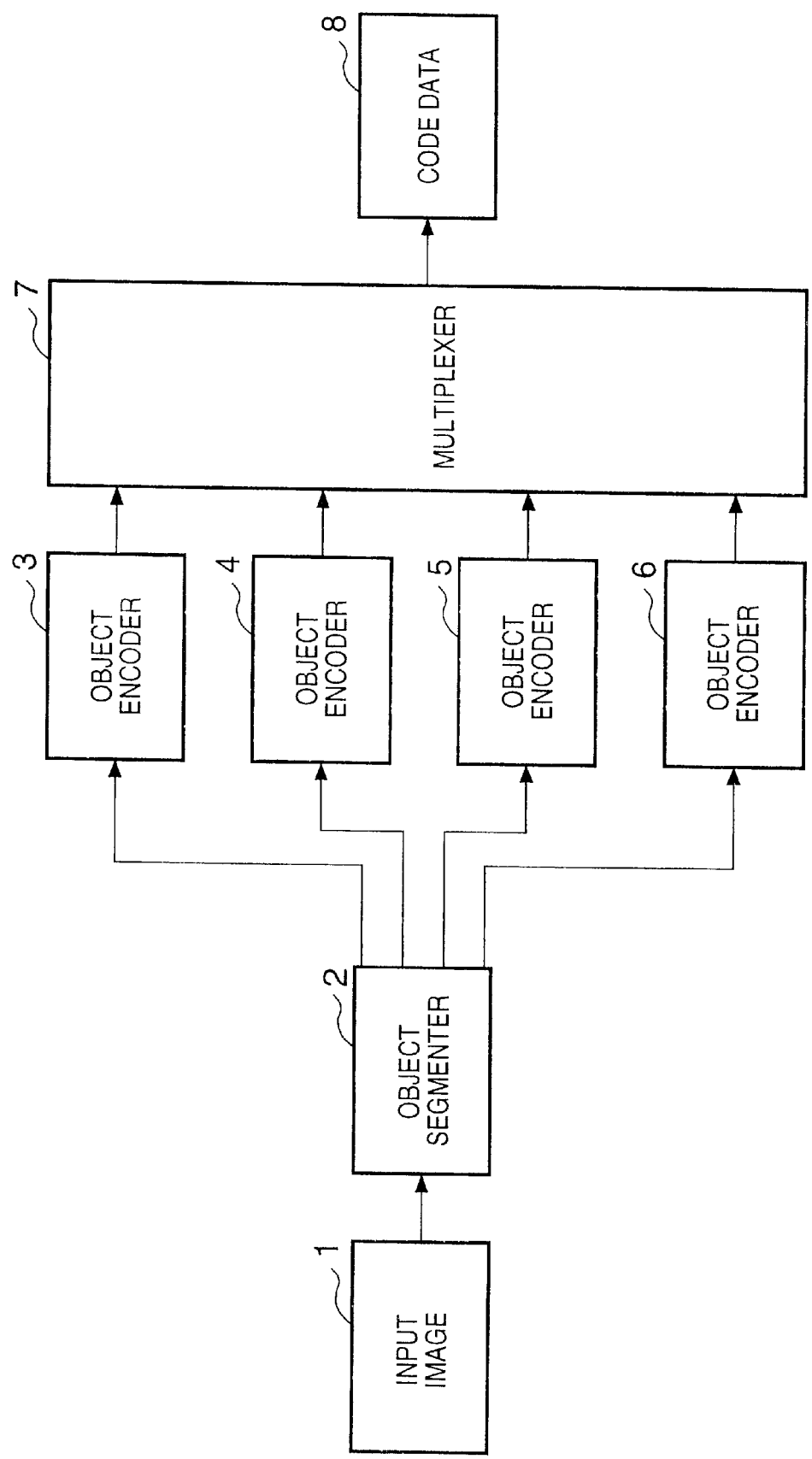
FIG. 3 is a block diagram showing the construction for coding in object units.
Figure 4:
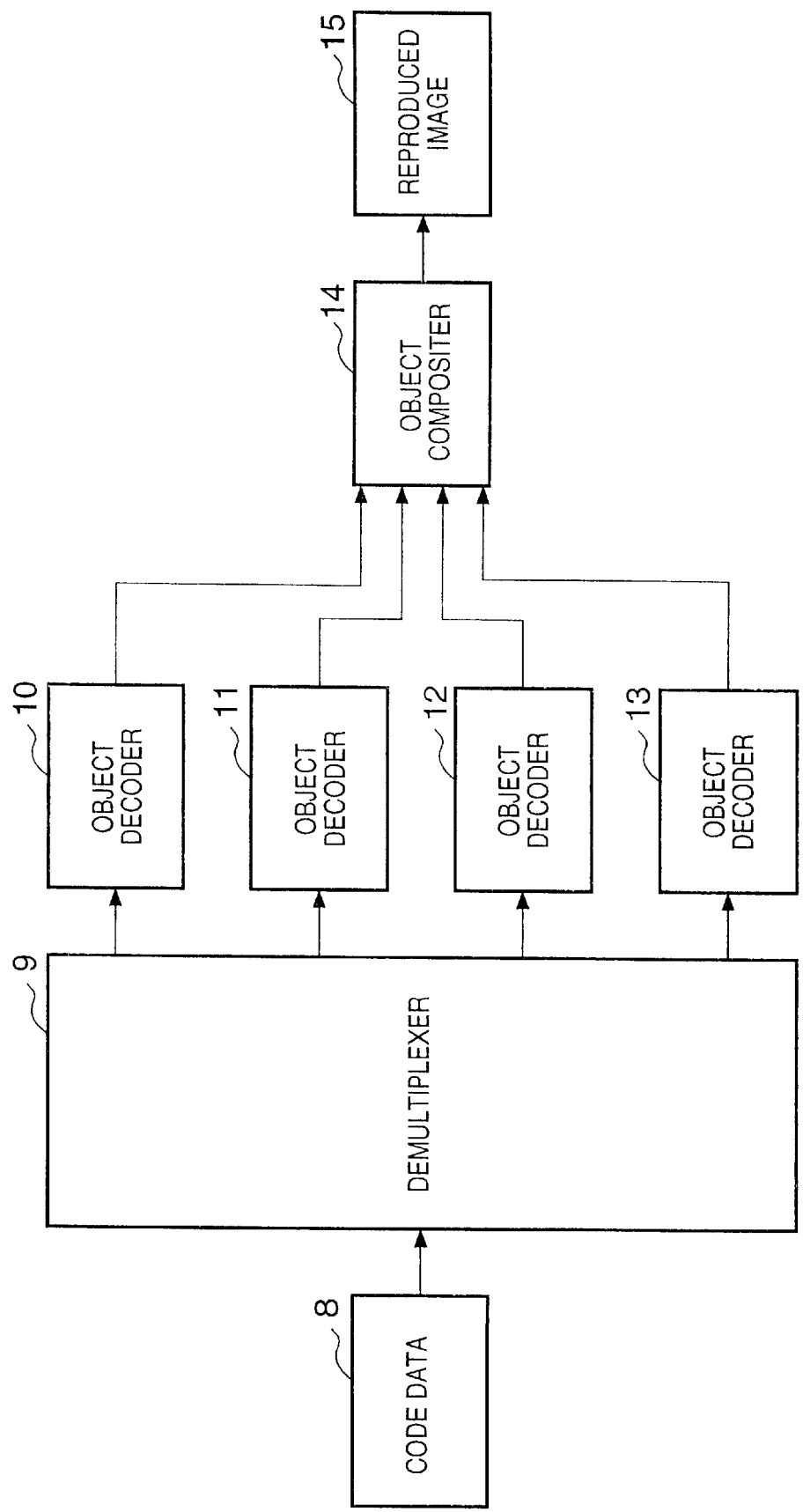
FIG. 4 is a block diagram showing the construction for decoding an image encoded in object units.

The code data 8 inputted into the decoding apparatus is subjected to coding by an encoder as shown in FIG. 3, for example. The code data 8 includes four objects at the maximum. Hereinbelow, description will be made using a moving image frame as shown in FIG. 1 as an original image.

The code data 8 is inputted into the object number regulator 40 by each frame. When code data of a frame has been inputted, the object counter 41 counts the numbers of objects included in the code data.

Figure 8:
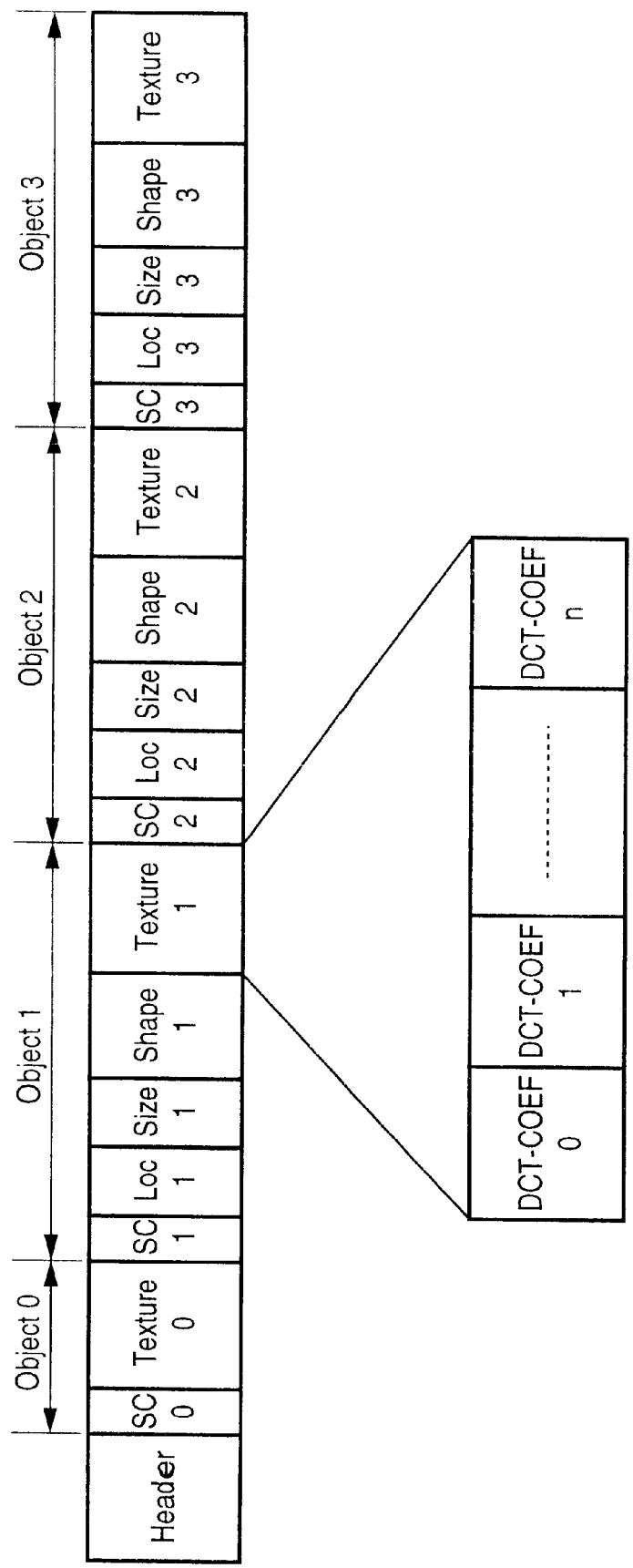
FIG. 8 is an example of 1-frame code data.

FIG. 8 is an example of 1-frame code data. The code data has "Header" indicative of the attribute of the frame at its head, next, code data indicative of background object (Object 0 in FIG. 8). Then, code data of the respective objects, i.e., code data of the object 21 (object 1), the object 22 (Object 2) and the Object 23 (Object 3) follow. The code data of each object comprises Start code (SC) indicative of the header of the object, Location (Loc) code indicative of location of the object, Size code indicative of the size of the object, Shape code indicative of the shape of the object, and Texture code indicative of the object itself.

In the following description, the Shape code is binary-encoded by MR coding, and the Texture code is encoded by block-coding. Note that block encoding is dividing an object into, e.g., 8×8 pixel blocks, then performing discrete cosine transformation (DCT) on each block, and quantizing and encoding the obtained conversion coefficients (DCT coefficients), such as JPEG coding. FIG. 8 shows the Texture code of the Object 1. The Texture code is a set of block-based code, DCT-COEFs. The code DCT-COEF is obtained by one-dimensionally rearranging quantization values of DCT coefficients and encoding quantization values other than zero run-length and zero value. If all the quantization values are zero, no DCT-COEF is generated.

The count value s of the object counter 41 is reset to zero upon start of input of 1-frame code data. Then, the number of occurrence of SC indicative of the header of object of the code data is counted. The result of counting is inputted into the object combiner 43. The object decoder counter 42 counts the number d of object decoders. In the present embodiment, as the number of object decoders is three, accordingly, the output from the object decoder counter 42 is "3".

Figure 10:
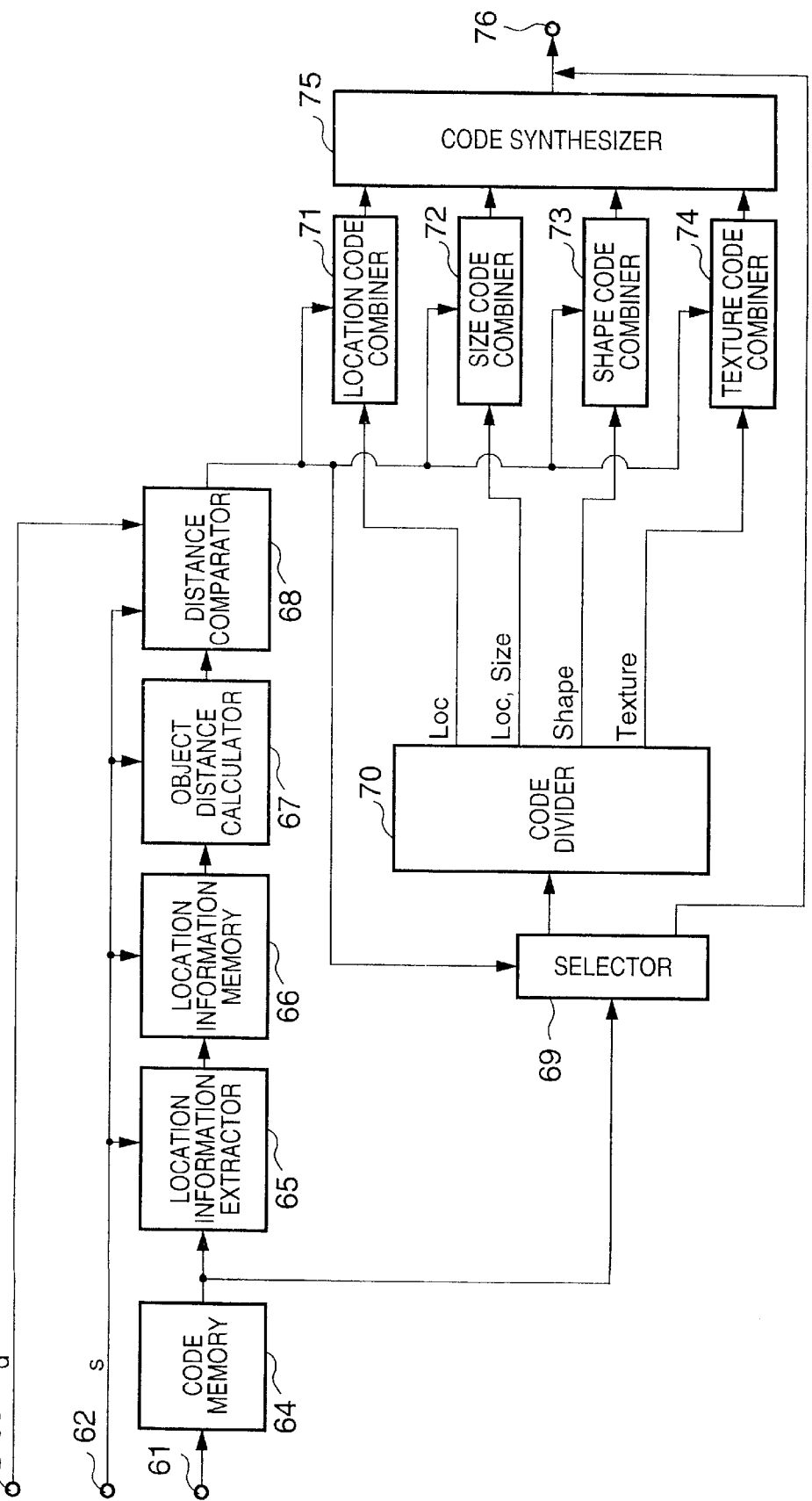
FIG. 10 is a block diagram showing the construction of an object combiner according to a first embodiment of the present invention.

FIG. 10 is a block diagram showing the construction of the object combiner 43. A terminal 61 inputs the code data 8. A terminal 62 inputs the number s of the objects from the object counter 41. A terminal 63 inputs the number d of the object decoders from the object decoder counter 42.

A code memory 64 is used for storing code data for one or more frames inputted from the terminal 61. A location information extractor 65 extracts the Loc code from the code data stored in the code memory 64, and stores the extracted Loc code into a location information memory 66 in frame units. An object distance calculator 67 calculates distances between respective objects, based on the Loc code stored in the position location memory 66.

A distance comparator 68 compares the distances calculated by the object distance calculator 67, and selects objects to be combined, based on the result of comparison. A selector 69 outputs object code data, read from the code memory 64, to a code divider 70 or terminal 76, designated by the distance comparator 68 as an output destination, for each object.

The code divider 70 divides object code data into Loc, Size, Shape and Texture code. A location code combiner 71 combines the Loc code of two objects into one Loc code. A size code combiner 72 combines the Size code of two objects into one Size code. A shape code combiner 73 combines the Shape code of two objects into one Shape code. A texture code combiner 74 combines the Texture code of two objects into one Texture code. A code synthesizer 75 synthesizes outputs from the location code combiner 71 to the texture code combiner 74 into one code data.

One of the output from the code synthesizer 75 and that from the selector 69 is forwarded to the next stage via a terminal 76.

[Operation]

Next, the operation of the present embodiment will be described on a case where an MPEG Intra frame or respective Motion JPEG frames are independently encoded.

Frame-Based Coding

In FIG. 10, code data for one or more frames is stored via the terminal 61 into the code memory 64, and the number s of objects is inputted via the terminal 62 from the object counter 41. In case of the code data in FIG. 8, the number s of objects is four (s=4). Further, the number d of object decoders is inputted via the terminal 63 from the object decoder counter 42. In the present embodiment, the number d of object decoders is three (d=3). Accordingly, s−d=1 holds, i.e., the construction has one less decoder.

The object distance calculator 67 obtains the distance between the object 21 and the object 22 from the Loc code stored in the location information memory 66. If the location of the object 21 is (x1,y1) and that of the object 22 is (x2,y2), the distance D12 between these objects is represented by the following equation:

$$D12 = \sqrt{\{(x1-x2)^2 + (y1-y2)^2\}} \qquad (1)$$

Similarly, the distance D13 between the object 21 and the object 23 and the distance D23 between the object 22 and the object 23 are obtained. Based on the obtained distances between objects, the distance comparator 68 selects a plurality of objects with a short distance therebetween, to combine the objects for compensation of the shortage of object decoder. For example, the distance comparator 68 selects a plurality of objects with the smallest sum of distance therebetween in a plurality of frames. In the present embodiment, as the shortage of object decoder is "1", two objects are combined into one object. If the sum of distance D12 is the smallest, the object 21 and the object 22 are combined. Thus, the shortage of object decoder is resolved.

If the object 21 and the object 22 are combined, the selector 69, controlled by the output from the distance comparator 68, sends the header outputted from the code memory 64 to the terminal 76, and sends the Object 0 as background object to the terminal 76.

Next, the output from the distance comparator 68 for the Object 1 corresponding to the object 21 indicates "selection", accordingly, the selector 69 sends the Object 1 to the code divider 70. The Loc code of the Object 1 is sent to the location code combiner 71, the Loc code and Size code are sent to the size code combiner 72, the shape code is sent to the shape code combiner 73, and the Texture code is sent to the texture code combiner 74. Next, the output from the distance comparator 68 for the Object 2 corresponding to the object 22 also indicates "selection", accordingly, the Object 2 code is divided into the respective code, and the divided code are inputted into the location code combiner 71 to the texture code combiner 74, as in the case of the Object 1.

Note that as the output from the distance comparator 68 for the Object 3 corresponding to the object 23 indicates "non-selection", the code data of the object 23 is outputted to the terminal 76 without any processing. Further, for a frame having the code data 8 where s−d>0 holds, object combining is not performed, and the output from the selector 69 is forwarded to the terminal 76.

The location code combiner 71 decodes the respective Loc code, and obtains location information (x1,y1) to (xn, yn) of the plurality of objects. Then, as represented by the following equation, the location code combiner 71 selects the minimum value of x- and y-coordinates from these location information, and outputs new location information (x1',y1').

$$(x1', y1') = (\min(x1, x2, \ldots, xn), \min(y1, y2, \ldots, yn)) \qquad (2)$$

n: the number of combined objects

The size code combiner 72 decodes the respective Loc and Size code, and obtains location information and size information (x1,y1), (Sx1,Sy1) to (xn,yn), (Sxn,Syn) of the plurality of objects. Then, the size code combiner 72 calculates new location information (x1',y1') from the equation (2), and obtains new size information (Sx1',Sy1') from the following equation and outputs the information.

$$(Sx1', Sy1') = (\max(x1+Sx1, x2+Sx2, \ldots, xn+Sxn) - x1', \max(y1+Sy1, y2+Sy2, \ldots, yn+Syn) - y1') \qquad (3)$$

Figure 11A:
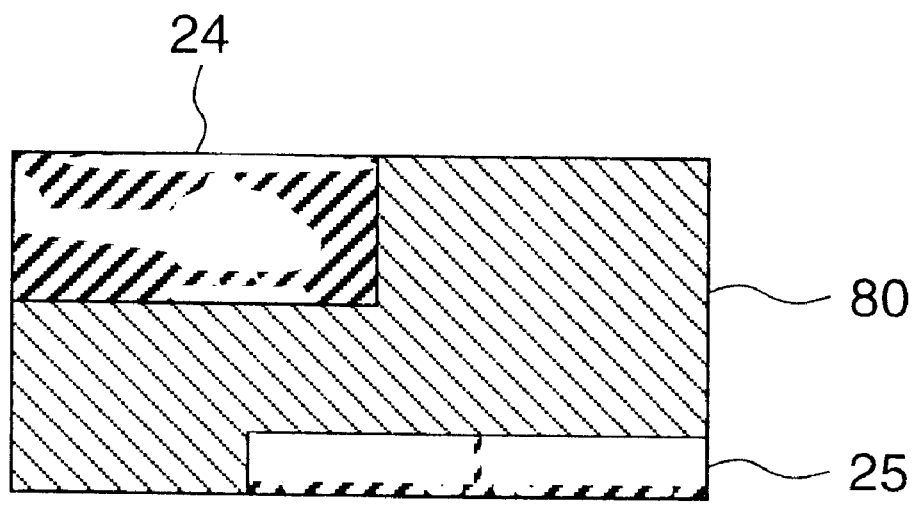
FIGS. 11A and 11B are examples of object combining.

The shape code combiner 73 generates code synthesized from the shapes of the plurality of objects. When the objects 21 and 22 are synthesized, the shape of a new object is represented by a mask 80 as shown in FIG. 11A. The original masks 24 and 25 remain the same, and the portion other than the masks are newly added. In FIG. 11A, the value of the hatched portion is the same as that of the solid black masks 24 and 25. Accordingly, as zero-run has increased on the right side of the mask 24, zero run-length is added after code indicative of a change point nearest to the frame right end.

Further, if another object does not exist on the right side of the object 21, the above-described change point merely indicates the final change point of the line, and the code does not increase. On the other hand, if another object exists on the right side of the object 21, zero run-length corresponding to the number of pixels between both objects is added to the code. That is, the code can be replaced with code to which zero run-length is added. Further, if there is a third object on the right side of the other object on the right side of the object 21, the code of the object 21 is replaced with code where the zero run-length corresponding to the interval between the objects have been added the code of the object 21. The replaced code is outputted as new Shape code. Note that with respect to a line including no object, almost no code is generated.

Figure 11B:
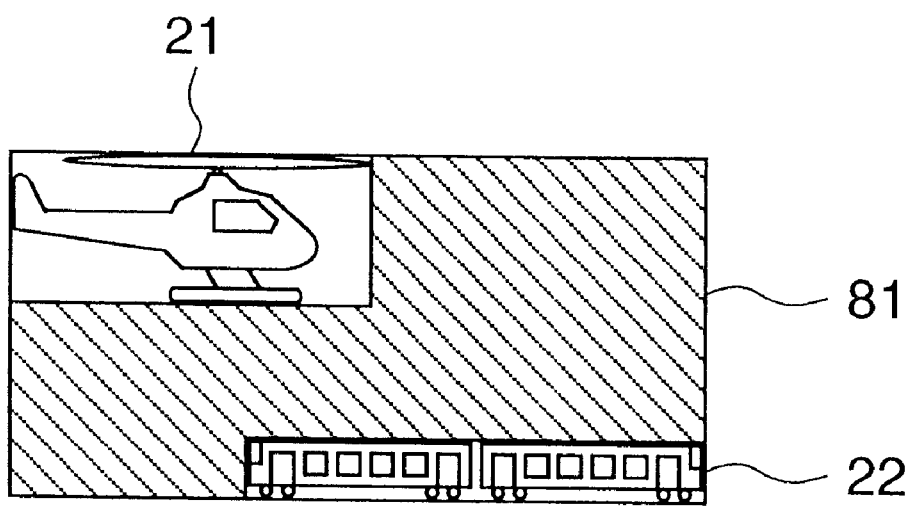

The texture code combiner 74 generates code synthesized from textures of the plurality of objects. FIG. 11B shows a status where the texture of the object 21 and that of the object 22 are synthesized. The texture of a new object is represented as an object 81. The original objects 21 and 22 remain the same, and a hatched portion other than the objects is newly added. Note that the value of the hatched portion is zero. In the MPEG coding or the like, the DC component of a pixel of interest is converted into a difference between the DC component and that of a left block. Further, quantization values of AC components are one-dimensionally arrayed, and zero run-length and nonzero values are encoded. In the hatched portion in FIG. 11B, the difference between the DC component of a pixel of interest and that of a left block is zero, and the values of all the AC components are zero. In this case, in the MPEG1 coding, in macro-block units, 1 bit indicative of macro block type, luminance 12 bits and chromaticity 4 bits indicative of DC component size, and EOB (End of Block) 12 bits indicative of the end of the block, i.e., total 29 bits, are added. In this manner, Texture code of the object 81 where the textures of the plurality of objects are combined is generated, and the Texture code is outputted.

The code synthesizer 75 synthesizes outputs from the location code combiner 71 to the texture code combiner 74, to generate code data of the combined object, and outputs the code data to the terminal 76.

Figure 9:
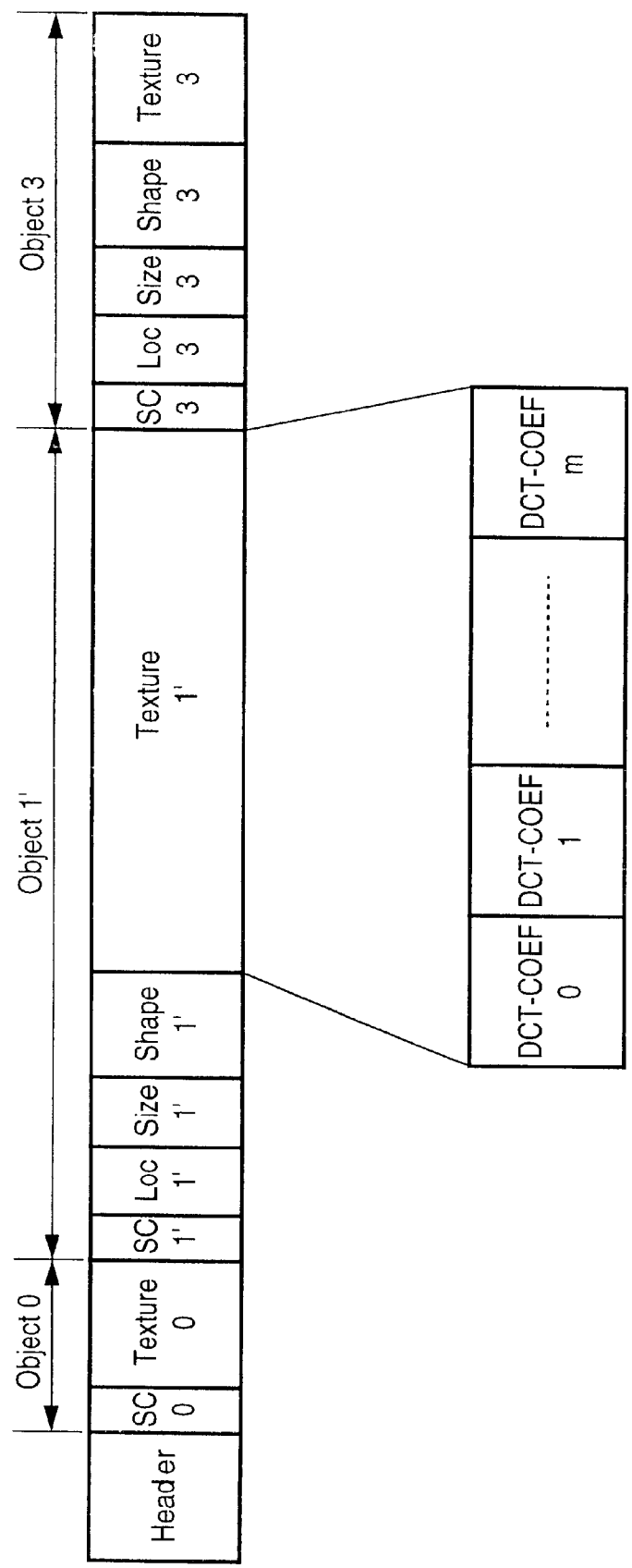
FIG. 9 is an example of synthesized code data.

FIG. 9 shows an example of code data synthesized as above. The code data Object 1 of the object 21 and the code data Object 2 of the object 22 in FIG. 8 are combined into code data Object 1'. Note that the code data Object 3 of the object 23 remains the same.

The code data processed as above is inputted into the demultiplexer 9, and the object code data is divided into Object 0, Object 1' and Object 3. Then, the code data Object 0 is inputted into the object decoder 10; the code data Object 1' is inputted into the object decoder 11; and the code data Object 3 is inputted into the object decoder 12. The respective object decoders output location information obtained by decoding the code data and the image data, to the object compositer 14. The object compositer 14 arranges the image data in accordance with the location information of the respective objects, to obtain a reproduced image 15.

Moving Image Coding

In moving image coding, the coding efficiency is improved by motion compensation. As an example, coding by using the correlation between frames such as a predicted frame in MPEG standard will be described.

Figure 12:
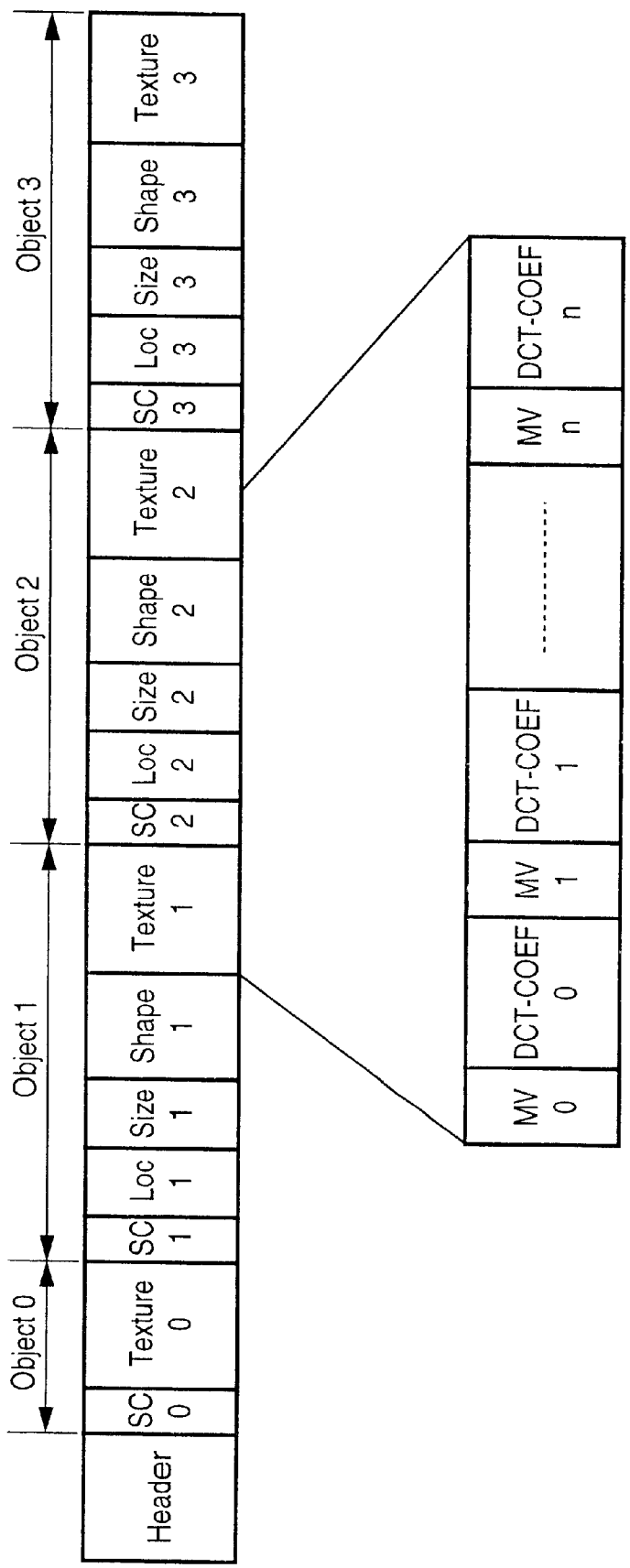
FIG. 12 is an example of 1-frame code data to be motion-compensated.

FIG. 12 is an example of code data 8 for 1 frame to be motion-compensated. Similar to the code data in FIG. 8, the code data in FIG. 12 has a header, code data Object 0 indicative of background object, and code data (Object 1 to Object 3) of respective objects. Each code data comprises the SC indicative of the header of the object, the Loc code indicative of location, the Size code indicative of size, the Shape code indicative of shape and Texture code indicative of texture. In the MEGP coding, an object is divided into macro blocks and motion compensation is performed in block units. As a result, The Texture code comprises MV code indicative of motion vector as a result of motion vector coding, and DCT-COEF quantized and encoded from the result of block-based division and DCT conversion.

In moving image coding, the object number regulator 40 performs similar processing to that in frame-based coding as described above. Although detailed explanation will be omitted, if the shortage of object decoder is "1" and the distance D12 is the shortest, the objects 21 and 22 are combined, to reduce the number of objects. Further, the motion vectors included in the respective objects and the result of coding of DCT coefficients are not changed.

In the MPEG coding or the like, when frame correlation is utilized, the DC component and AC components of predicted difference are encoded. Further, a motion vector is converted to the difference between the motion vector and that of a left macro block. Accordingly, in the hatched portion in FIG. 11B, the difference of the motion vector is zero, and the values of all the AC components are zero. In the MPEG coding, such macro block is not encoded and is skipped, and corresponding code merely indicates the number of skipped macro blocks. Accordingly, in the object combining, the code of macro block included in an object which appears next is merely changed, and the code is merely slightly changed. In this manner, the Texture code of combined objects is generated and outputted.

Figure 13:
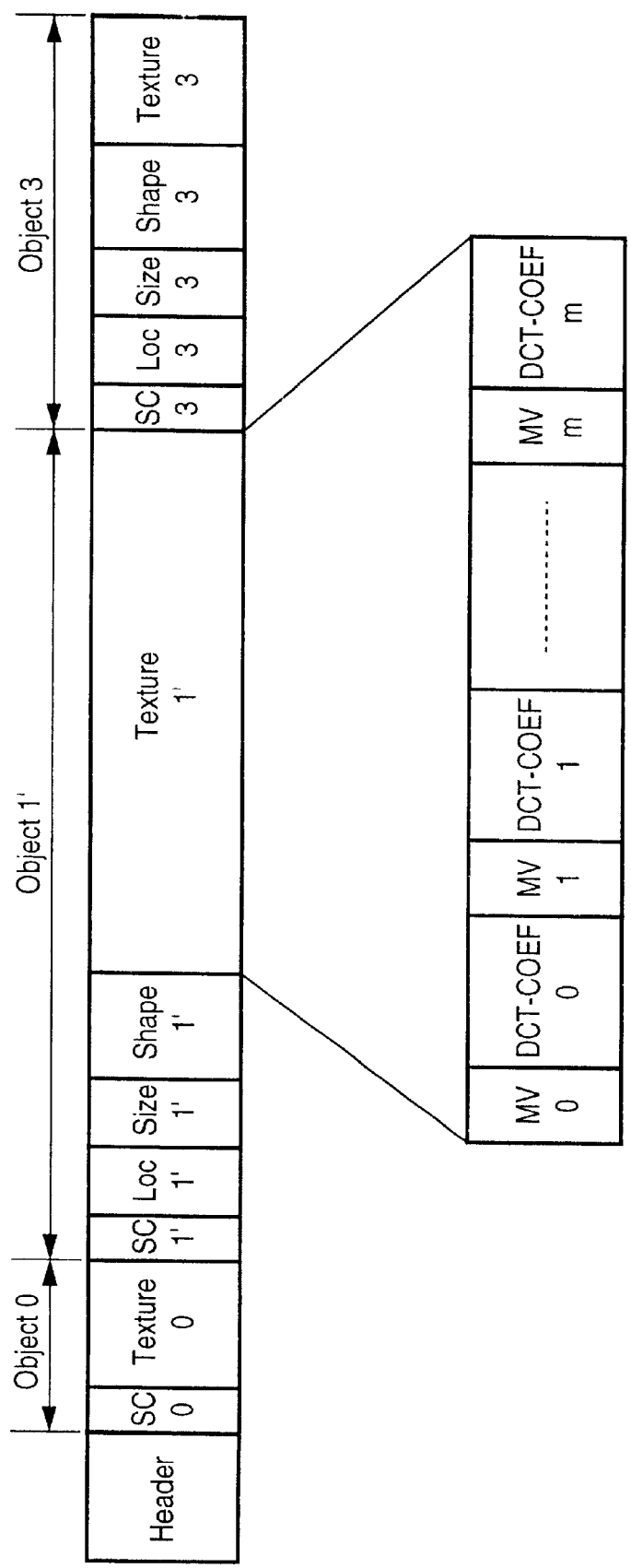
FIG. 13 is an example of synthesized code data.

FIG. 13 is an example of code data synthesized as above. The code data Object 1 of the object 21 and the code data Object 2 of the object 22 in FIG. 12 are combined into code data Object 1'. Note that the code data Object 3 of the object 23 remains the same.

As described above, in the present embodiment, in a moving image encoded in object units, if the number of coded objects is greater than that of decoders, i.e., there is shortage of decoders, to reduce the number of objects in correspondence with the shortage, a plurality of objects with a short distance therebetween are combined. This enables efficient and proper reproduction of moving image including a number of coded objects, with a limited number of decoders. Further, the objects are synthesized in code data status. That is, as the combining is made by change or addition of code, the objects can be synthesized at a high speed, and further, increment in code length is very small.

Figure 14B:
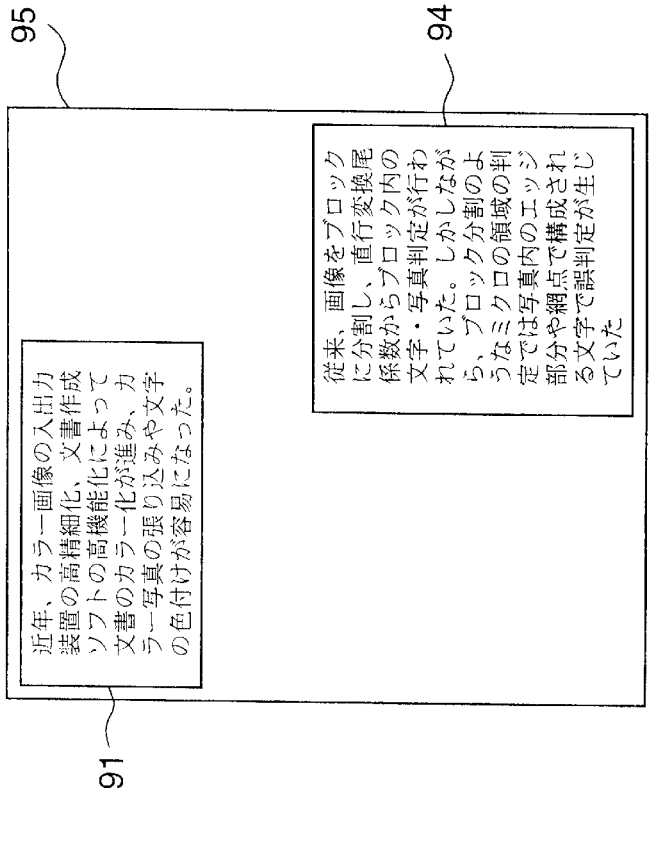
FIGS. 14A to 14C are examples of objects of a still image and combined objects.
Figure 14A:
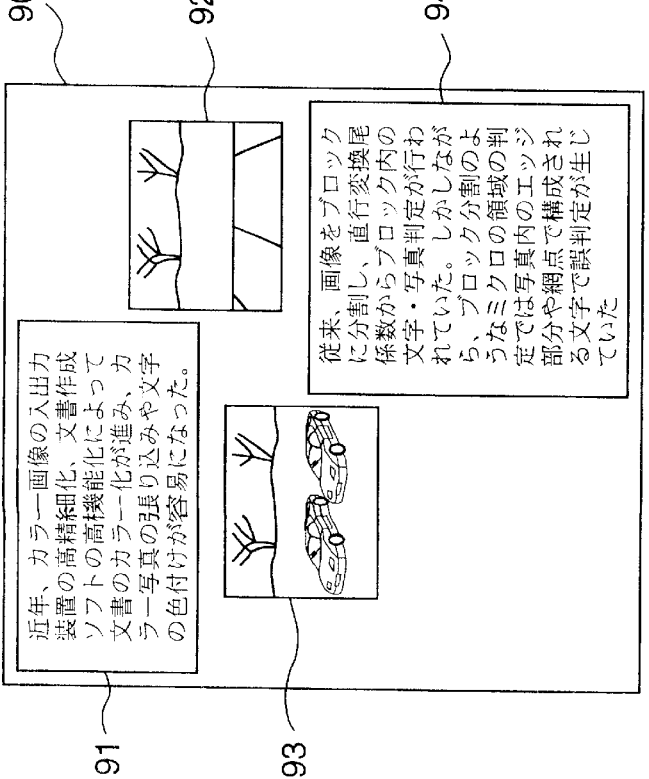
Figure 14C:
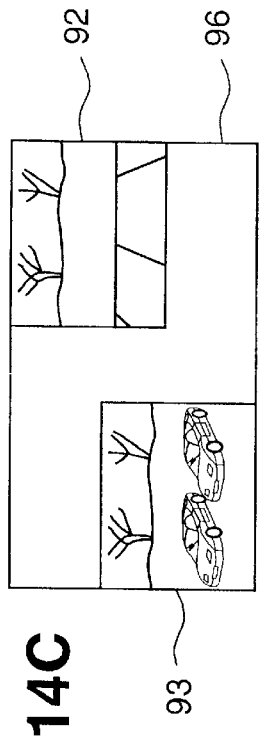

Further, in the above description, a coded moving image is decoded, however, a coded still image can be similarly processed. That is, the above-described frame-based decoding can be applied to still image decoding. For example, as shown in FIG. 14A, an image 90 includes character areas 91 and 94 and photographic areas 92 and 93, and the characters are encoded by the MMR (Modified Modified Read) coding and the photographs are encoded by the JPEG coding. If only one decoder for the MMR coding and only one decoder for the JPEG coding are prepared, the image 90 can be decoded by combining and dividing the respective areas into objects 95 and 96 as shown in FIGS. 14B and 14C.

Note that in the above description, the Shape code is encoded by the MMR coding, and the Texture code is encoded by the MPEG coding, however, the present invention is not limited to these coding methods. Further, the function of the demultiplexer 9 may be incorporated into the object number regulator 40. Further, if $s-d \geq 2$ holds as the difference between the number d of object decoders and the number s of objects included in code data, objects with a short distance therebetween, i.e., 2 (s–d) objects may be combined with (s–d) objects, or (s–d+1) objects with the shortest distance therebetween may be combined into one object.

In the above description, code data of regulated number of objects are inputted into the object decoders. However, if it is arranged such that the code data of regulated number of objects are temporarily stored in the storage device 50 as shown in FIG. 7, and the code data of regulated number of objects are read from the storage device 50 and decoded, decoding processing can be performed at a speed higher than that in decoding with object combining.

Further, according to the present embodiment, the number of object decoders is not limited. Accordingly, the processing capability can be easily improved by increasing the object decoders. Further, the location of an object may be obtained precisely by decoding, e.g., the Shape code, as well as utilizing the location code.

Second Embodiment

[Construction]

Figure 16:
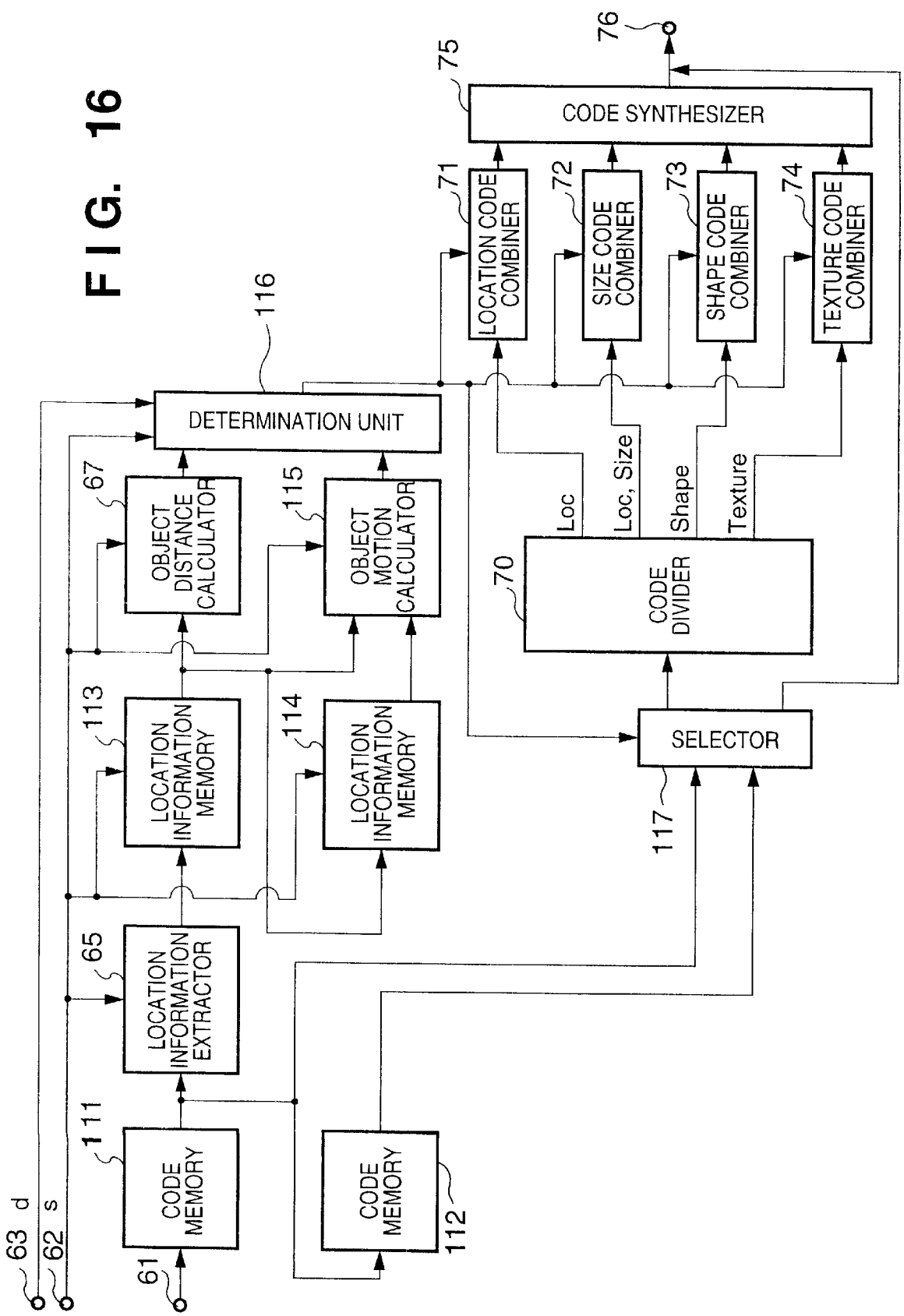
FIG. 16 is a block diagram showing the construction of the object combiner according to a second embodiment of the present invention.

FIG. 16 is a block diagram showing the construction of the object combiner 43 according to a second embodiment of the present invention. In FIG. 16, elements corresponding to those in the construction of FIG. 10 have the same reference numerals, and detailed explanations of the elements will be omitted.

Numerals 111 and 112 denote code memories having a similar function to that of the code memory 64; 113 and 114, location information memories having a similar function to that of the location information memory 66; and 115, an object motion calculator which detects the movement of object.

Numeral 116 denotes a determination unit 116 which determines whether or not object combining is necessary and determines objects to be combined, based on the results of calculation by the object motion calculator 115 and the object distance calculator 67, and the number s of objects and the number d of object decoders inputted from the terminals 62 and 63. Numeral 117 denotes a selector which outputs object code data read from the code memory 111, or from the code memory 112, if necessary, to an output destination designated by the determination unit 116.

[Operation]

Next, the operation of the object combiner 43 as shown in FIG. 16 will be described. First, frame-based coding to independently encode respective frames such as Intraframe coding in the MPEG standard or Motion JPEG coding will be described.

In this case, the code memory 111 has the same function as that of the code memory 64 in FIG. 10; the location information memory 113 has the same function as that of the location information memory 66 in FIG. 10; and the determination unit 116 has the same function as that of the distance comparator 68 in FIG. 10. Accordingly, the code data for 1 frame inputted from the terminal 61 is stored into the code memory 111. The number s of objects, as the output from the object counter 41, is inputted into the terminal 62. The number d of object decoders, as the output from the object decoder counter 42, is inputted into the terminal 63. The location information extractor 65 extracts location information of respective objects from the code data stored in the code memory 111, and inputs the extracted information into the location information memory 113. The object distance calculator 67 calculates distances between objects based on the location information stored in the location information memory 113. The determination unit 116 determines whether or not object combining is necessary from the number s of objects and from the number d of object decoders. If object combining is necessary, the determination unit 116 determines the number of objects to be combined, then compares the distances between objects obtained by the object distance calculator 67, and determines the necessary number of objects to be combined.

The object code data read from the code memory 111 is inputted into the selector 117. The selector 117 forwards code data of header, background object and uncombined objects to the terminal 76. On the other hand, the selector 117 inputs code data of objects to be combined to the code divider 70. The code data inputted into the code divider 70 is divided into location, size, shape and texture code data, and inputted into the location code combiner 71, the size code combiner 72, the shape code combiner 73 and the texture code combiner 74, respectively. Object code data, combined in a procedure similar to that described in the first embodiment, is outputted from the terminal 76.

Next, a frame encoded by using the correlation between frames such as a predicted frame in the MPEG coding, will be described. In this case, the MPEG-coded frame 20 in FIG. 1 and a frame 100 shown in FIG. 15, following the frame 20, will be described. Note that in the frame 100, the object 21 (helicopter) has moved rightward, and the object 22 (train) and the object 23 (car) have moved leftward, with respect to the frame 20.

Prior to processing, the code memories 111 and 112 and the location information memories 113 and 114 are cleared, and the other elements are initialized. The number s of objects is inputted into the terminal 62, and the number d of object decoders is inputted into the terminal 63. First, the code data of the frame 20 is inputted into the terminal 61, and stored into the code memory 111. The location information extractor 65 stores location information of the respective objects in the frame 20 into the location information memory 113. The object distance calculator 67 obtains distances between the respective objects in the frame 20.

Next, the code data in the code memory 111 is moved to the code memory 112, and the location information in the location information memory 113 is also moved to the location information memory 114, then the code data of the frame 100 is inputted into the terminal 61 and stored into the code memory 111. The location information extractor 65 stores location information of the respective objects in the frame 100 into the location information memory 113.

The object motion calculator 115 calculates the motions of the respective objects from the locations of the respective objects in the location information memories 113 and 114. In case of the object 21, assuming that its location in the frame 20 is (x211,y211) and that in the frame 100 is (x212,y212), the motion vector MV21=(mv21x,mv21y) is represented as:

$$MV21=(mv21x,mv21y)=((x212-x211),(y212-y211)) \quad (4)$$

Regarding the objects 22 and 23, motion vectors MV22 and MV23 are obtained in a similar manner.

The distances D12, D13 and D23 as the outputs from the object distance calculator 67, and the motion vectors MV21, MV22 and MV23 as outputs from the object motion calculator 115 are inputted into the determination unit 116. The determination unit 116 determines whether or not object combining is necessary, from the number s of objects and the number d of object decoders, and if the object combining is necessary, determines the number of objects to be combined and objects to be combined.

In this case, objects having motion vectors with directions close to each other are determined as objets to be combined. Then, the difference vectors between the motion vectors of the respective objects are obtained, and motion vector(s) less than a threshold value Thdv is selected. That is, the difference vector DV2122 between the motion vector MV21 of the object 21 and the motion vector MV22 of the object 22 is represented by the following equation:

$$DV2122=(dv2122x,dv2122y)=((mv21x-mv22x),(mv21y-mv22y)) \quad (5)$$

The size D2122 of the difference vector DV2122 is represented by the following equation:

$$D2122=\sqrt{(dv2122x^2+dv2122y^2)} \quad (6)$$

All the difference vector sizes are obtained. The obtained difference vector sizes D2122, D2223 and D2123 are compared with the threshold value Thdv, and the difference vector size(s) less than the threshold value is selected. As the objects 22 and 23 have moved in the same direction, the difference vector size D2223 of the difference vector is less than that with respect to the object 21. If only the difference vector size D2223 is less than the threshold value Thdv, the objects to be combined are the objects 22 and 23. If all the difference vector sizes are less than the threshold value Thdv, objects with the shortest distance therebetween are selected as objects to be combined. Further, if there is no difference vector size less than the threshold value, objects with the shortest difference therebetween are combined.

Then, object combining is performed based on the determination. In this case, the object 22 and the object 23 are combined so as to reduce the number of objects. This operation will be described using the code data 8 in FIG. 8 as an example.

First, the selector 117 reads the header from the code memory 112 and outputs the header via the terminal 76. Further, the selector 117 reads the code data Object 0 of the background object, and outputs the code data via the terminal 76. As the object 21 is not combined, the selector 117 similarly reads the code data Object 1 and outputs the code data via the terminal 76.

Then, as the next code data Object 2 corresponds to the object 22, the selector 117 reads the code data Object 2 from the code memory 112 and inputs the code data into the code divider 70. The code divider 70 inputs the Loc code from the object code data into the location code combiner 71, the Loc code and the Size code from the object code data, into the size code combiner 72, the Shape code from the object code data, into the shape code combiner 73, and the Texture code from the object code data, into the texture code combiner 74.

Next, the selector 117 reads the code data Object 3 of the object 23 to be combined with the object 22, from the code memory 112, and inputs the code data into the code divider 70. As in the case of the code data Object 2, divided code are respectively outputted.

The location code combiner 71 decodes the respective Loc code, and generates new location information (x2',y2') from the location information (x2,y2) and (x3,y3) of the two objects, based on the equation (2), then encodes the new location information (x2',y2'), and outputs the coded location information.

The size code combiner 72 decodes the Loc code and the Size code, then generates new size information (Sx2',Sy2') from the location information (x2,y2) and (x3,y3) and size information (Sx2,Sy2) and (Sx3,Sy3) of the two objects, based on the equation (3), then encodes the new size information (Sx2',Sy2'), and outputs the coded size information.

Figure 17A:
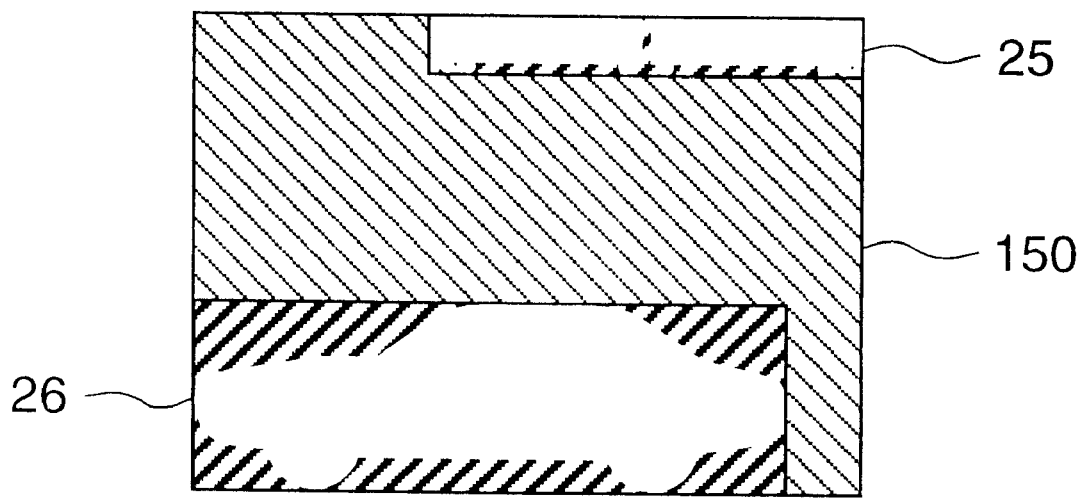
FIGS. 17A and 17B are examples of combined objects.

The shape code combiner 73 generates code of a shape synthesized from the shapes of the two objects. When the objects 22 and 23 are synthesized, the shape of the new object is represented by a mask 150 in FIG. 17A. That is, in FIG. 17A, a hatched portion is newly added to a mask 25 of the object 22 and a mask 26 of the object 23, as the mask 150. Note that the value of the hatched portion is the same as that of the mask 80 in FIG. 11A. Then, as in the case of the first embodiment, addition of zero-run and/or code change is performed, and the obtained code is outputted as new Shape code.

Figure 17B:
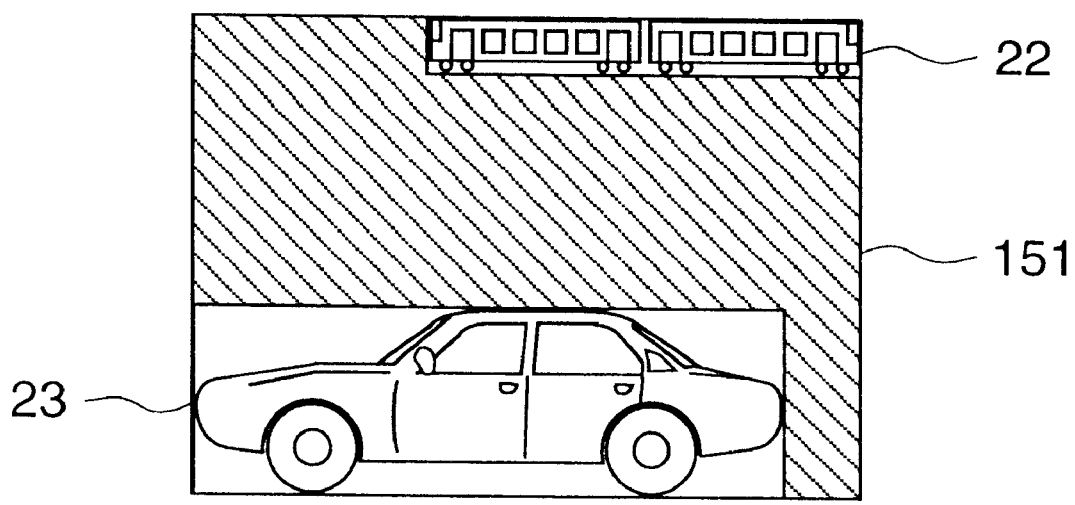

The texture code combiner 74 generates code of texture synthesized from the textures of the two objects. FIG. 17B shows a status where the texture of the object 22 and that of the object 23 are synthesized. That is, a texture having zero value, as represented as a hatched portion, is added to the textures of the objects 22 and 23. Then, as in the case of the first embodiment, code is added in macro block units in the hatched portion or the number of skipped blocks is changed, thus Texture code of an object 151 is generated and outputted.

The code synthesizer 75 synthesizes the outputs from the location code combiner 71 to the texture code combiner 74, to generate code data of the combined object. The code data of the combined object is outputted from the terminal 76.

Figure 18:
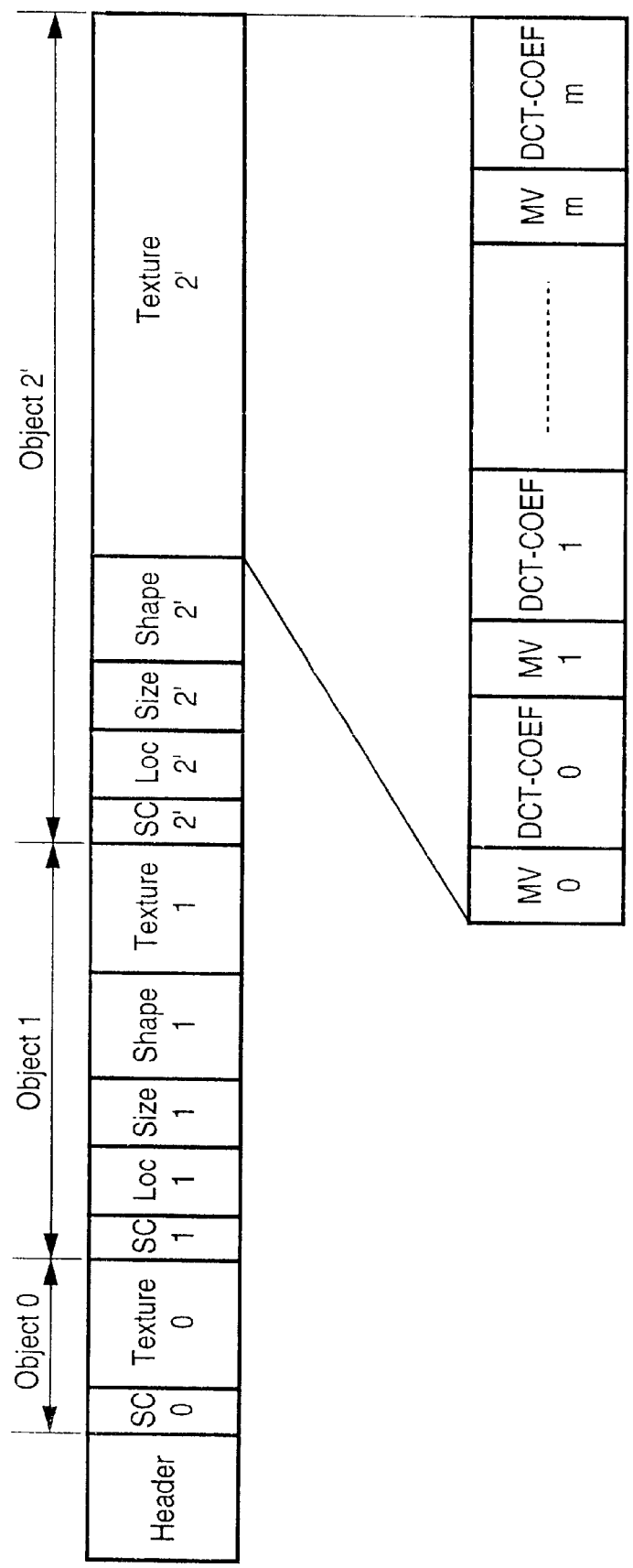
FIG. 18 is an example of code data including combined objects.

FIG. 18 is an example of code data including the combined object. In FIG. 18, the code data Object 1 of the object 21 remains the same, while the code data Object 2 of the object 22 and the code data Object 3 of the object 23 are combined as code data Object 2'.

The generated code data is inputted into the demultiplexer 9, and divided into the code data Object 0, the Object 1, and the Object 2'. The code data object 0 is inputted into the object decoder 10; the code data Object 1 is inputted into the object decoder 11; and the code data Object 2' is inputted into the object decoder 12. The object decoders 10 to 12 decode the code data, generate location information and image data of the respective objects, and output them to the object compositer 14. The object compositer 14 arranges the image data in accordance with the location information of the respective objects, thus obtains the reproduced image 15.

In the present embodiment, in a moving image encoded in object units, if the number of coded objects is greater than that of decoders, objects are combined, from objects with motion vectors or moving amounts close to each other, whereby original image reproduction can be efficiently made even by a limited number of decoders. Further, as change or addition of code is performed in the form of code data, the processing can be made at a high speed, and increment in code length is very small. Further, as the decoding load on the respective decoders can be uniformed. Further, even if the currently-processed frame is not a frame encoded by the Intraframe coding, upon occurrence of scene change, objects to be combined in interframe coding can be re-determined.

In the present embodiment, the difference vector size and the distance between objects are used for determination of objects to be combined, however, the determination may be made by only using the difference vector size. Further, in the present embodiment, the Shape code is encoded by the MMR coding, and the Texture code is encoded by the MPEG coding, however, the present invention is not limited to these coding methods.

Further, in the present embodiment, the function of the demultiplexer 9 may be incorporated into the object combiner 40. Further, the number of object decoders and the number of objects included in code data are not limited to those in the embodiment. As long as (s−d)≧2 holds, 2·(s−d) objects can be combined to (s−d) objects, from objects with the minimum difference vector size, or (s−d+1) objects can be combined into one object from objects with the minimum difference vector size, or combination between the former and latter cases may be employed.

In the present embodiment, the decoding apparatus having decoders to outputs decoded results has been described, however, if it is arranged such that code outputted from the object combiner 43 is temporarily stored into the storage device 50, and the code read out of the storage device 50 is decoded, object combining is unnecessary, and high-speed decoding (image reproduction) is possible.

Further, in the present embodiment, as the number of object decoders can be freely set, the number of object decoders can be easily increased so as to improve processing capability. Further, the motion calculation may be made by referring to the motion vectors of objects as well as referring to the location information of the objects.

Third Embodiment

Figure 19:
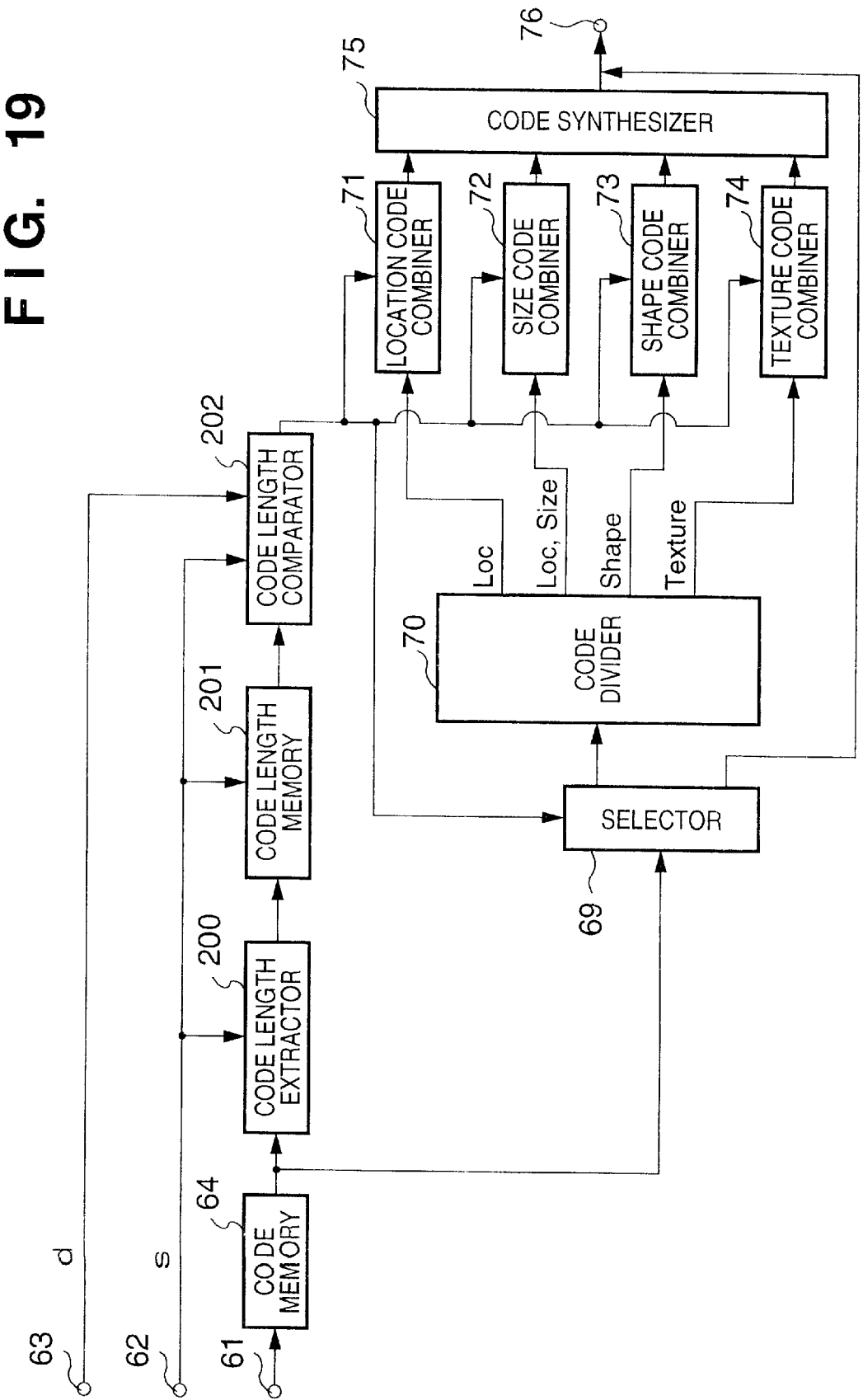
FIG. 19 is a block diagram showing the construction of the object combiner according to a third embodiment of the present invention.

FIG. 19 is a block diagram showing the construction of the object combiner 43 according to a third embodiment of the present invention. In FIG. 19, elements corresponding to those in FIG. 10 have the same reference numerals, and detailed explanations of the elements will be omitted.

A code length extractor 200 extracts code lengths of respective objects of code data stored in the code memory 64, and stores the extracted code lengths into a code length memory 201. A code length comparator 202 compares the respective code lengths of the objects, stored in the code length memory 201, with each other, then determines whether or not object combining is necessary, and determines objects to be combined.

Figure 20:
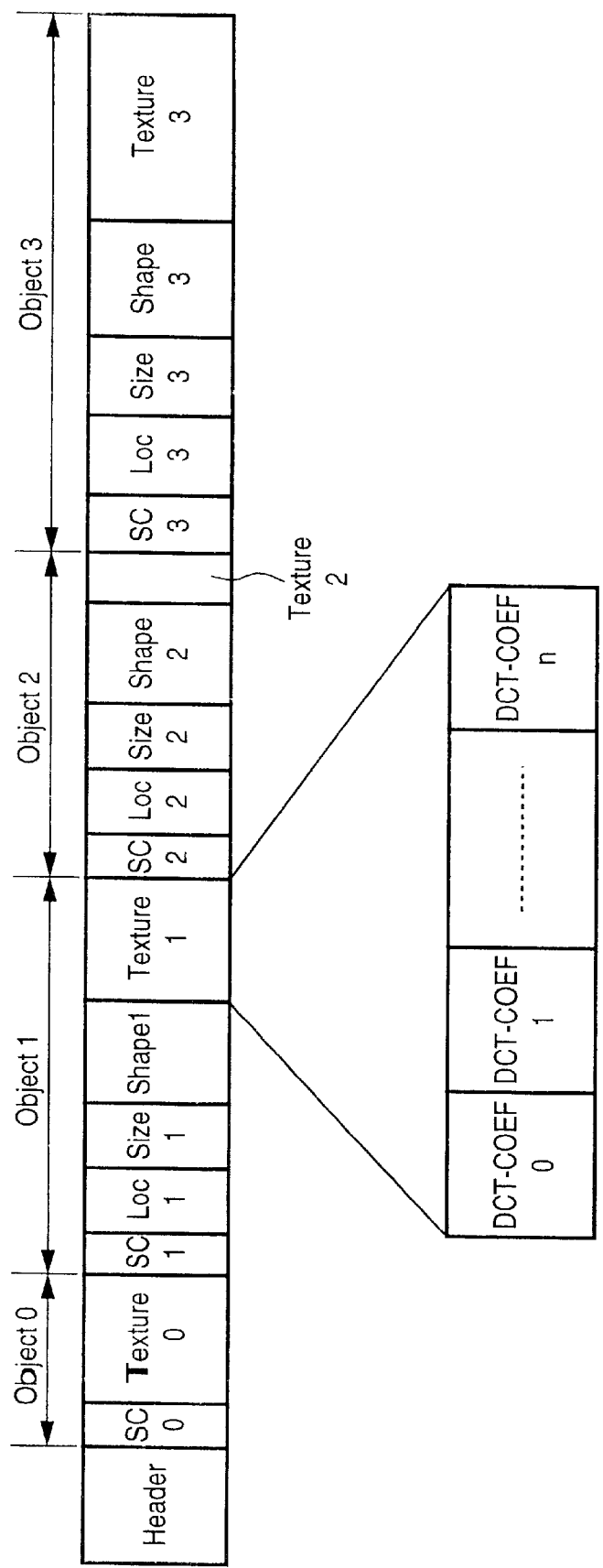
FIG. 20 is an example of input code data.
Figure 21:
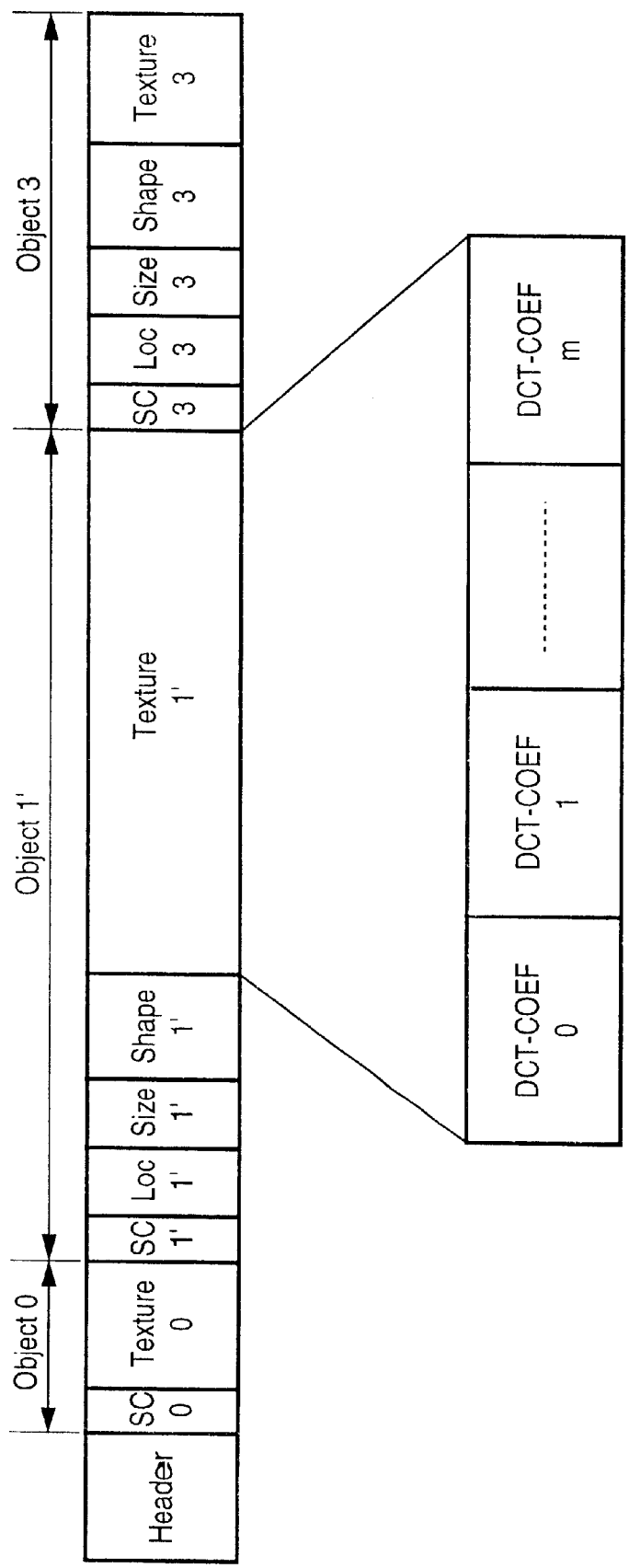
FIG. 21 is an example of processed code data.

If object combining is performed, objects to be combined are determined, sequentially from objects with short code lengths. For example, if the number s of objects is four (s=4), and the number d of object decoder is three (d=3), s−d=1 holds, accordingly, two objects having short code lengths are combined into one object. If the code data of the frame 20 in FIG. 1 is as shown in FIG. 20, the code data Object 2 of the object 22 is the minimum code data, and the code data Object 1 of the object 21 is the next minimum code data. In this case, the code data Object 1 and Object 2 are combined. The operations of other elements are the same as those in the above embodiments. From the terminal 76, code data as shown in FIG. 21 is outputted.

Then, the code data Object 1 and Object 2 as the code data of the object 21 and the object 22 are combined in all the frames. The details of the combining are as described in the above respective embodiments. Even a motion-compensation frame or a frame encoded by the Intraframe-coding of the MPEG coding or the like are included in the image data, the object combining is made in a similar manner to that in the above respective embodiments.

According to the present embodiment, similar advantages to those in the above respective embodiments can be obtained. Further, in case of still image as shown in FIG. 14A, a character image is encoded at a high compression rate by the MMR coding, and the resulting code length is short. Accordingly, if an image where character portions are combined as shown in FIG. 14B is handled as one object, similar advantages to those as above can be obtained in the still image in FIG. 14A.

Fourth Embodiment

In the MPEG coding or the like, a frame within which coding is performed (a frame encoded by the Intraframe-coding) and a frame encoded by using interframe correlation (a frame encoded by the Interframe-coding) are treated. The frame encoded by the Intraframe-coding is inserted to ensure synchronism or to prevent accumulation of DCT differences.

The present embodiment re-determines objects to be combined upon coding of Intraframe-coding frame.

Figure 22:
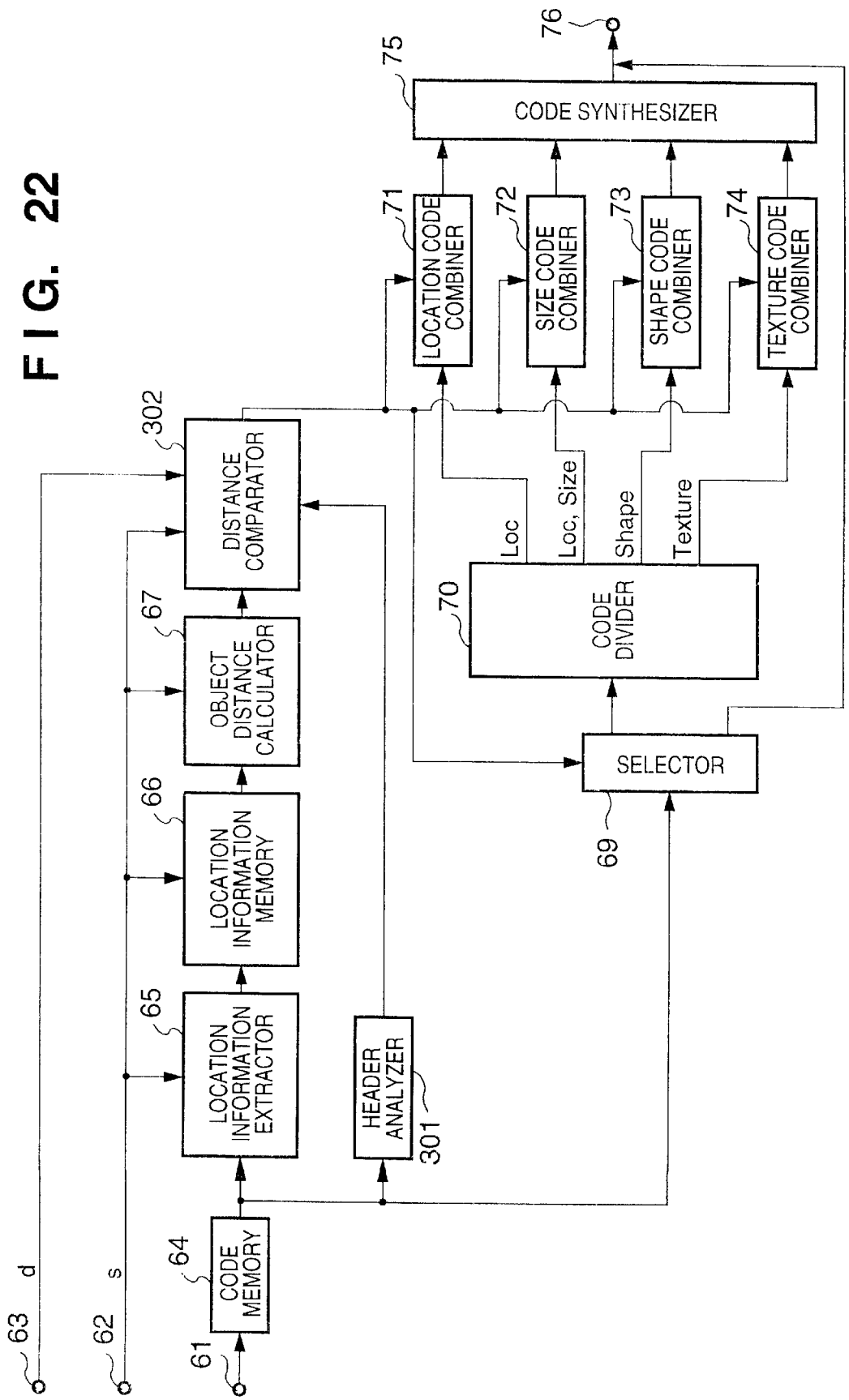
FIG. 22 is a block diagram showing the construction of the object combiner according to a fourth embodiment of the present invention.

FIG. 22 is a block diagram showing the construction of the object combiner 43 according to a fourth embodiment of the present invention. In FIG. 22, elements corresponding to those in FIG. 10 have the same reference numerals, and detailed explanations of the elements will be omitted.

Numeral 301 denotes a header analyzer which analyzes the header of each frame. Numeral 302 denotes a distance comparator having approximately the same operation as that of the distance comparator 68 in FIG. 10. As in the case of the first embodiment, prior to processing, the number s of objects and the number d of object decoders are inputted. If s≦d holds, code inputted into the terminal 61 is outputted from the terminal 76 without any processing.

On the other hand, if s>d holds, the header of code data for 1 frame, inputted from the terminal 61 and stored into the code memory 64, is inputted into the header analyzer 301. In the header with description of frame attribute, information indicating whether or not the frame is a frame encoded by the Interframe-coding, i.e., a frame to be encoded by using interframe correlation, is described. For example, the MPEG coding handles an I frame which is encoded within the frame without interframe correlation (by Intra coding), and a P and B frames encoded by using interframe correlation with motion-compensation.

When a frame encoded without interframe correlation is detected from the result of header analysis, the operation of the present embodiment is as follows. Code data is read out of the code memory 64. The location information extractor 65 extracts the Loc code following the SC of respective objects, and stores the extracted Loc code into the location information memory 66. The object distance calculator 67 obtains distances between the objects, and the distance comparator 302 selects, sequentially from objects with the shortest distance therebetween. Note that the procedure of selection is similar to that of the first embodiment. Information indicative of the selected objects are held in the distance comparator 302.

The information indicative of the selected objects held in the distance comparator 302 is updated only if a new instruction is inputted from the header analyzer 301, i.e., only if a frame encoded without interframe correlation has been newly detected.

On the other hand, in a frame encoded by using interframe correlation, object combining is performed in accordance with information indicative of selected objects held in the distance comparator 302, and code of a new object obtained by combining objects is outputted from the terminal 76, as in the case of the first embodiment.

In this manner, according to the present embodiment, objects to be combined are re-determined upon decoding of frame encoded by the Intraframe-coding, whereby change of coding efficiency by object combining can be suppressed. Even if a frame encoded by the Intraframe-coding is not detected, when scene change occurs, objects to be combined are re-determined, even with objects encoded by using interframe correlation. Regarding scene change, in a P frame, for example, if the number of macro blocks to be Intra-encoded is large, or in a B frame, if a frame where motion vectors are referred to greatly depends on its pervious or subsequent frame, it is determined that scene change has occurred.

According to the fourth embodiment, as in the case of the first embodiment, by re-determining objects to be combined in a frame encoded by the Intraframe-coding, change of coding efficiency due to object combining can be suppressed.

Modifications of First to Fourth Embodiments

Figure 23:
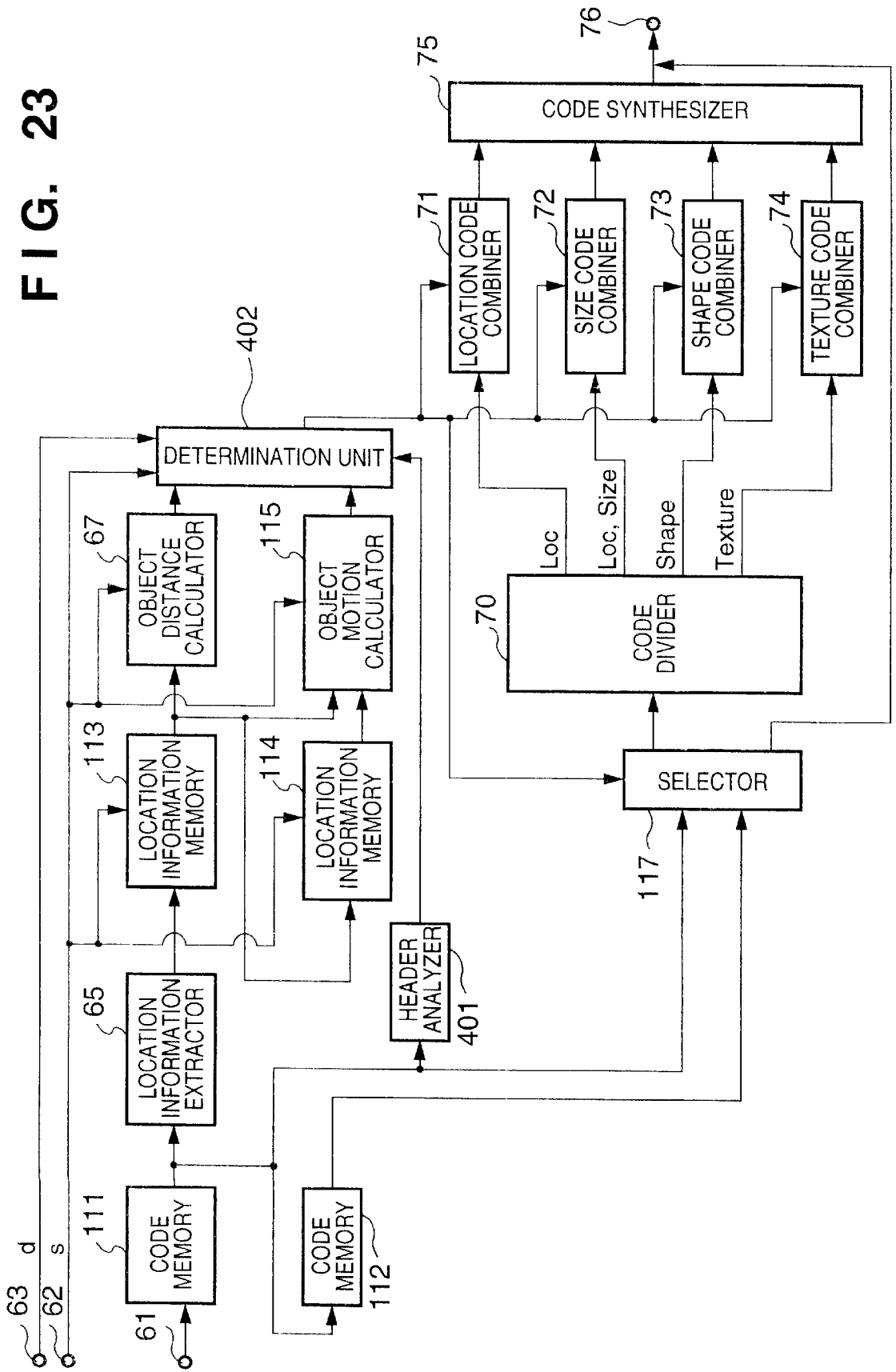
FIG. 23 is a block diagram showing the construction of the object combiner according to a modification.

As shown in FIG. 23, the header analyzer as described in the fourth embodiment can be added, as a header analyzer 401, to the construction in FIG. 16 of the second embodiment. That is, as a result of frame header analysis, if it is determined that the frame has been encoded without interframe correlation, a determination unit 402 determines objects to be combined, based on distances between objects outputted from the object distance calculator 67 and motions of objects outputted from the object motion calculator 115, as in the case of the second embodiment. Information indicative of objects to be combined is held in the determination unit 402, and only if an instruction is inputted from the header analyzer 401, the held content is updated.

Figure 24:
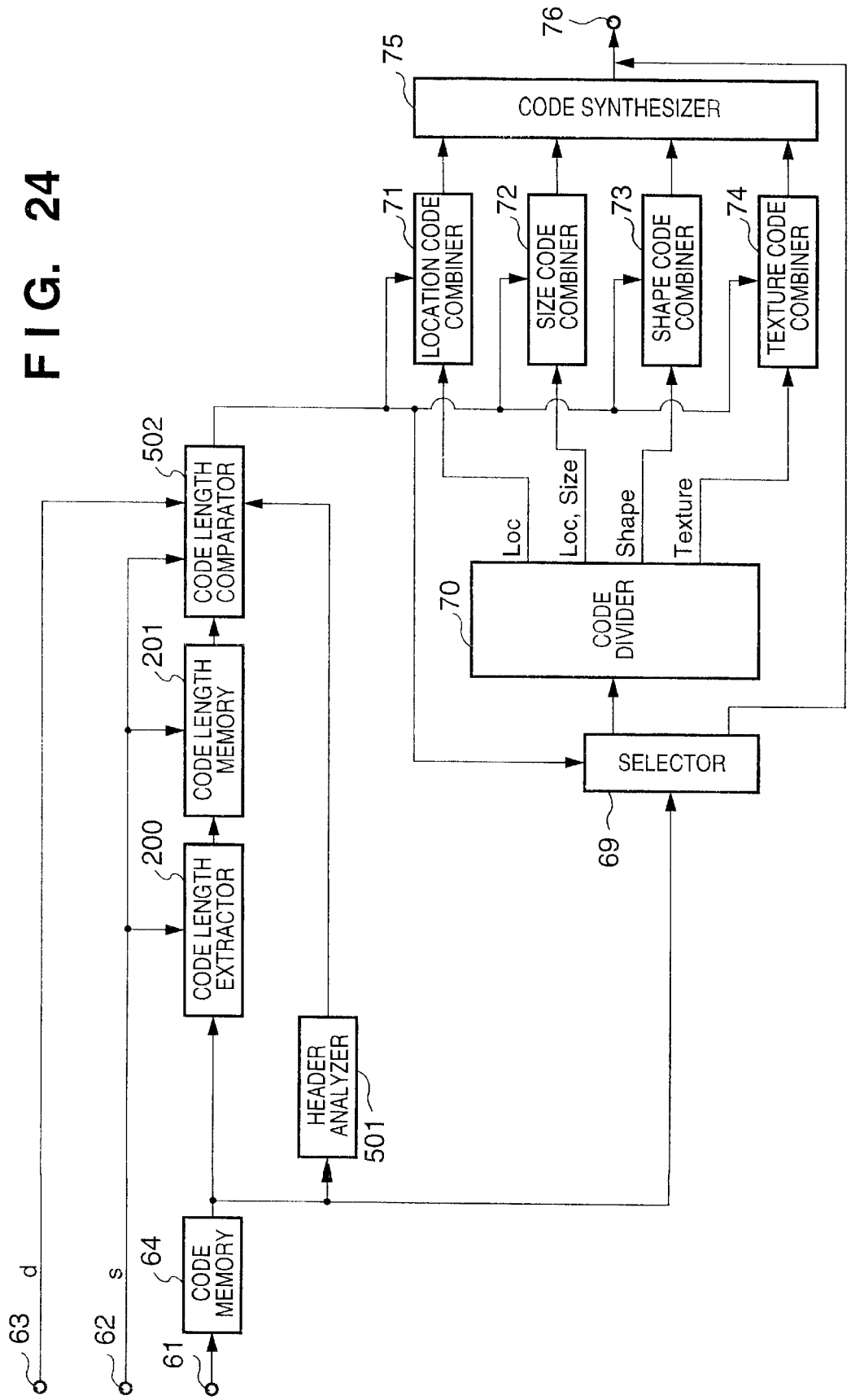
FIG. 24 is a block diagram showing the construction of the object combiner according to another modification.

As shown in FIG. 24, the header analyzer as described in the fourth embodiment can be added, as a header analysis 501, to the construction in FIG. 19 of the third embodiment. That is, as a result of frame header analysis, if it is determined that the frame has been encoded without interframe correlation, a code length comparator 502 determines objects to be combined, based on code lengths of respective objects, as in the case of the third embodiment. Information indicative of objects to be combined is held in the code length comparator 502, and only if an instruction is inputted from the header analyzer 501, the held content is updated.

According to the constructions in FIGS. 23 and 24, objects to be combined are re-determined upon decoding of frame encoded by the Intraframe-coding, whereby change of coding efficiency due to object combining can be suppressed.

Further, in the MPEG4 standard, handling of sound data as an object is studied. If a distance between sound sources of sound objects is regarded as a distance between objects, the first embodiment is applicable, and if the movement of sound source is object motion, the second embodiment is applicable. In use of code lengths of respective objects, the third embodiment is applicable. Thus, the above-described respective embodiments are applicable to coding of sound including audio information.

As described above, the first to fourth embodiments provide decoding apparatus and method which decode all the objects even if the number of decoders is limited.

Further, the embodiments provide decoding apparatus and method which decode a coded still image without degrading the image quality even if the number of decoders is limited.

Further, the embodiments provide decoding apparatus and method which decode a coded moving image without degrading the image quality even if the number of decoders is limited.

Fifth Embodiment

[Construction]

Figure 29:
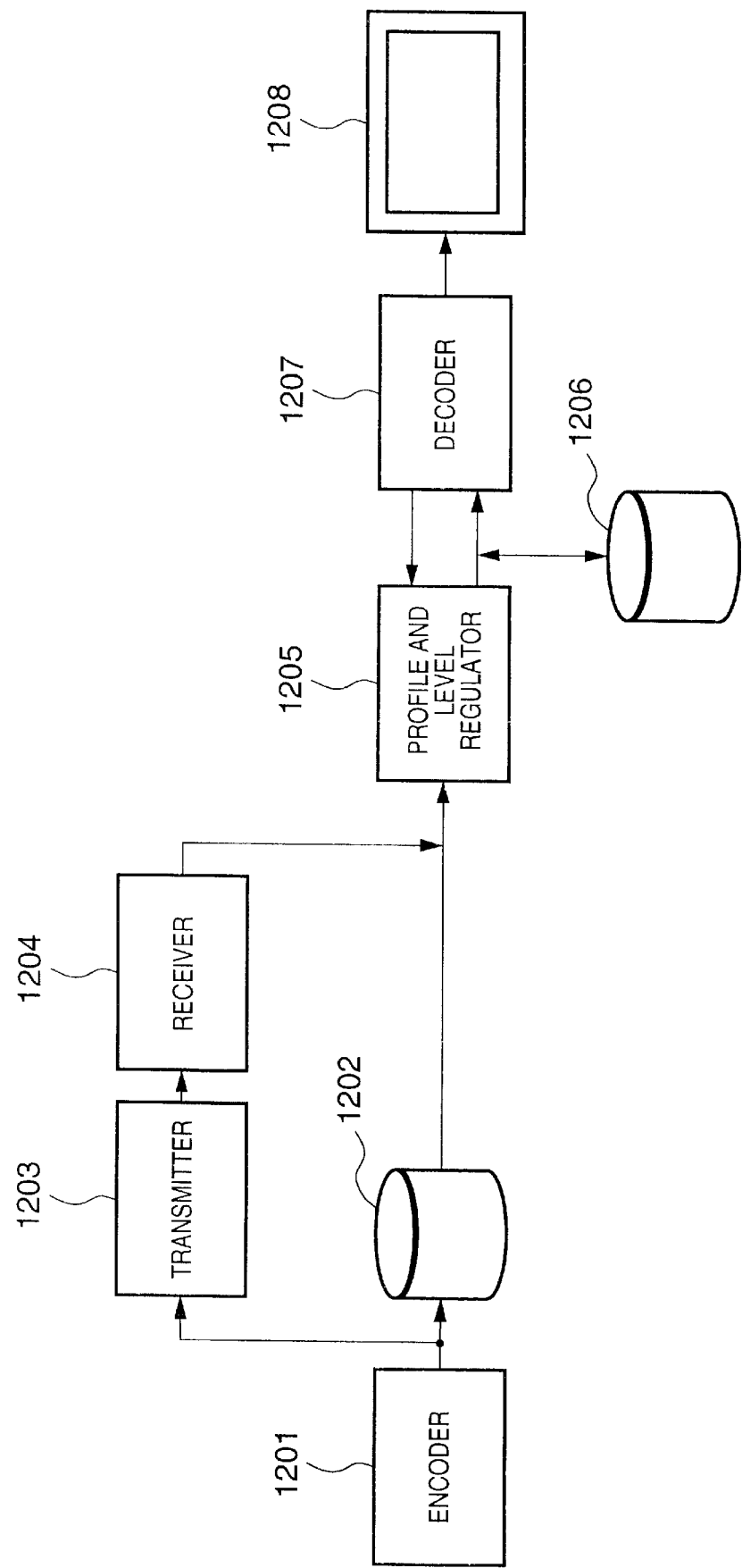
FIG. 29 is a block diagram showing the construction of a moving image processing apparatus according to a fifth embodiment of the present invention.

FIG. 29 is a block diagram showing the construction of a moving image processing apparatus according to a fifth embodiment of the present invention. In the present embodiment, the MPEG4 coding is used as a moving image coding method. Note that the coding method of the present embodiment is not limited to the MPEG4 coding, but any other coding method can be employed as long as it respectively encodes a plurality of objects within an image.

In FIG. 29, numeral 1201 denotes an encoder which inputs a moving image and encodes the image by the MPEG4 coding of Core profile and level 2. Numeral 1202 denotes a storage device used for storing coded moving image data. The storage device 1202 comprises a magnetic disk, an magneto-optic disk or the like. As the storage device 1202 is removably attached to the moving image processing apparatus, coded moving image data can be read in another apparatus. Numeral 1203 denotes a transmitter which transmits encoded moving image data to a LAN or a communication line, and performs broadcasting or the like; 1204, a receiver which receives code data outputted from the transmitter 1203; 1205, a profile and level regulator to which the present invention is applied; 1206, a storage device used for storing output from the profile and level regulator 1205; 1207, a decoder which decodes code data encoded by the MPEG4 coding of Core profile and level 1; and 1208, a display unit which displays a moving image decoded by the decoder 1207. Note that as described above, the encoder 1201 performs coding of Core profile and level 2, and in this example, to simplify the explanation, the encoder 1201 performs coding at a bit rate of 384 kbps.

Figure 43:
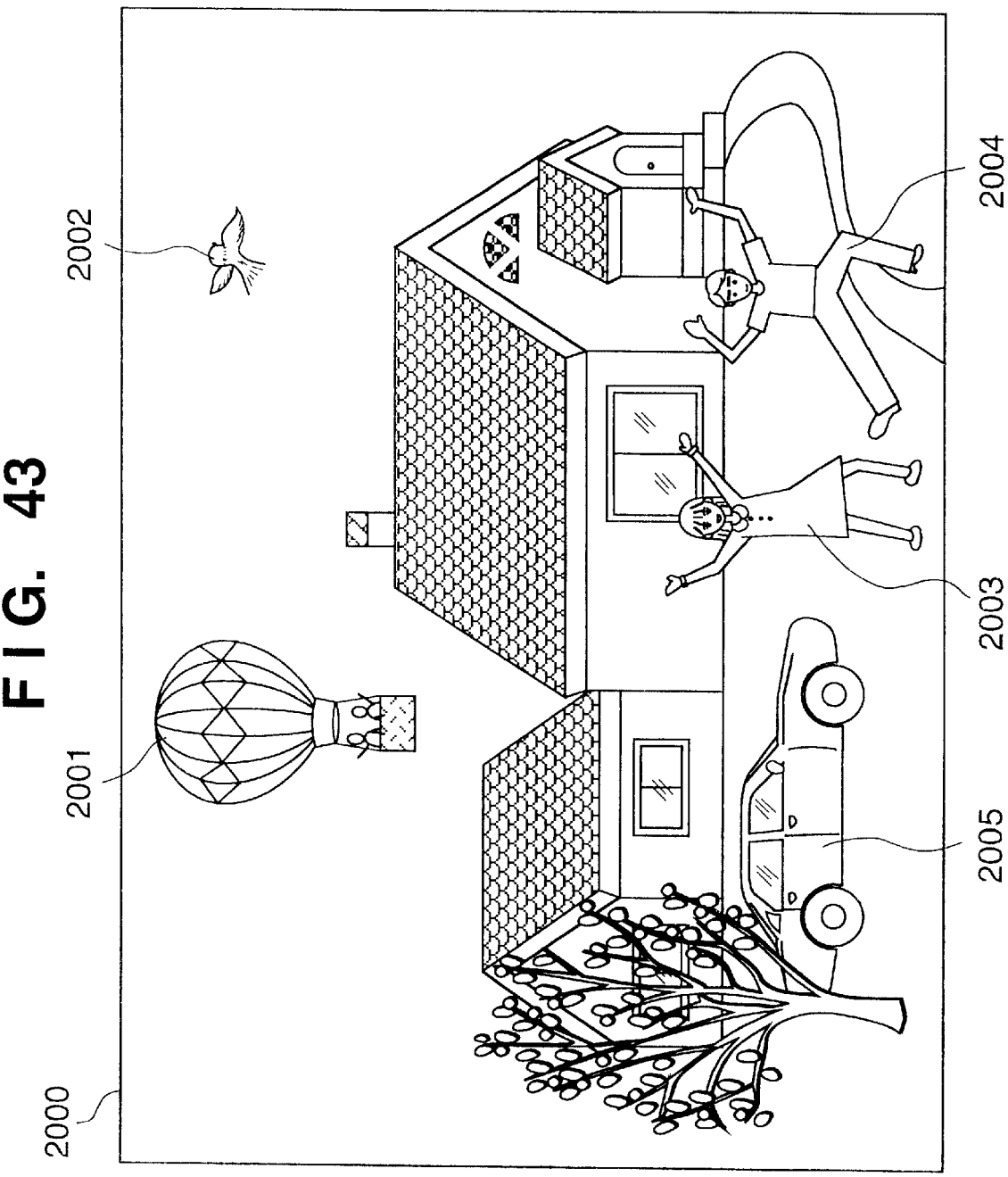
FIG. 43 is an example of the construction of an image represented by code data.

FIG. 43 shows an example of an image to be encoded. In FIG. 43, respective numerals denote objects. An object 2000 represents background; an object 2001, a balloon moving in the air; an object 2002, a bird; objects 2003 and 2004, a woman and a man.

FIG. 31A shows a bit stream when the image in FIG. 43 is encoded. The bit stream has an arrangement information α indicative of location information of objects 2000 to 2004 at its head. Actually, the arrangement information α is encoded in BIFS (Binary Format for Scene description) language to describe scene construction information, and the arrangement information α is multiplexed. Then, VOSSC, Visual Object data α-1, α-2, α-3 and VOSEC follow. The code data in FIG. 31A is stored into the storage device 1202 or transmitted via the transmitter 1203. The code data is inputted via the storage device 1202 or the receiver 1204, into the profile and level regulator 1205 as a characteristic element of the present invention. The profile and level regulator 1205 also inputs the status of the decoder 1207.

Figure 30:
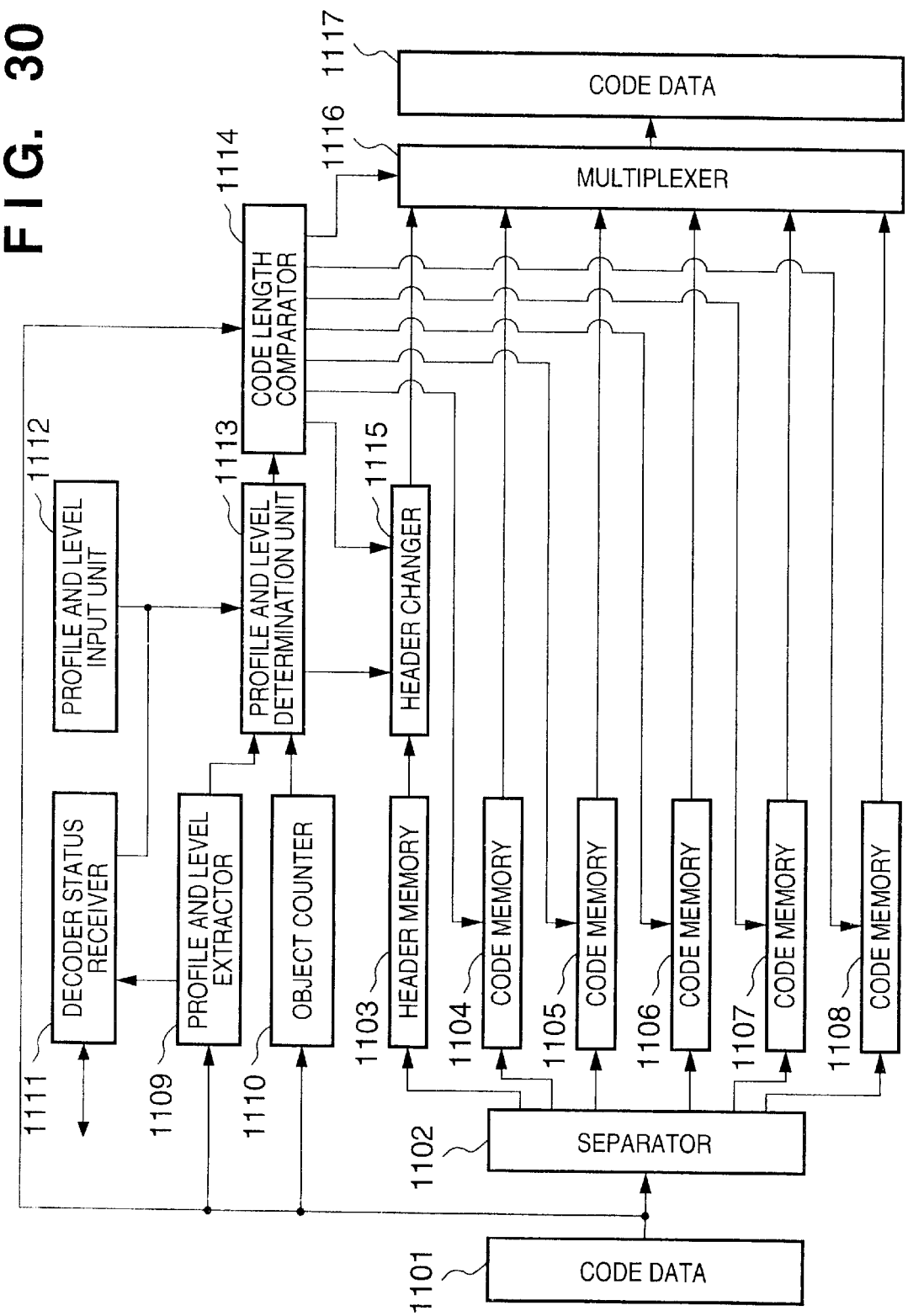
FIG. 30 is a block diagram showing the construction of a profile and level regulator according to the fifth embodiment.

FIG. 30 is a block diagram showing the detailed construction of the profile and level regulator 1205. In FIG. 30, numeral 1101 denotes the code data shown in FIG. 31A; 1102, a separator which separates the code data 1101 into code data indicative of arrangement information and header information, and code data indicative of respective objects; 1103, a header memory for storing code data indicative of separated arrangement information and header information; 1104 to 1108, code memories for storing code data for respective objects; 1109, a profile and level extractor which extracts the PLI code from the code data 1101, and extracts information on the profile and level; and 1110, an object counter which counts the number of objects included in the code data 1101.

Numeral 1111 denotes a decoder status receiver which obtains coding specifications (profile and level) of the decoder 1207 and other conditions; and 1112, a profile and level input unit through which arbitrary profile and level are set from a terminal (not shown) or the like; 1113, a profile and level determination unit which compares outputs from the profile and level extractor 1109 and the object counter 1110 with profile and level information inputted from the decoder status receiver 1111 or the profile and level input unit 1112, and determines whether or not the number of objects must be regulated.

Numeral 1114 denotes a code length comparator which determines the order of code lengths of objects by counting the code lengths of objects when the code data 1101 is inputted and comparing the code lengths with each other; 1115, a header changer which changes the content of header information stored in the header memory 1103, based on the outputs from profile and level determination unit 1113 and the code length comparator 1114; 1116, a multiplexer which multiplexes code data read from the code memories 1104 to 1108 based on the output from the header changer 1115 and the results of comparison by the code length comparator 1114; and 1117, code data outputted as a result of profile and level regulation.

[Regulation of Profile and Level]

Hereinbelow, the processing in the profile and level regulator 1205 having the above construction will be described in detail.

The code data 1101 is inputted into the separator 1102, the profile and level extractor 1109, the object counter 1110 and the code length comparator 1114. The separator 1102 separates the code data 1101 into code data indicative of arrangement information and header information, and code data indicative of respective objects, and stores the respective code data into the header memory 1103 and the code memories 1104 to 1108. For example, the object arrangement information α, VOSSC, Visual Object SC, the respective code immediately prior to the VO data A, and the header information of VOL and VOP data in FIG. 25, and the like, are stored in the header memory 1103. Further, the VOL and VOP data for the respective object, where the header information is removed, are stored in the code memories 1104 to 1108. These data are stored independently such that the header-removed part is clearly indicated. For example, in the image in FIG. 43, as the number of objects is five, the code data of the objects 2000 to 2004 (VO data A to E in FIG. 31A) are respectively stored into the code memories 1104 to 1108.

At the same time, the object counter 1110 counts the number of objects included in the code data 1101. Then the code length comparator 1114 measures code lengths of the respective objects.

The profile and level extractor 1109 extracts PLI-α from the code data 1101 and decodes it, to extract information on the profile and level of the code data 1101. At the same time of extraction, the decoder status receiver 1111 operates, to obtain information on the profile, level and the like, decodable by the decoder 1207. These information may be set by the user via the profile and level input unit 1112.

The profile and level determination unit 1113 compares the profile and level information, obtained from the decoder 1207, or set by the user, with the result of extraction by the profile and level extractor 1109. If the obtained or set profile and level are higher than or equal to those extracted from the code data 1101, the profile and level determination unit 1113 does not operate the header changer 1115. Then, the contents of the header memory 1103 and the code memories 1104 to 1108 are read in the order of input, and multiplexed by the multiplexer 1116. Thus, code data 1117 is generated. That is, the contents of the code data 1117 are the same as that of the code data 1101.

On the other hand, if the profile and level obtained from the decoder 1207 or set by the user are lower than the profile and level extracted from the code data 1101, the profile and level determination unit 1113 inputs the number of objects included in the code data 1101 from the object counter 1110, and compares the number of objects with the number of decodable objects, determined from the obtained or set profile and level information.

If the number of objects obtained by the object counter 1110 is less than the number of decodable objects, the code data 1117 is generated, as in the case of the above-described case where the obtained or set profile and level are higher than or equal to those extracted from the code data 1101.

On the other hand, if the number of objects obtained by the object counter 1110 is greater than the number of decodable objects, the number of decodable objects is inputted into the code length comparator 1114, and the code lengths are compared with each other. The code length comparator 1114 sets objects to be decoded, from an object having the longest code length. That is, the objects are decoded sequentially from the object having the longest code length. For example, in FIG. 31A, if the code length of video object becomes shorter, in the order in which the VO data A, the VO data D, the VO data C, the VO data E, and the VO data B appear, as the decoder 1207 performs decoding of Core profile and level 1, it can decode to a maximum of four objects. Accordingly, the code length comparator 1114 disables reading of the VO data B from the code memory 1106, and enables reading from the code memories 1104, 1105, 1107 and 1108.

Then the profile and level determination unit 1113 operates the header changer 1115 to change the content of PLI in correspondence with the decoder 1207, then, coding is performed. In this manner, header information on undecodable (deleted) object (VO data B in this case) by the decoder 1207 is deleted, based on the result of comparison by the code length comparator 1114. That is, the header information of the code data 1101 is rewritten with contents corresponding to the decoding capability of the decoder 1207 or the set profile and level. Further, arrangement information on the object 2002 corresponding to the deleted object (VO data B) is deleted from the arrangement information α, and new arrangement information β is generated.

Then, the contents of the header changer 1115 and the code memories 1104, 1105, 1107 and 1108 are read in the order of input, and multiplexed by the multiplexer 1116, thus the code data 1117 is generated. FIG. 31B shows a bit stream of the code data 1117. In FIG. 31B, the newly generated arrangement information β is provided at the head of the bit stream, then, VOSSC, Visual Object data β-1, β-2, β-3, and VOSEC follow. The Visual Object data β-1, β-2 and β-3 are obtained by regulating the number of objects with respect to the original Visual Object data α-1, α-2 and α-3 in FIG. 31A. For example, the Visual Object data β-1 comprises the Visual Object SC positioned at the head, PLI-β indicative of the profile and level corresponding to the decoder 1207, and code data where the code data (VO data B) on the object 2002 is deleted.

Figure 44:
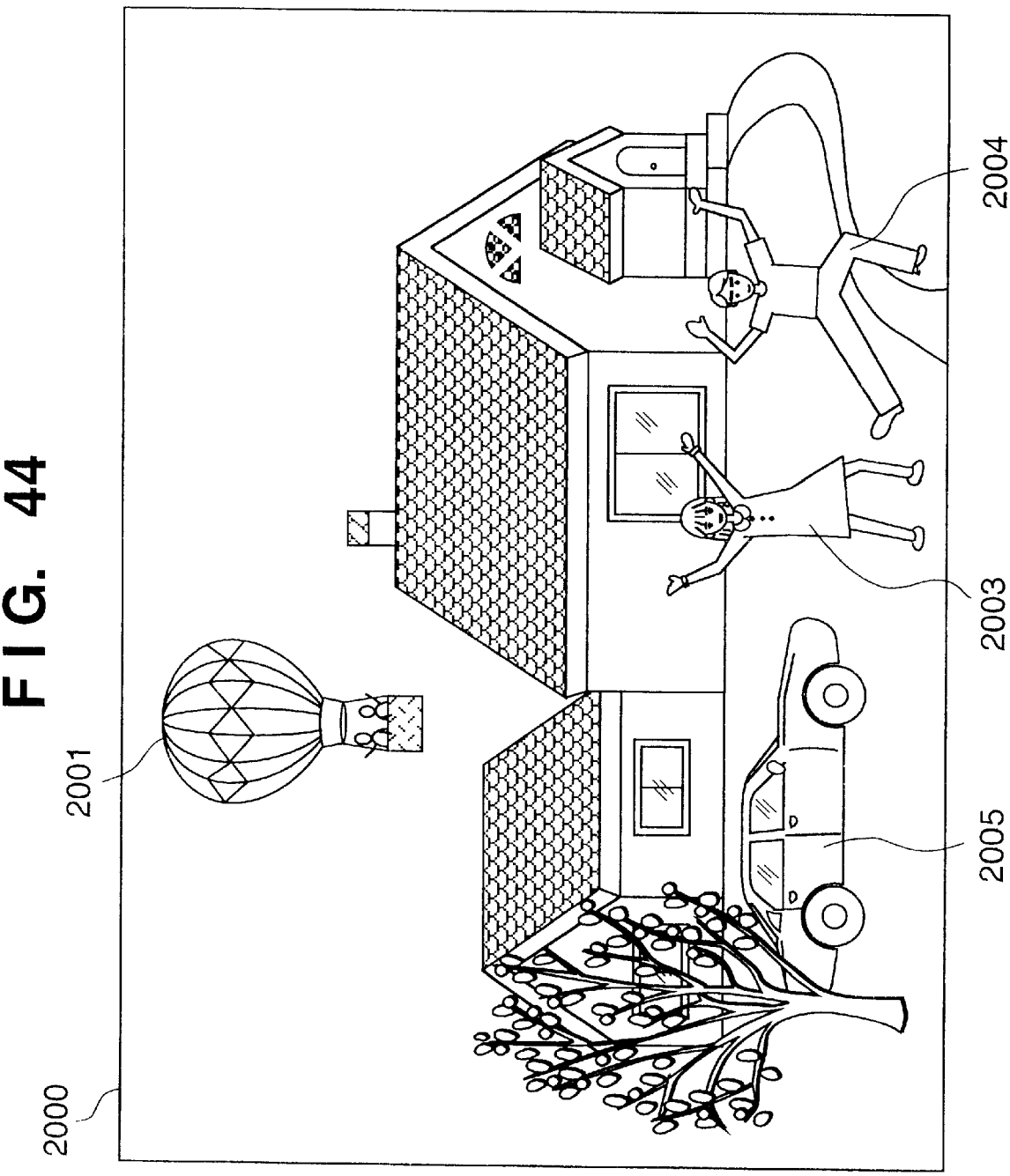
FIG. 44 is an example of the construction of an image represented by code data.

The code data 1117 obtained as above is stored into the storage device 1206, or decoded by the decoder 1207 and displayed on the display unit 1208. FIG. 44 shows a displayed image, represented by the decoded code data 1117. In FIG. 44, the object 2002, representing the bird in the image as the object of encoding in FIG. 43, is deleted.

Note that in the above description, the code length comparator 1114 directly counts the code lengths from the code data 1101, however, the code length comparator 1114 may count the code lengths based on the code data stored in the code memories 1104 to 1108.

As described above, according to the present embodiment, even if the coding specifications (profile and/or level) of a decoder are different from those of an encoder, code data can be decoded. Further, by deleting object data having the shortest code length, selection of object to be deleted is facilitated, and the influence on a decoded image can be suppressed as much as possible.

Further, even if the number of objects decodable by the decoder 1207 is less than the number defined by the coding specifications of the code data 1101, as the decoder status receiver 1111 obtains the number of actually decodable objects, similar advantages can be attained.

In addition, even when code data having coding specifications higher than or equal to those of the decoder 1207 is inputted, by deleting object(s) to reduce the bit rate, decoding by the decoder 1207 can be performed.

Sixth Embodiment

Hereinbelow, a sixth embodiment of the present invention will be described. Note that the general construction of the moving image processing apparatus according to the sixth embodiment is similar to that in FIG. 29 of the above-described fifth embodiment, therefore, an explanation of the construction will be omitted.

Figure 32:
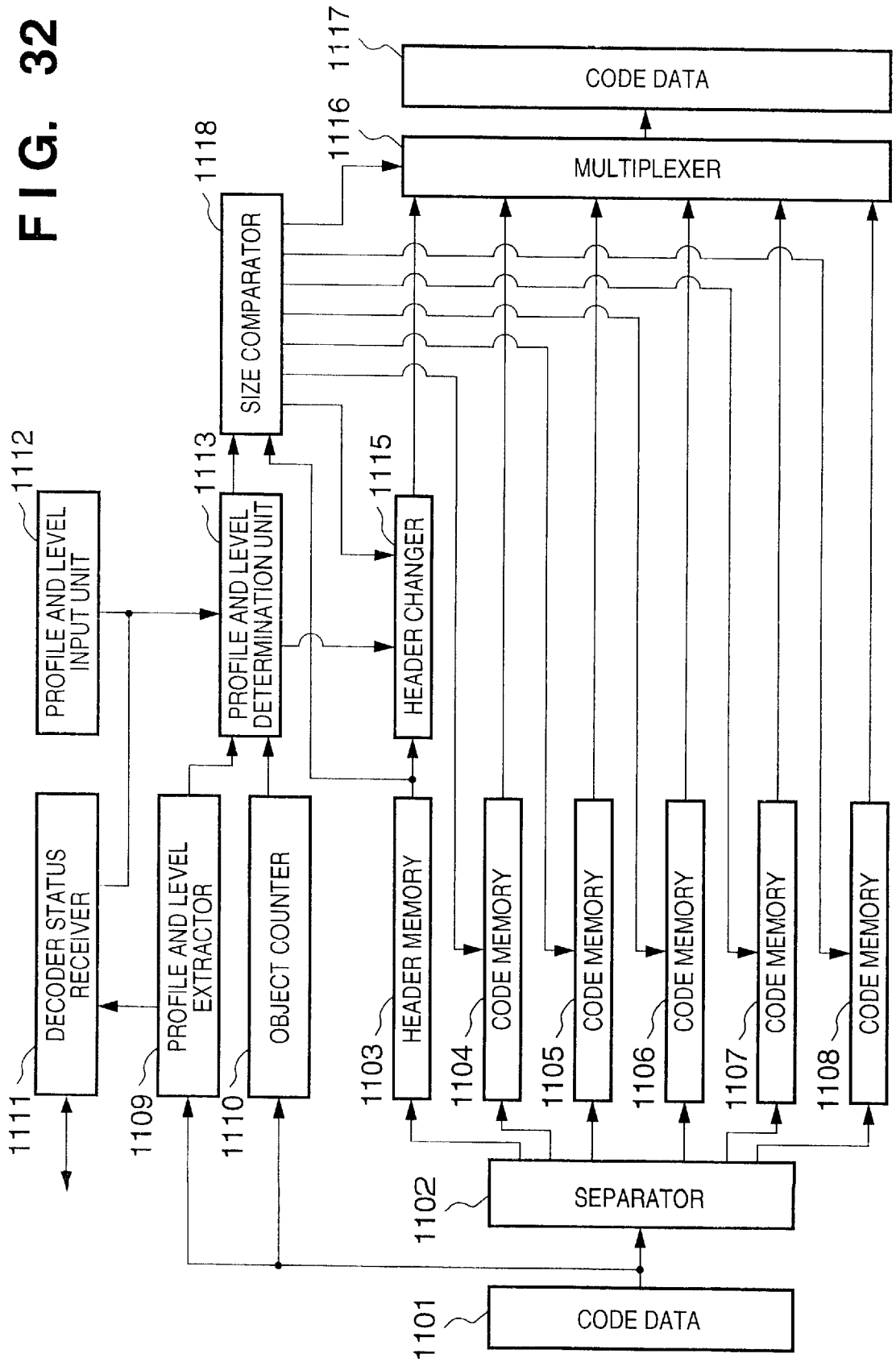
FIG. 32 is a block diagram showing the construction of the profile and level regulator according to a sixth embodiment of the present invention.

FIG. 32 is a block diagram showing the construction of the profile and level regulator 1205 according to the sixth embodiment of the present invention. In FIG. 32, elements corresponding to those in FIG. 30 have the same reference numerals and explanations of the elements will be omitted. In the sixth embodiment, the MPEG4 coding is employed as a moving image coding method, however, any other coding method is applicable as long as it encodes a plurality of objects within an image.

In FIG. 32, numeral 1118 denotes a size comparator which extracts sizes of respective objects from the header memory 1103 and compares the sizes with each other.

As in the case of the fifth embodiment, the code data 1101 is inputted into the separator 1102, the profile and level extractor 1109, the object counter 1110 and the code length comparator 1114, and the respective code data are stored into the header memory 1103 and the code memories 1104 to 1108. At the same time, the object counter 1110 counts the number of objects included in the code data.

Figure 25:
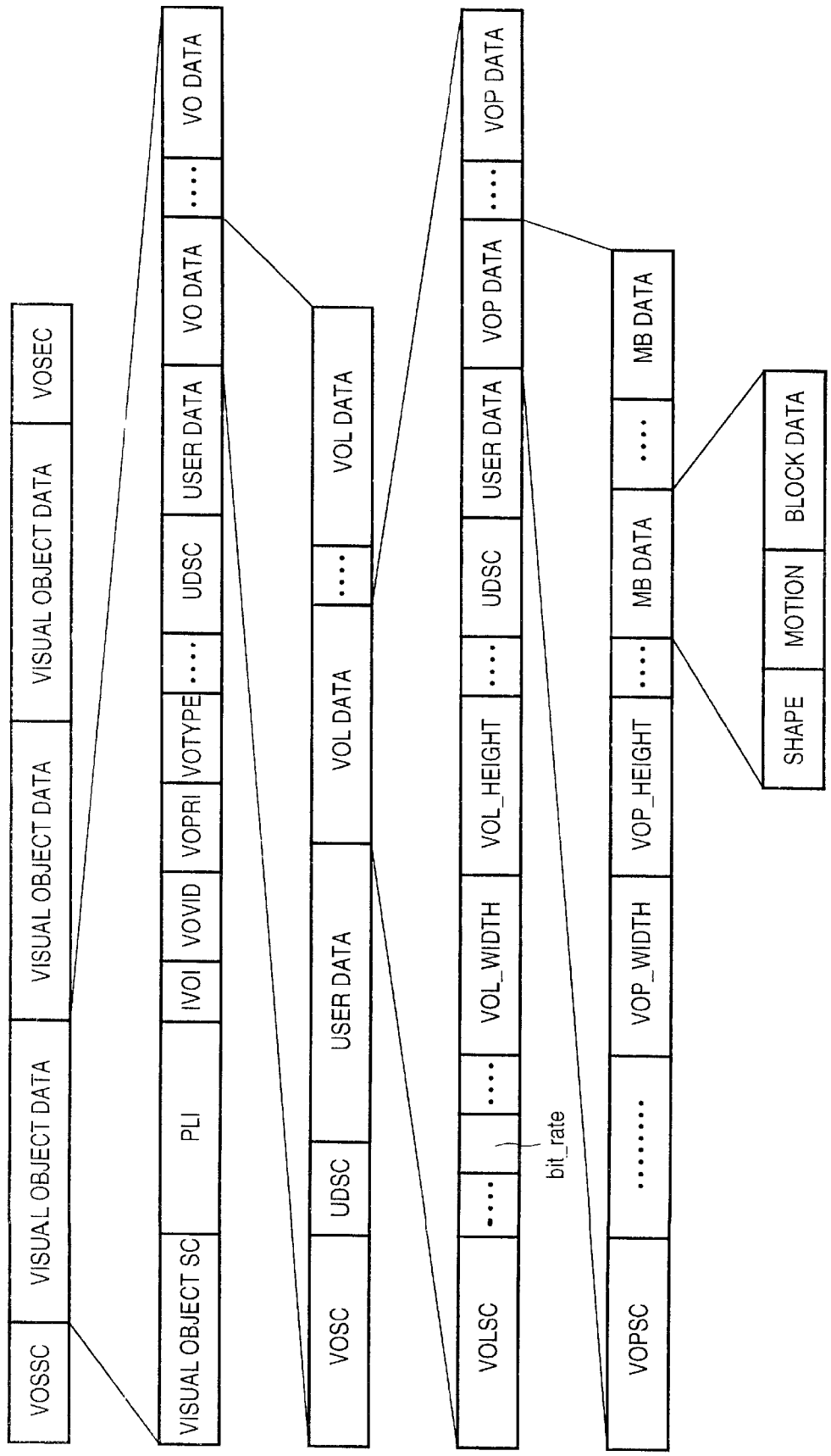
FIG. 25 is an example of the structure of object code data.
Figure 26:
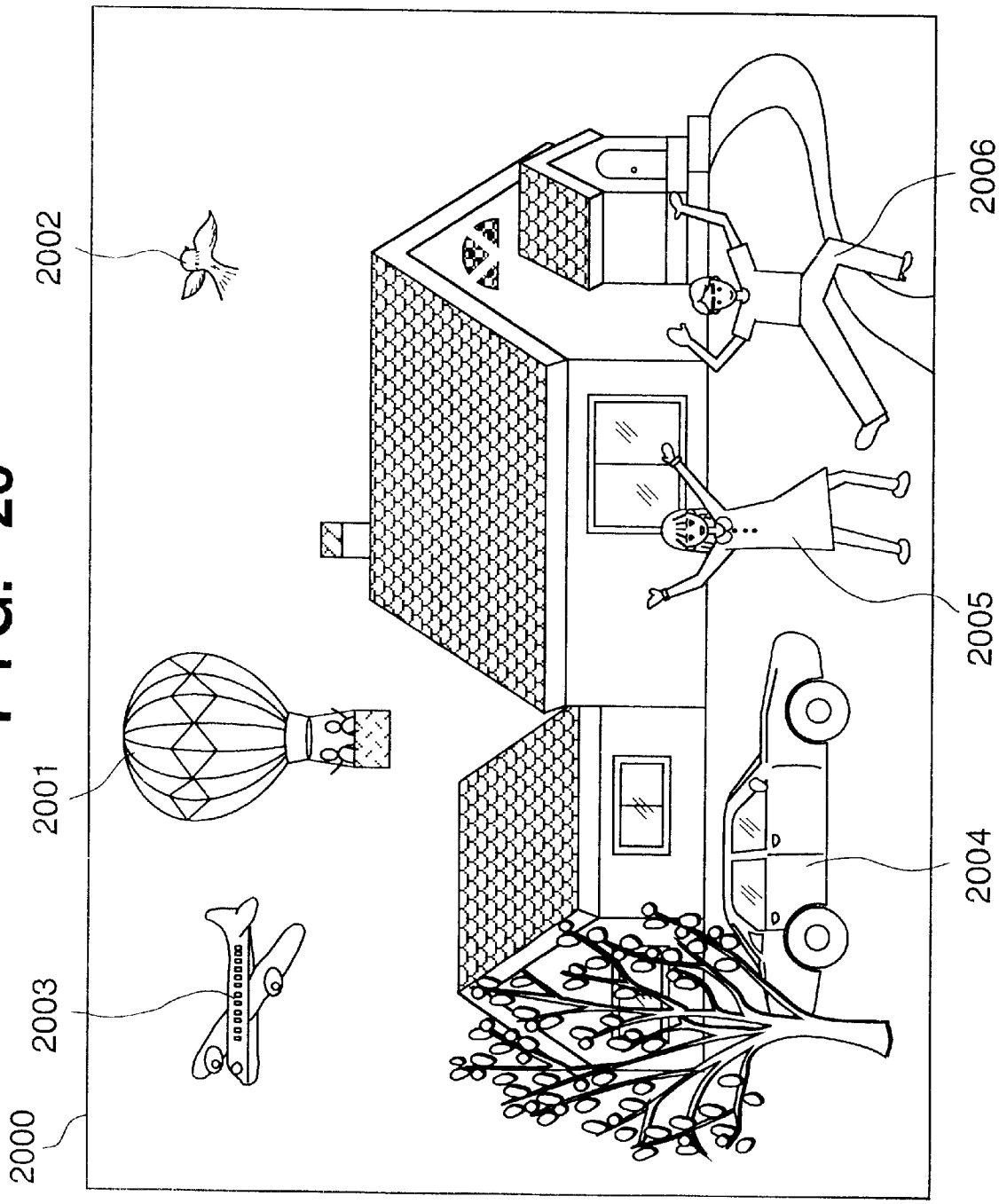
FIG. 26 is an example of the image constructed with a plurality of objects.
Figure 27:
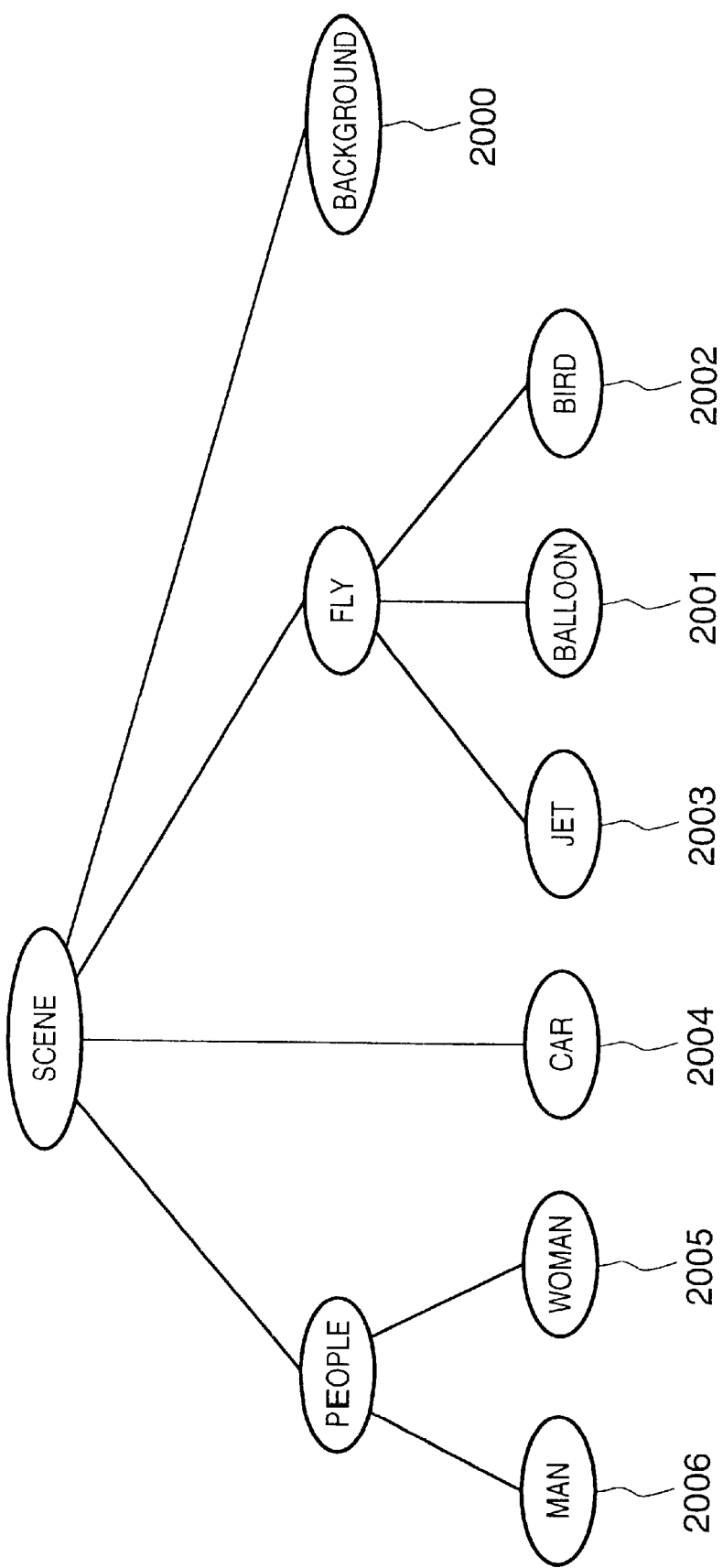
FIG. 27 is an example of a node tree in the image in FIG. 26.

The size comparator 1118 extracts an image size of each object, by extracting the respective VOL__width and VOL__height code in the bit stream structure in FIG. 25 and decoding the extracted codes.

Then, as in the case of the fifth embodiment, the profile and level extractor 1109 extracts information on the profile and level from the code data 1101, and at the same time, information on profile and level and the like of the decoder 1207 is obtained from the decoder status receiver 1111, or the profile and level are set by the user from the profile and level input unit 1112.

The profile and level determination unit 1113 compares the profile and level information obtained from the decoder 1207 or set by the user, as described above, with the result of extraction by the profile and level extractor 1109. If the obtained or set profile and level are higher than or equal to the profile and level extracted from the code data 1101, profile and level determination unit 1113 does not operate the header changer 1115. Then, the code data 1117 similar to the code data 1101 is generated.

On the other hand, if the profile and level obtained from the decoder 207 or set by the user are lower than the profile and level extracted from the code data 1101, the profile and level determination unit 1113 inputs the number of objects included in the code data 1101 from the object counter 1110, and compares the input number with the number of decodable objects determined from the obtained or set profile and level.

Then, if the number of objects obtained by the object counter 1110 is less than the number of decodable objects, the code data 1117 is generated as in the above-described case where the obtained or set profile and level are higher than or equal to those of the code data 1101.

On the other hand, if the number of objects obtained by the object counter 1110 is greater than the number of decodable objects, the number of decodable objects is inputted into the size comparator 1118, and size comparison is performed. The size comparator 1118 sets a plurality of objects of the code data 1101, sequentially from the largest image size, as objects to be decoded. That is, the objects are decodable, sequentially from the largest image size. For example, in FIG. 43, in the image sizes of the respective objects, the image size becomes smaller in the order in which the objects 2000, 2004, 2001, 2003 and 2002 appear. As the decoder 1207 performs decoding Core profile and level 1, it can decode to a maximum of four objects. Accordingly, in the image in FIG. 43, except the smallest object 2002, the other four objects can be decoded. The size comparator 1118 disables reading of the code data of the object 2002 from the code memory 1106, and enables reading from the code memories 1104, 1105, 1107 and 1108.

Then, as in the case of the fifth embodiment, the profile and level determination unit 1113 operates the header changer 1115 to change the content of PLI in correspondence with the decoder 1207, then, coding is performed. Further, header information on the undecodable (deleted) object (object 2002 in this case) by the decoder 1207 is deleted, based on the result of comparison by the size comparator 1118. Further, arrangement information on the deleted object 2002 is deleted from the arrangement information α, and new arrangement information β is generated.

Then, the contents of the header changer 1115 and the code memories 1104, 1105, 1107 and 1108 are read in the order of input, and multiplexed by the multiplexer 1116, thus the code data 1117 is generated. FIG. 31B shows a bit stream of the code data 1117 at this time.

The code data 1117 obtained as above is stored into the storage device 1206, or decoded by the decoder 1207 and displayed, as an image as shown in FIG. 44, on the display unit 1208.

Note that in the above description, the size comparator 1118 extracts image sizes of objects based on the VOL__width and VOL__height code of the code data 1101, however, the size comparator 1118 may extract the image sizes based on the VOP__width and VOP__height code, or based on shape (mask) information obtained by decoding code data indicative of shape (mask) information.

As described above, according to the sixth embodiment, even if the coding specifications of a decoder are different from those of an encoder, code data can be decoded. Further, by deleting object data having the minimum image size, selection of object to be deleted is facilitated, and the influence on a decoded image can be suppressed as much as possible.

Note that in the fifth and sixth embodiments, only one object is deleted, however, two or more object can be deleted. Further, it may be arranged such that the user directly designates object(s) to be deleted.

Further, it may be arranged such that the order of deletion is set for the respective objects of image in advance by the profile and level input unit 1112.

Seventh Embodiment

Hereinbelow, a seventh embodiment of the present invention will be described. Note that the general construction of the moving image processing apparatus according to the seventh embodiment is similar to that in FIG. 29 of the fifth embodiment, therefore, an explanation of the construction will be omitted.

Figure 33:
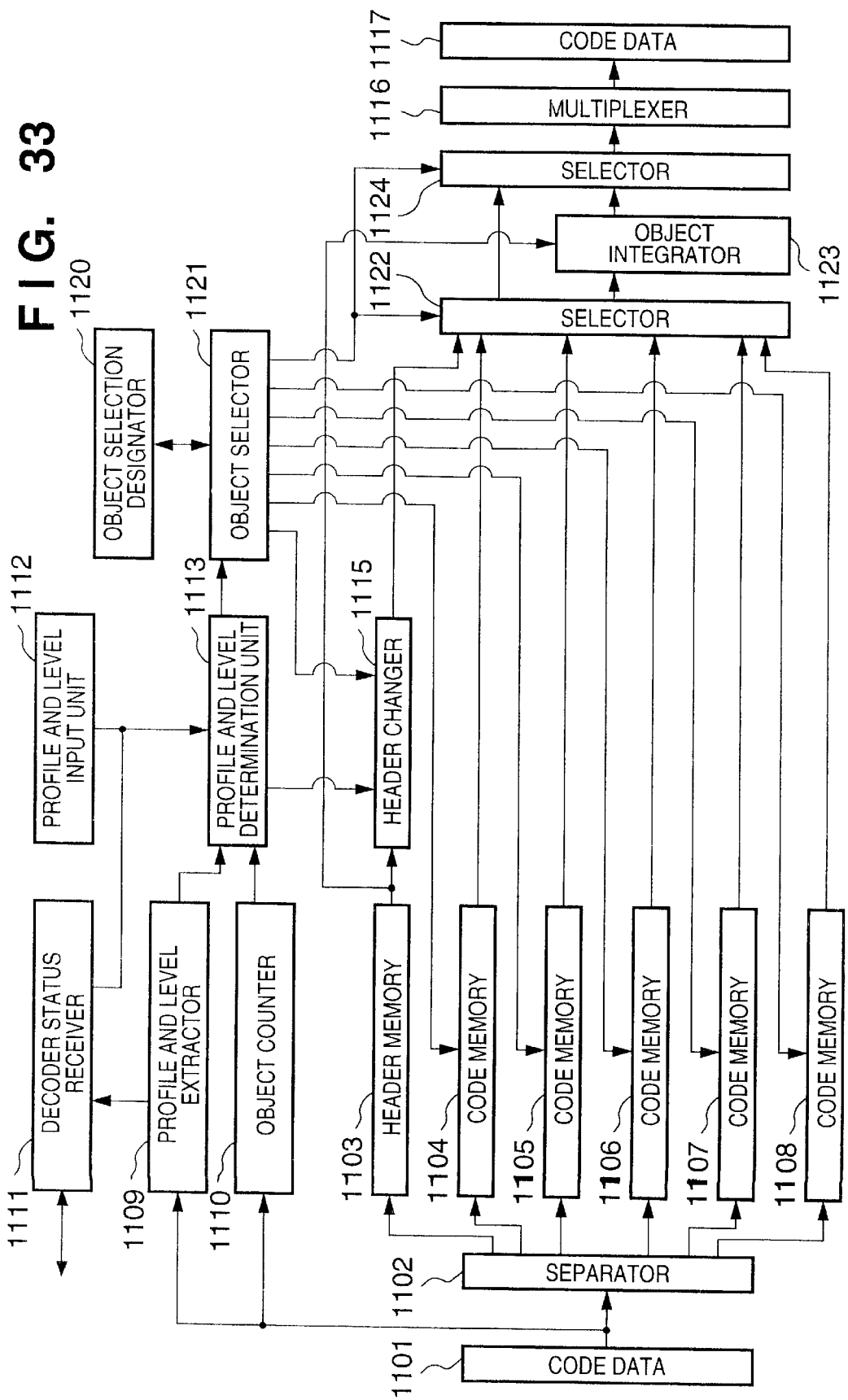
FIG. 33 is a block diagram showing the construction of the profile and level regulator according to a seventh embodiment of the present invention.

FIG. 33 is a block diagram showing the detailed construction of the profile and level regulator 1205 according to the seventh embodiment of the present invention. In FIG. 33, elements corresponding to those in FIG. 30 have the same reference numerals and explanations of the elements will be omitted. In the seventh embodiment, the MPEG4 coding is employed as a moving image coding method, however, any other coding method is applicable as long as it encodes a plurality of objects within an image.

In FIG. 33, numeral 1120 denotes an object selection designator which displays a plurality of objects, and in which the user's designation of arbitrarily selected objects is inputted; 1121, an object selector which selects code data of objects to be processed, based on designation from the object selection designator 1120, and the result of determination by the profile and level determination 1113; 1122 and 1124, selectors, controlled by the object selector 1121, which switch their input and output; and 1123, an object integrator which integrates a plurality of objects.

As in the case of the above-described fifth embodiment, the code data 1101 is inputted into the separator 1102, the profile and level extractor 1109 and the object counter 1110. The separator 1102 separates the code data 1101 into code data indicative of arrangement information and header information and code data indicative of respective objects. The respective code data are stored into the header memory 1103 and the code memories 1104 to 1108. At the same time, the object counter 1110 counts the number of objects included in the code data 1101.

Then, as in the case of the fifth embodiment, the profile and level extractor 1109 extracts information on the profile and level from the code data 1101. The decoder status receiver 1111 obtains information on profile and level and the like of the decoder 1207. Further, the profile and level are set by the user via the profile and level input unit 1112.

The profile and level determination unit 1113 compares the profile and level information obtained from the decoder 1207 or set by the user, as described above, with the result of extraction by the profile and level extractor 1109. If the obtained or set profile and level are higher than or equal to the profile and level extracted from the code data 1101, profile and level determination unit 1113 controls the object selector 1121 to select a path directly connecting the selector 1122 to the selector 1124 such that the code data does not pass through the object integrator 1123. The header changer 1115 is not operated. The code data stored in the header memory 1103 and the code memories 1104 to 1108 are read out in the order of input, and multiplexed by the multiplexer 1116. Thus, the code data 1117 similar to the code data 1101 is generated.

On the other hand, if the profile and level obtained from the decoder 1207 or set by the user are lower than the profile and level extracted from the code data 1101, the profile and level determination unit 1113 inputs the number of objects included in the code data 1101 from the object counter 1110, and compares the number of objects with the number of decodable objects, determined from the obtained or set profile and level information.

If the number of objects obtained by the object counter 1110 is less than the number of decodable objects, the code data 1117 is generated, as in the case of the above-described case where the obtained or set profile and level are higher than or equal to those extracted from the code data 1101.

On the other hand, if the number of objects obtained by the object counter 1110 is greater than the number of decodable objects, the number of decodable objects is inputted into the object selector 1121. The object selector 1121 displays statuses of the respective objects (e.g., the image in FIG. 43), information on the respective objects, information on the number of integrated objects and the like, on the object selection designator 1120. The user selects objects to be integrated in accordance with these information, and inputs an instruction on the selection into the object selection designator 1120.

In the seventh embodiment, as the decoder 1207 performs decoding of Core profile and level 1, it can decode to a maximum of four objects. For example, as the image in FIG. 43 has five objects, two of them are integrated into one object, whereby code data decodable by the decoder 1207 can be obtained. Hereinbelow, a case where the user designated integration of the object 2003 and the object 2004 in the image in FIG. 43 will be described.

When the user designates the objects to be integrated via the object selection designator 1120, the profile and level determination unit 1113 operates the header changer 1115 to change the content of PLI in correspondence with the decoder 1207, generate header information on the new object obtained by integration and delete header information on the objects deleted by the integration, based on the result of selection by the object selector 1121. More specifically, arrangement information of the new object obtained as a result of integration is generated and arrangement information of the original objects 2003 and 2004 are deleted, based on the arrangement information of the objects 2003 and 2004. Then, the size of the object obtained by the integration or other information are generated as header information and header information of the original objects 2003 and 2004 are deleted, based on the header information of the objects 2003 and 2004.

The object selector 1121 controls the input/output of the selectors 1122 and 1124 so as to perform integration processing by the object integrator 1123 with respect to code data of the objects 2003 and 2004, and to avoid processing by the object integrator 1123 with respect to other code data.

Then, contents of the header changer 1115 and the code memories 1104 to 1106 holding the code data of the objects 2000 to 2002 are read out in the order of input, and multiplexed by the multiplexer 1116 via the selectors 1122 and 1124. On the other hand, the contents of the code memories 1107 and 1108 holding the code data of the objects 2003 and 2004 to be integrated are inputted via the selector 1122 to the object integrator 1123.

[Object Integrator]

Figure 34:
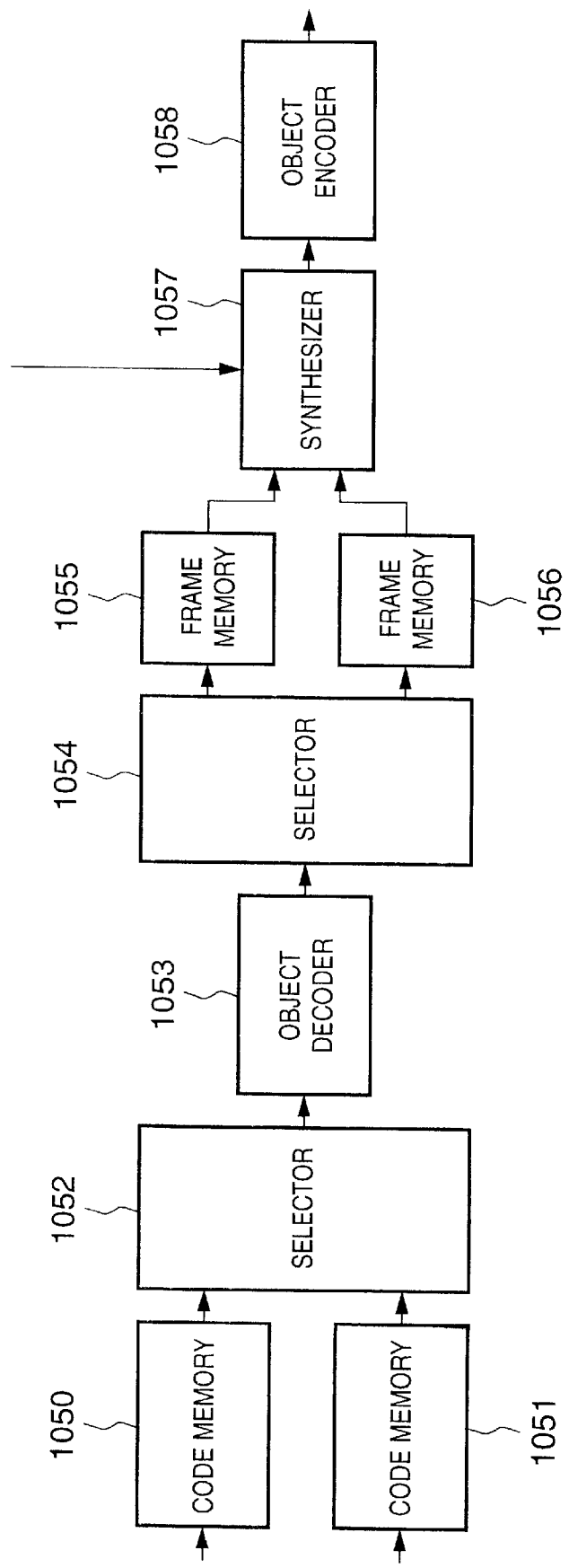
FIG. 34 is a block diagram showing the construction of an object integrator according to the seventh embodiment.

FIG. 34 is a block diagram showing the detailed construction of the object integrator 1123. In FIG. 34, numerals 1050 and 1051 denote code memories respectively for storing code data of objects to be integrated; 1052 and 1054, selectors which switch input/output for respective objects; 1053, an object decoder which decode code data and reproduces an image of an object; 1055 and 1056, frame memories for storing reproduced images for respective objects; 1057, a synthesizer which synthesizes objects in accordance with arrangement information of objects to be integrated stored in the header memory 1103; and 1058, an object encoder which encodes image data obtained by synthesizing and outputs the image data.

Hereinbelow, the operation of the object integrator 1123 will be described in detail. The code data of the objects 2003 and 2004 to be integrated are stored into the code memories 1050 and 1051. First, the selector 1052 selects an input on the code memory 1050 side, and the selector 1054, an output on the frame memory 1055 side. Thereafter, the code data is read out from the code memory 1050, and decoded by the object decoder 1053. Then image information of the object 2003 is written via the selector 1054 into the frame memory 1055. The image information of the object comprises image data indicative of a color image and mask information indicative of a shape. Then, the input and output of the selector 1052 and 1054 are switched to the opposite sides, and similar processing is performed, whereby the image information of the object 2004 is stored into the frame memory 1056.

Figure 38:
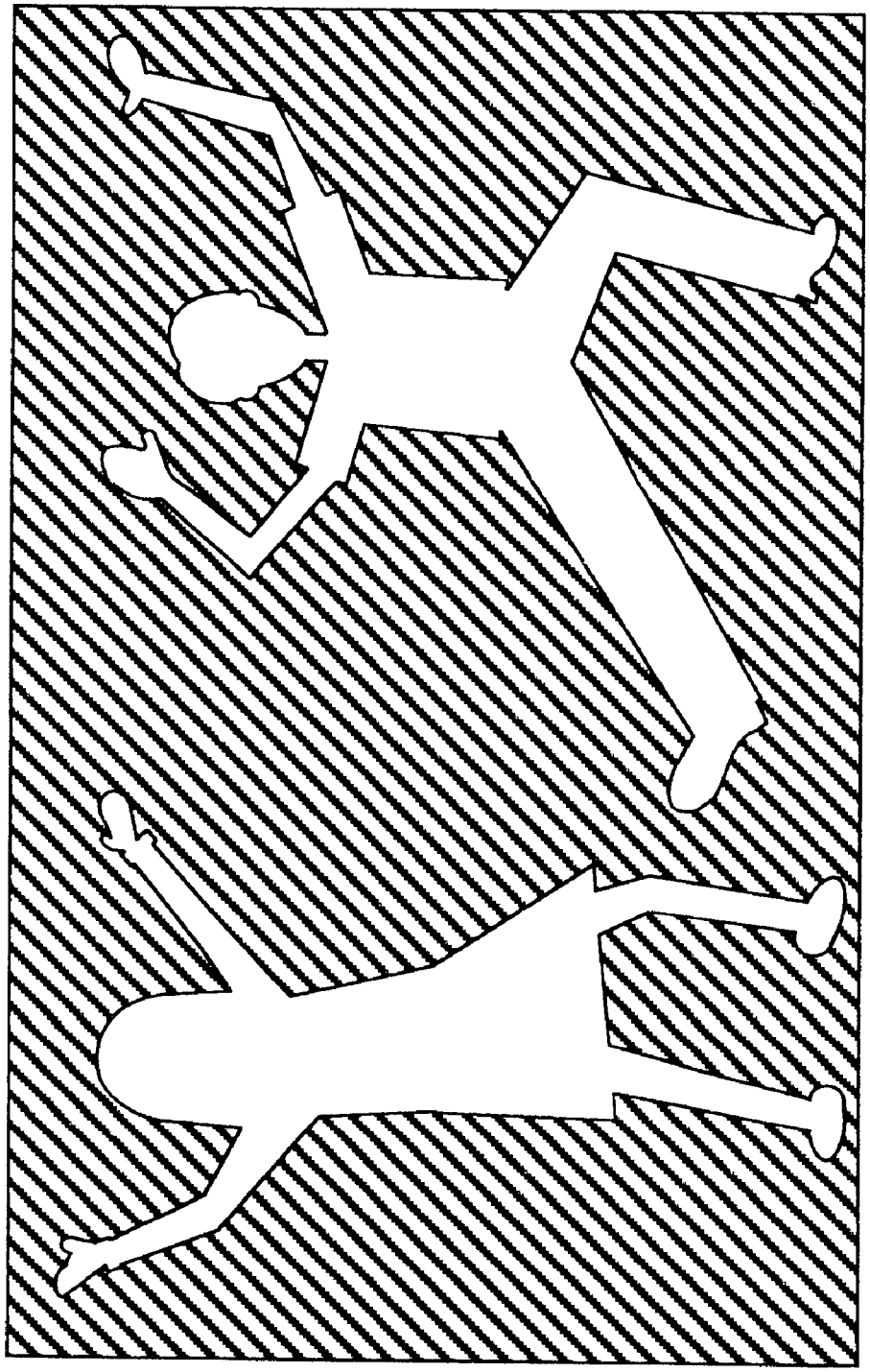
FIG. 38 is an example of synthesized mask information according to the seventh embodiment.

The synthesizer 1057 obtains location information and size information of the objects 2003 and 2004 from the header memory 1103, and obtains the image size of the new object obtained by object synthesizing and relative locations of the original objects 2003 and 2004 in the new object. Then, the image information in the frame memories 1055 and 1056 are read out, and the color image information and the mask information are respectively synthesized. FIG. 37 is shows the result of synthesizing of color image information. FIG. 38 shows the result of synthesizing of mask information. The object encoder 1058 encodes these color image information and mask information in accordance with the MPEG4 object coding. Then, the object integrator 1123 outputs the encoded information.

Figure 35:
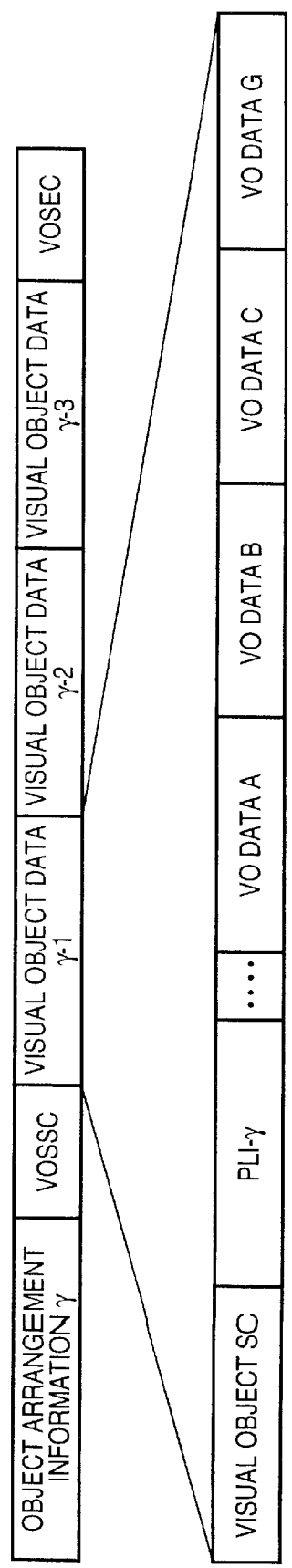
FIG. 35 is an example of the structure of synthesized code data according to the seventh embodiment.

The code data outputted from the object integrator 1123 is multiplexed with other code data by the multiplexer 1116 via the selector 1124, thus the code data 1117 is obtained. FIG. 35 shows a bit stream of the code data 1117. FIG. 35 shows the result of integration processing according to the seventh embodiment with respect to the code data 1101 in FIG. 31A. In FIG. 35, the bit stream has arrangement information γ including arrangement information of the newly obtained object as the result of synthesizing, VOSSC, Visual Object data γ-1, γ-2 and γ-3, and VOSEC. The Visual Object data γ-1, γ-2 and γ-3 are obtained by object integration regulation with respect to the original Visual Object data α-1, α-2 and α-3 shown in FIG. 31A. For example, the Visual Object data γ-1, following Visual Object SC, comprises PLI-γ indicative of profile and level appropriate to the decoder 1207, VO data A, VO data B and VO data C as respective code data of the objects 2000 to 2002, and code data VO data G obtained by integrating the objects 2003 and 2004.

The code data 1117 obtained as above is stored into the storage device 1206, or decoded by the decoder 1207 and reproduced as an image as shown in FIG. 43 and displayed on the display unit 1208.

Note that in the seventh embodiment, the user selects and designates objects to be integrated within an image by the object selection designator 1120, however, the present invention is not limited to this example. For example, it may be arranged such that the integration order is set for objects of the image in advance by the object selection designator 1120, then if the number of objects decodable by the decoder 1207 is less than the number of objects of the image and object integration is required, object integration is automatically performed in accordance with the set order.

As described above, according to the seventh embodiment, even if profile and/or level of a decoder are different from those of an encoder, code data can be decoded. Further, by integrating objects and decoding the integrated object, loss of decoded object can be prevented.

Further, the object integration processing can be performed in incremental order of code length or image size by providing the code length comparator 1114 and the size comparator 1118 shown in the fifth and sixth embodiments in place of the object selection designator 1120 and the object selector 1121 for controlling the object integrator 1123.

Figure 36:
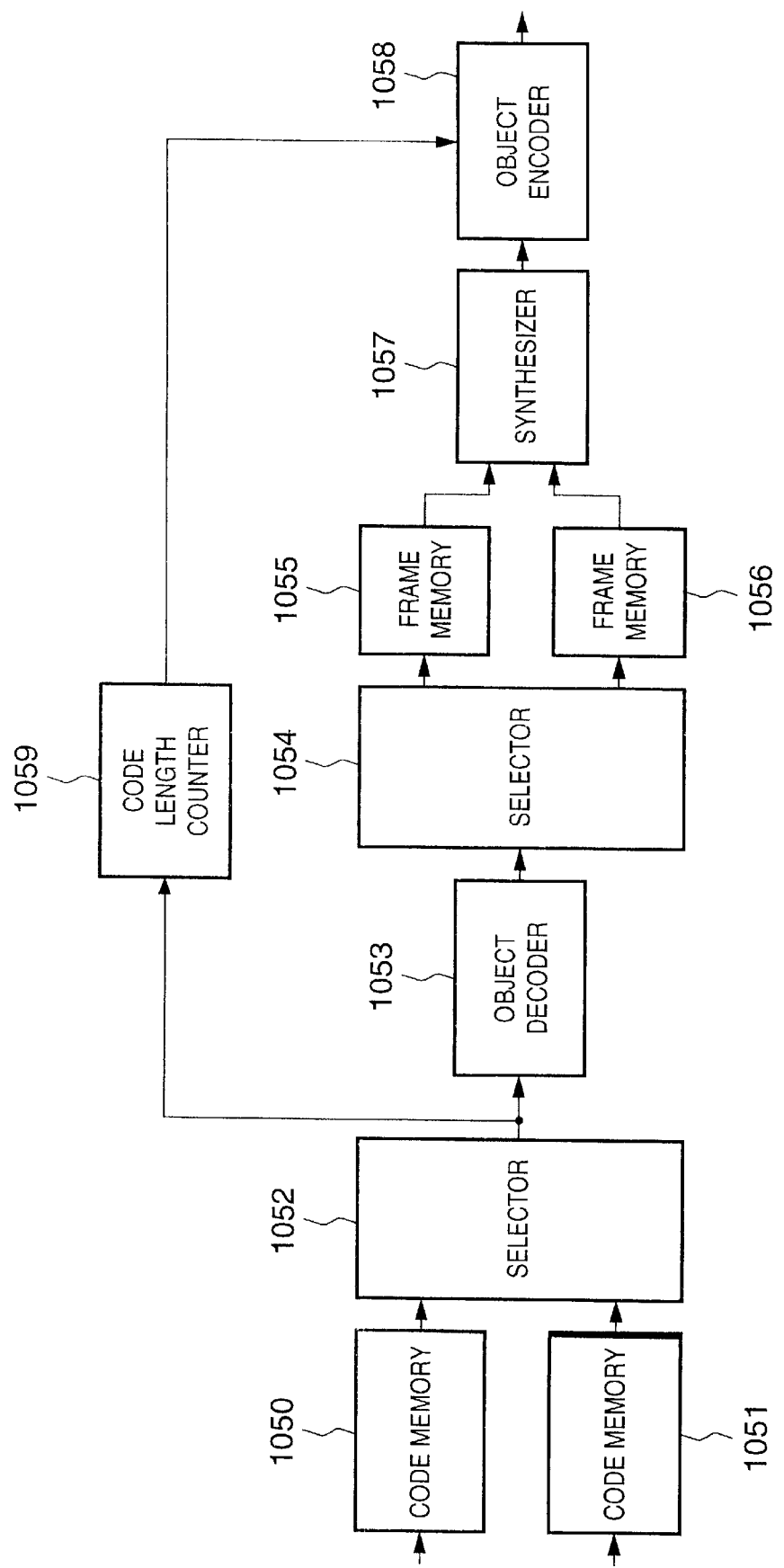
FIG. 36 is a block diagram showing the construction of the object integrator according to a modification of the seventh embodiment.

FIG. 36 is a block diagram showing the construction of the object integrator 1123 according to a modification of the seventh embodiment. In FIG. 36, elements corresponding to those in FIG. 34 have the same reference numerals and explanations of the elements will be omitted. The construction of FIG. 36 is characterized by further comprising a code length counter 1059. The code length counter 1059 counts code lengths of code data of respective objects prior to integration, and parameters (e.g., quantization parameters or the like) of the object encoder 1058 is controlled such that the code length of output from the object encoder 1058 is the same as the counted result. Thus the objects can be synthesized without increasing the total code length.

Eighth Embodiment

Hereinbelow, an eighth embodiment of the present invention will be described. As in the case of the above-described seventh embodiment, object integration processing is performed in the eighth embodiment. Note that the general construction of the moving image processing apparatus of the eighth embodiment, and the detailed construction of the profile and level regulator 1205 are the same as those in FIG. 33, therefore explanations of the apparatus and the construction of the profile and level regulator will be omitted.

Figure 39:
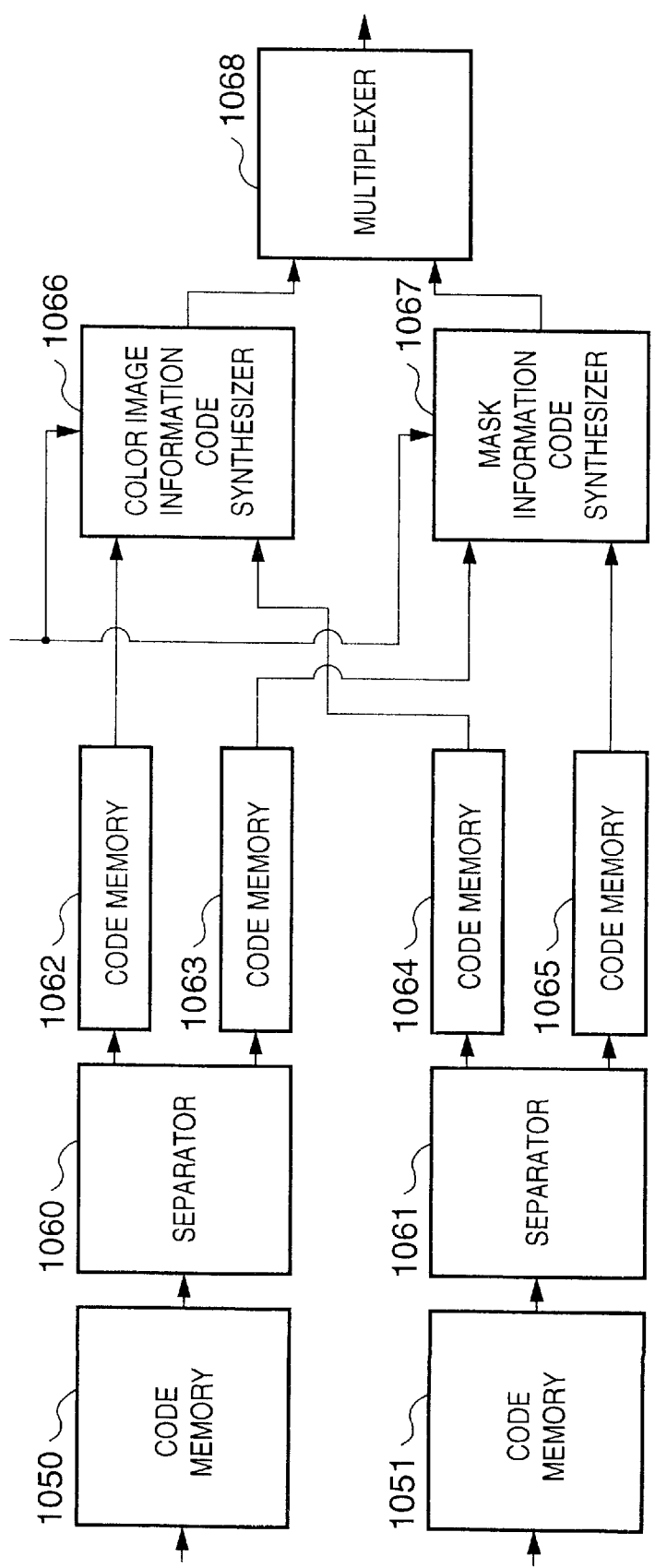
FIG. 39 is a block diagram showing the construction of the object integrator according to an eighth embodiment of the present invention.

FIG. 39 is a block diagram showing the detailed construction of the object integrator 1123 according to the eighth embodiment of the present invention. In FIG. 39, elements corresponding to those in FIG. 34 have the same reference numerals and explanations of the elements will be omitted.

In FIG. 39, numerals 1060 and 1061 denote separators which separate input code data into code data on mask information indicative of shape and code data indicative of color image information and output the separated data. Numeral 1062 to 1065 denote code memories. The code data indicative of color image information is stored into the code memories 1062 and 1064, and the code data on mask information is stored into the code memories 1063 and 1065, for respective objects. Numeral 1066 denotes a color image information code synthesizer which synthesizes the code data indicative of color image information in the form of code data; 1067, a mask information code synthesizer which synthesizes the code data indicative of mask information in the form of code data; 1068, a multiplexer which multiplexes code outputted from the color image information code synthesizer 1066 and the mask information code synthesizer 1067.

Hereinbelow, the operation of object integrator 1123 according to the eighth embodiment will be described in detail. As in the case of the seventh embodiment, the code data of the objects 2003 and 2004 are stored respectively into the code memories 1050 and 1051. The code data of the object 2003 stored in the code memory 1050 is read out in frame units (VOP units), separated by the separator 1060 into code data of color image information and code data of mask information, and the respective code data are stored into the code memories 1062 and 1063. Similarly, code data of color image information and code data of mask information of the object 2004 are stored into the code memories 1064 and 1065.

Thereafter, the color image information code synthesizer 1066 reads the color image information code data from the code memories 1062 and 1064. Further, as in the case of the seventh embodiment, the color image information code synthesizer 1066 obtains location information and size information of the objects 2003 and 2004 from the header memory 1103, and obtains the image size of synthesized new object and respective relative locations of the original objects 2003 and 2004 in the new object. That is, the color image information code synthesizer 1066 performs synthesizing on the assumption that if these color image information code data are synthesized and decoded, an image as shown in FIG. 37 can be obtained as one object.

Figure 40:
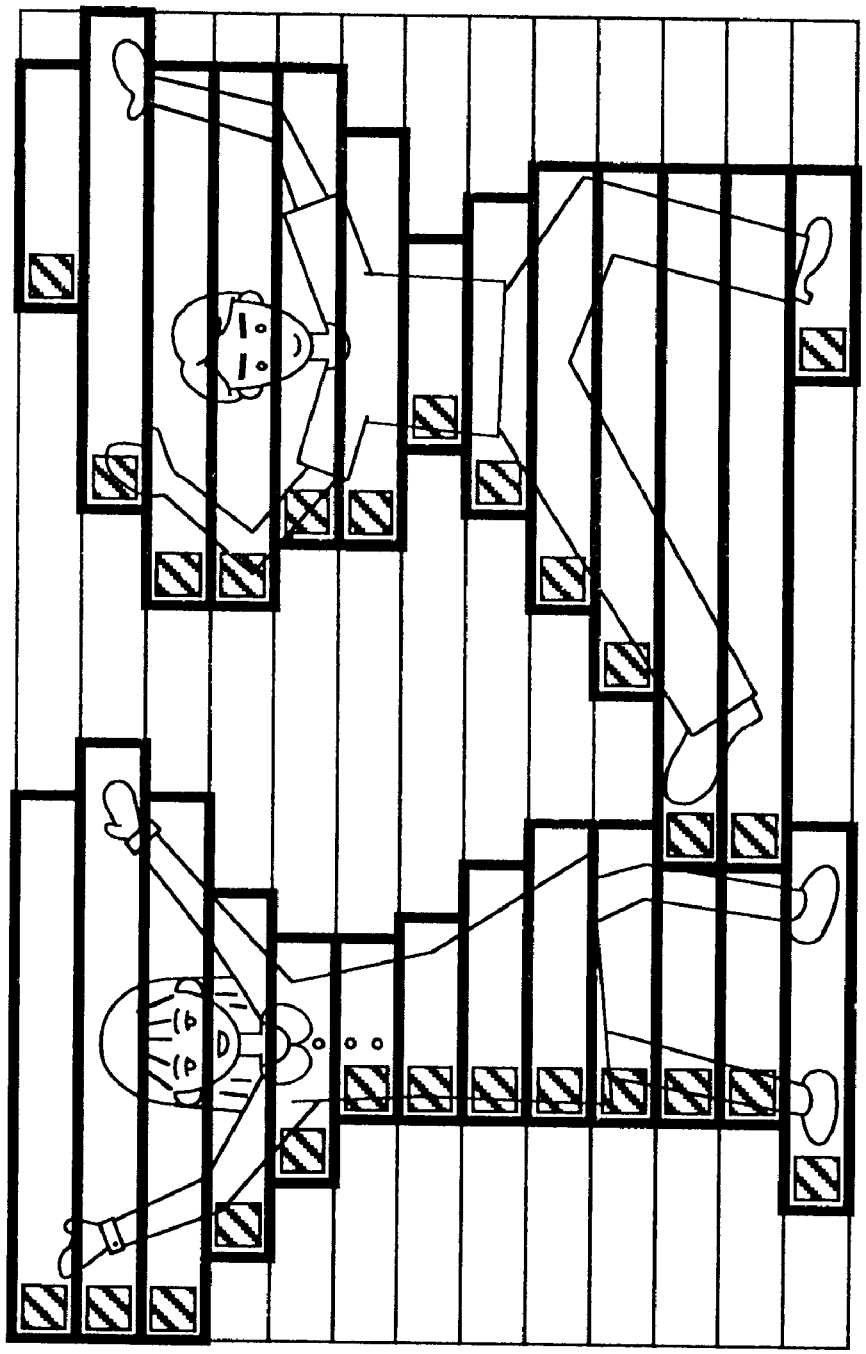
FIG. 40 is an example of a slice structure of color image information according to the eighth embodiment.

Note that the MPEG4 coding method has a slice data structure to define a plurality of macro blocks as a cluster of blocks in a main scanning direction. FIG. 40 shows an example of the slice structure applied to the objects in FIG. 37. In FIG. 40, an area in a bold frame is defined as one slice. In each slice, the head macro block is hatched.

The color image information code synthesizer 1066 performs reading in a rightward direction (main scanning direction) as shown in FIG. 40, sequentially from an upper left macro block data of the image, to be obtained as a result of synthesizing. That is, among the code data of the object 2003, code data corresponding to the head macro block of the head slice is read from the code memory 1062 first. The header information of the slice is added to the read code data, and the code data of the head macro block is outputted. Then, the code data corresponding to the macro block on the right of the head macro block is read and outputted. In this manner, the read and output operations are sequentially repeated to the slice.

Note that a portion where data has been newly generated between the objects 2003 and 2004 is considered as a new slice. As this portion is not displayed even if decoded with mask information, appropriate pixels are provided to cover the portion. That is, such portion comprises only DC component of the last macro block including an object. As the DC difference is "0", and all the AC coefficients are "0", no code is generated.

Then, as it is considered that a new slice has started on the edge of the object 2004, a hatched macro block in FIG. 40 is regarded as the head of new slice, and the header information of the slice is added to the block. In this case, as the address of the head macro block is an absolute address, the address is converted to a relative address from the macro block including the previous object. Note that in the macro block, if DC component or the like is predicted by referring to another macro block, that portion is re-encoded, then code data of the macro block is sequentially outputted in the rightward direction. That is, the slice header is added on the edge of object, and the prediction of the slice head macro block is replaced with initialized code. The obtained code is outputted to the multiplexer 1068.

In parallel to the operation of the color image information code synthesizer 1066, the mask information code synthesizer 1067 reads the code data of the mask information from the code memories 1063 and 1065. Then, the mask information code synthesizer 1067 obtains location information and size information of the objects 2003 and 2004 from the header memory 1103, and obtains the image size of a synthesized new object and relative locations of the original objects 2003 and 2004 in the new object. Then, by decoding and synthesizing the input code data of the mask information, the mask information code synthesizer 1067 obtains mask information as shown in FIG. 38. The mask information code synthesizer 1067 encodes the mask image by an arithmetic encoding as the MPEG4 shape information coding method. The obtained code is outputted to the multiplexer 1068.

Note that the mask information coding is not limited to the MPEG4 arithmetic coding method. For example, in the result of synthesizing of mask information code data, as the zero-run between object edges is merely lengthened, the synthesizing can be made only by replacing code representing the zero-run length without decoding by the mask information code synthesizer 1067, by employing zero-run coding or the like, used in a facsimile apparatus. Generally, even when mask information is encoded by the arithmetic or another coding, the code length is merely slightly changed.

The multiplexer 1068 multiplexes the code data on the synthesized color image information and the code data of the mask information, as code data of one object. The subsequent processing is similar to that in the above-described seventh embodiment. The multiplexer 1116 multiplexes the code data with other code data and outputs the data.

As described above, according to the eighth embodiment, even in a case where the profile and/or level of an encoder are different from those of a decoder, code data can be decoded. Further, as objects are integrated in the form of code data, loss of object in decoded image data can be prevented only by adding header information.

Further, in the object integration processing according to the eighth embodiment, a newly added header can be obtained by a slight amount of calculation, and further, code change is limited to the head block of a slice. Accordingly, the object integration processing can be performed at a speed higher than that in the object integration processing by decoding and re-encoding according to the seventh embodiment.

Ninth Embodiment

Hereinbelow, a ninth embodiment of the present invention will be described. In the ninth embodiment, object integration processing is performed, as in the case of the above-described seventh embodiment,. Note that the general construction of the moving image processing apparatus according to the ninth embodiment is similar to that in FIG. 29 of the fifth embodiment, therefore, an explanation of the construction will be omitted.

Figure 41:
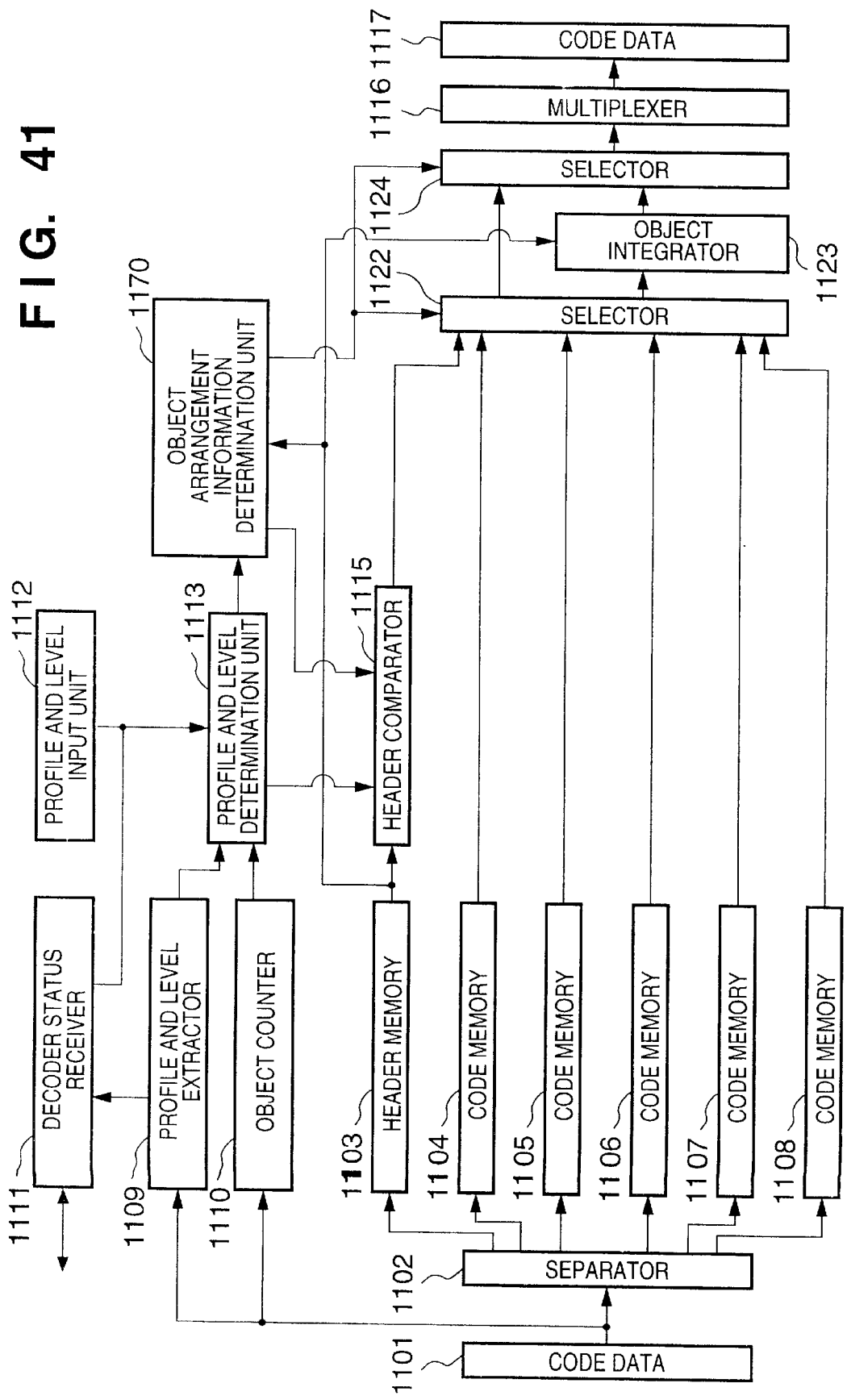
FIG. 41 is a block diagram showing the construction of the profile and level regulator according to a ninth embodiment of the present invention.

FIG. 41 is a block diagram showing the detailed construction of the profile and level regulator 1205 according to the ninth embodiment of the present invention. In FIG. 41, elements corresponding to those of the seventh embodiment in FIG. 33 have the same reference numerals, and explanations of the elements will be omitted. In the ninth embodiment, the MPEG4 coding is employed as a moving image coding method, however, any other coding method is applicable as long as it encodes a plurality of objects within an image.

In FIG. 41, numeral 1170 denotes an object arrangement information determination unit which determines objects to be integrated.

As in the case of the seventh embodiment, the profile and level determination unit 1113 compares the profile and level information of the decoder 1207 with those of the code data 1101. Even if the profile and level of the decoder 1207 are higher than or equal to, or lower than those of the code data 1101, the code data 1117 is generated in a similar manner to that of the seventh embodiment as long as the number of objects obtained by the object counter 1110 is the number decodable by the decoder 1207.

On the other hand, if the number of objects obtained by the object counter 1110 is greater than the number decodable by the decoder 1207, the decodable number of objects is inputted into the object arrangement information determination unit 1170. As in the case of the seventh embodiment, the maximum number of objects decodable by the decoder 1207 is four. Accordingly, in an image having five objects as shown in FIG. 43, decodable code data can be obtained by integrating two objects.

The object arrangement information determination unit 1170 extracts location information and size information of the respective objects from the header memory 1103, and determines two objects to be integrated based on the following conditions. Note that condition (1) is given higher priority to condition (2).

(1) One object is included in the other object
(2) The distance between both objects is the shortest
In the image shown in FIG. 43, the objects 2001 to 2004 are included in the object 2000. Accordingly, the object arrangement information determination unit 1170 determines the object 2000 and the object 2001 as objects to be integrated.

When the objects to be integrated have been determined, the profile and level determination unit 1113 operates the header changer 1115 to change and encode the content of the PLI in accordance with the decoder 1207, and generate header information on a new object obtained by object integration and delete the header information on the integrated objects, as in the case of the seventh embodiment, based on the result of determination by the object arrangement information determination unit 1170. More specifically, arrangement information on the new object obtained by object integration is generated, based on the arrangement information of the objects 2000 and 2001, and arrangement information of the original objects 2000 and 2001 are deleted. Then, the image size information or other information of the object obtained by the integration is generated as header information, based on the header information of the objects 2000 and 2001, and the header information of the original objects 2000 and 2001 are deleted.

The object arrangement information determination unit 1170 controls input/output of the selectors 1122 and 1124 so as to perform integration processing on the code data of the objects 2000 and 2001 by the object integrator 1123, on the other hand, so as not to pass the other code data through the object integrator 1123.

Then, the contents of the header changer 1115 and the code memories 1106 to 1108 holding the code data of the objects 2002 to 2004 are read out sequentially in the order of input, and inputted via the selectors 1122 and 1124 into the multiplexer 1116. On the other hand, the contents of the code memories 1104 and 1105 holding the code data of the objects 2000 and 2001 to be integrated are integrated by the object integrator 1123, and inputted into the multiplexer 1116. The multiplexer 1116 multiplexes these code data, thus generates the code data 1117. Note that the integration processing by the object integrator 1123 is realized in a similar manner to that in the above-described seventh embodiment or eighth embodiment.

FIG. 42 shows a bit stream of the code data 1117 according to the ninth embodiment. FIG. 42 shows the result of integration processing of the ninth embodiment performed on the code data 1101 as shown in FIG. 31A. In FIG. 42, arrangement information δ including arrangement information of the newly obtained object is provided at the head. Then VOSSC, Visual Object data δ-1, δ-2, δ-3, and VOSEC follow. The Visual Object data δ-1, δ-2, δ-3 are obtained by performing object integration regulation on the original Visual Object data α-1, α-2, and α-3 in FIG. 31A. For example, the Visual Object data δ-1 comprises Visual Object SC, then PLI-δ indicative of profile and level appropriate to the decoder 1207, VO data H as code data obtained by integrating the objects 2000 and 2001, and VO data C, VO data D and VO data E as code data of the objects 2002 to 2004.

The code data 1117 obtained as above is stored into the storage device 1206, or decoded by the decoder 1207 and reproduced as an image as shown in FIG. 43, and displayed on the display unit 1208.

Note that in the ninth embodiment, as in the cases of the fifth and sixth embodiments, code lengths of respective objects, object sizes and the like may be added to the conditions for determining objects to be integrated.

As described above, according to the ninth embodiment, even if the profile and/or level of an encoder are different from those of decoder, code data can be decoded. Further, loss of decoded object can be prevented while suppressing the amount of code changed by integration, by integrating the objects based on the location relation among the objects.

In the ninth embodiment, objects to be integrated are determined based on the location relation among the objects. The determination according to the ninth embodiment may be employed in the above-described fifth and sixth embodiments. That is, objects to be deleted can be selected based on location information of objects.

Note that in the seventh to ninth embodiments, two objects are integrated and one object is generated. However, three or more objects, or two or more sets of objects may be integrated.

Note that the arrangement of the code memories 1104 to 1108 and the header memory 1103 is not limited to that shown in FIG. 41. More code memories can be provided, or one memory may be divided into a plurality of areas. Further, a storage medium such as a magnetic disk may be employed.

Further, the selection of objects to be deleted or integrated may be determined based on the combination of a plurality of conditions such as sizes and code lengths of objects, location relation among the objects and user's instruction.

Further, in a case where the fifth to ninth embodiments are applied to an image editing apparatus, even if the number of objects changes due to editing processing, the output from the apparatus can be adjusted to an arbitrary profile and/or level.

As described above, according to the fifth to ninth embodiments, code data encoded for a plurality of image information (objects) can be decoded by decoders of arbitrary specifications. Further, the number of objects included in the code data can be regulated.

Tenth Embodiment

[Construction]

Figure 45:
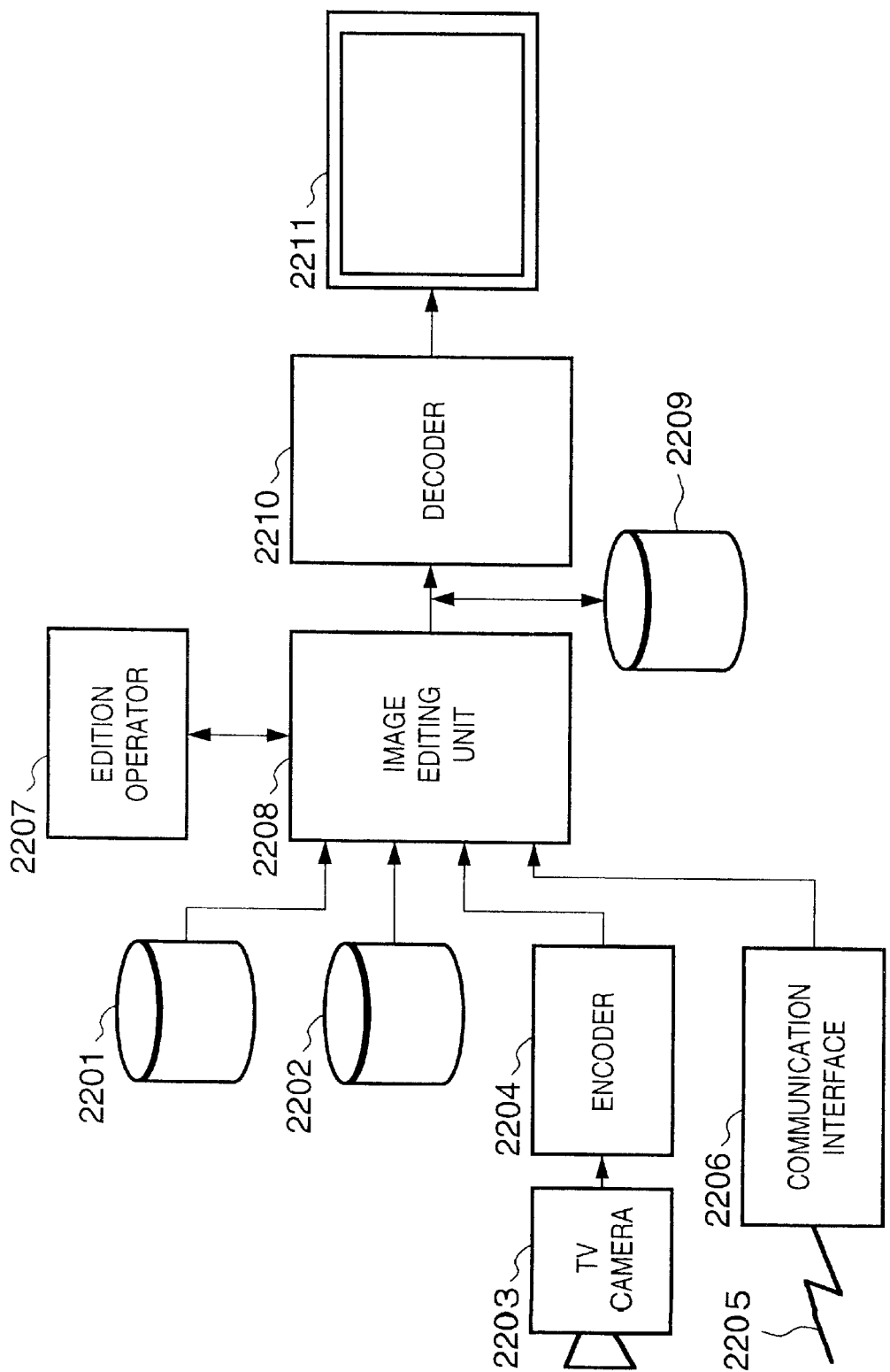
FIG. 45 is a block diagram showing the construction of the moving image processing apparatus according to a tenth embodiment of the present invention.

FIG. 45 is a block diagram showing the construction of the moving image processing apparatus according to a tenth embodiment of the present invention. In the tenth embodiment, the MPEG4 coding is employed as a moving image coding method. Note that the coding method is not limited to the MPEG4 coding, but any other coding method is applicable as long s it encodes a plurality of objects within an image.

In FIG. 45, numerals 2201 and 2202 denote storage devices holding moving image code data. The storage devices 2201 and 2202 respectively comprise a magnetic disk, an magneto-optical disk, a magnetic tape, a semiconductor memory or the like. Numeral 2203 denotes a TV camera which obtains a moving image and outputs a digital image signal; 2204, an encoder which performs coding by the MPEG4 coding method; 2205, a communication line of a local area network (LAN), a public line, a broadcasting line or the like; 2206, a communication interface which receives coded data from the communication line 2205; and 2207, an editing operation unit which displays image editing condition. The user inputs editing instruction from the editing operation unit 2207. Further, numeral 2208 denotes an image editing unit characteristic of the present embodiment; 2209, a storage device for storing output from the image editing unit 2208; 2210, a decoder which decodes code data of a moving image encoded by the MPEG4 coding; 2211, a display unit which displays a moving image decoded by the decoder 2210.

[Image Editing]

Hereinbelow, image editing processing of the present embodiment will be described using a specific image as an example.

Figure 46A:
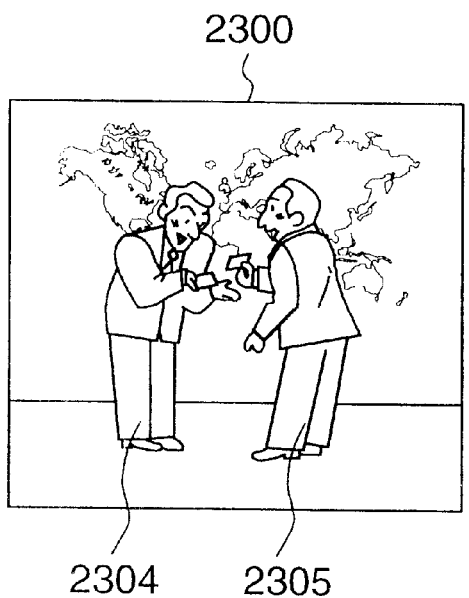
FIGS. 46A to 46D are examples of images to be synthesized.
Figure 50:
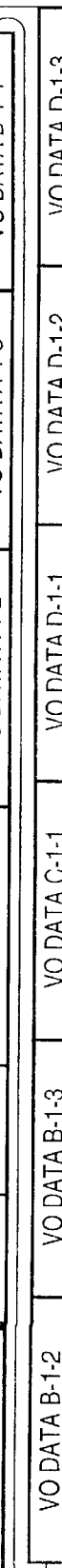
FIGS. 50A to 50E are examples of code data of images to be synthesized and of a synthesized image.

Image data, encoded by the MPEG4 coding of Core profile and level 2 at a bit rate of 384 kbps, is stored into the storage device 2201. FIG. 46A shows an example of the image stored in the storage device 2201. FIG. 50A shows the code data of the image. In the image of FIG. 46A, a background object 2300 includes objects 2304 and 2305 representing men. In FIG. 50A, code data of the background object 2300 is VO data A-1-1, and code data of the men objects 2304 and 2305 are VO data A-1-2 and VO data A-1-3.

Figure 46B:

Image data, encoded by the MPEG4 coding of Core profile and level 1 at a bit rate of 200 kbps, is stored into the storage device 2202. FIG. 46B shows an example of the image stored in the storage device 2202. FIG. 50B shows the code data of the image. In the image of FIG. 46B, a background object 2301 includes objects 2306 and 2307 representing a man and a woman. In FIG. 50B, code data of the background object 2301 is VO data B-1-1, and code data of the man and woman objects 2306 and 2307 are VO data B-1-2 and VO data B-1-3.

Figure 46C:
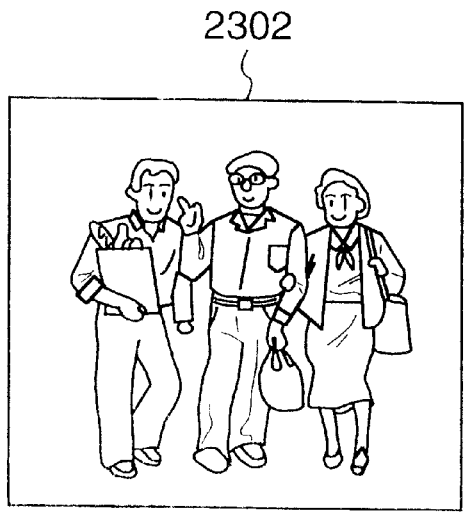

In a case where the TV camera 2203 obtains an image as shown in FIG. 46C and the encoder 2204 encodes the image data by the MPEG4 coding of Simple profile and level 1 at a bit rate of 32 kbps, as a new object is not extracted from the obtained image, the entire image is handled as one object 2302. Accordingly, as shown in FIG. 50C, code data of the image comprises VO data C-1-1, code data of one object 2302.

Figure 46D:
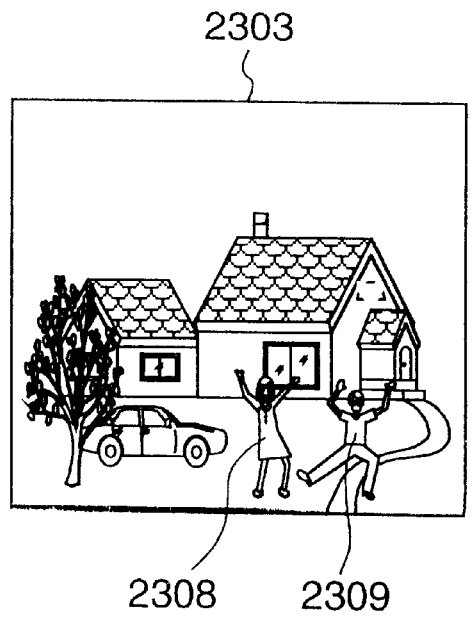

Further, in a case where an image as shown in FIG. 46D is encoded by the MPEG4 coding of Simple profile and level 2 and inputted from the communication line 2205 via the communication interface 2206, a background object 2303 in the image in FIG. 46D includes objects 2308 and 2309 representing a woman and a man. FIG. 50D shows code data of the image, in which code data of the background object 2303 is VO data D-1-1, code data of the man and woman objects 2308 and 2309 are VO data D-1-2 and VO data D-1-3.

Note that to simplify the explanation, the sizes of all the above-described images (FIGS. 46A to 46D) are defined with QCIF (Quarter Common Intermediate Format).

[Image Editing Unit]

Figure 47:
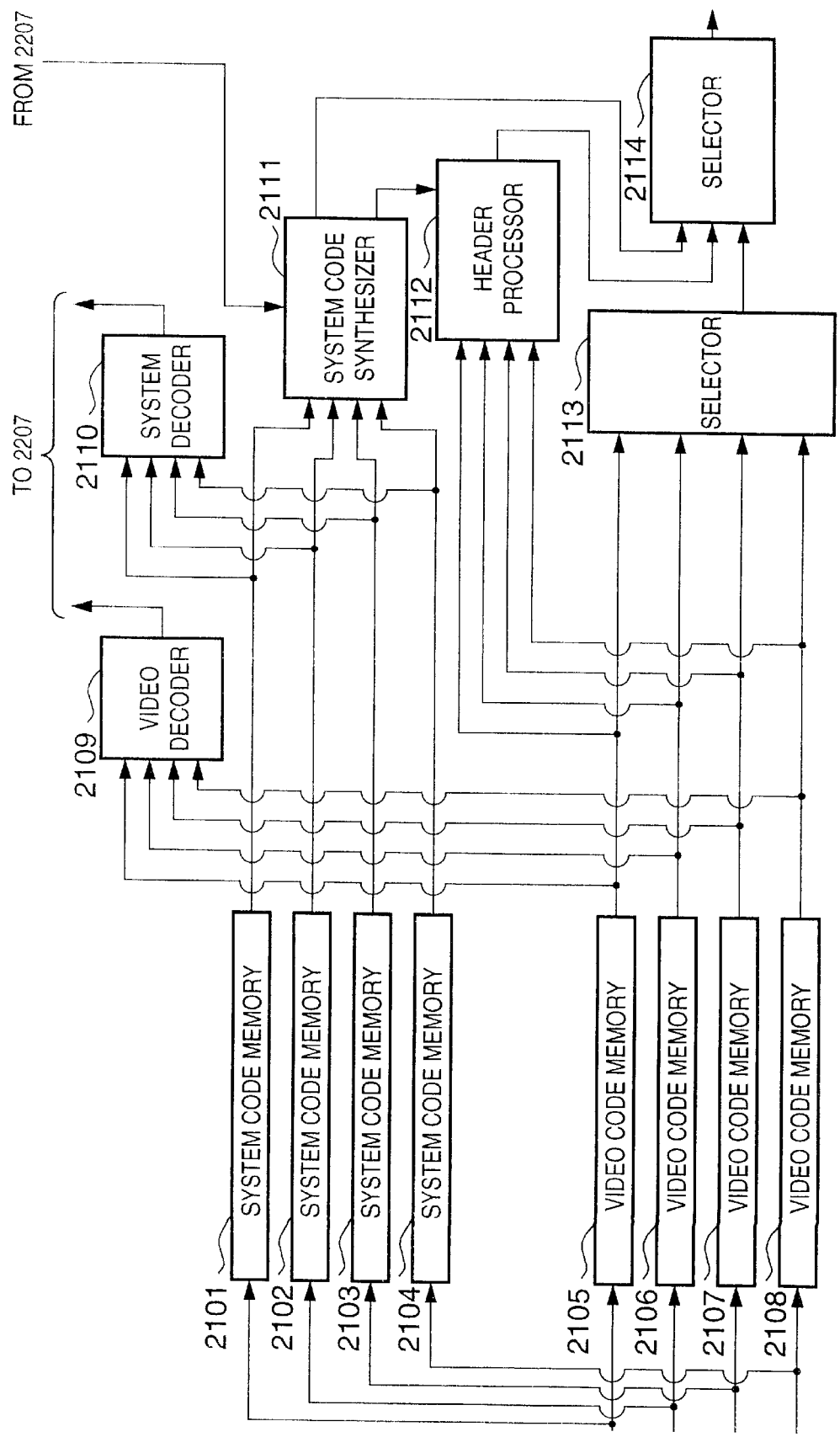
FIG. 47 is a block diagram showing the construction of an image editing unit according to the tenth embodiment.

All the code data are inputted into the image editing unit 2208. FIG. 47 is a block diagram showing the construction of the image editing unit 2208. In FIG. 47, numerals 2101 to 2104 denote system code memories for storing system-related code data for respective inputs; 2105 to 2108, video code memories for storing moving image code data for respective inputs; 2109, a video decoder which decodes moving image code data to reproduce objects; and 2110, a system decoder which decodes the system code data to reproduce object arrangement information and the like.

The results of decoding are outputted to the editing operation unit 2207, and the respective objects are displayed in accordance with the arrangement information. The editing operation unit 2207 newly sets display timing, speed and the like, in accordance with designation of arrangement of these objects, size change, deformation and the like, instructed by the user.

Numeral 2111 denotes a system code synthesizer which synthesizes system code; 2112, a header processor which synthesizes or changes headers of video code; 2113, a selector which arbitrarily selects one of outputs from the video code memories 2105 to 2108 and outputs the selected output; 2114, a multiplexer which multiplexes outputs from the system code synthesizer 2111, the header processor 2112 and the selector 2113 to generate code data.

In the image editing unit 2208, respective outputs from the storage devices 2201 and 2202, the encoder 2204 and the communication interface 2206 are separated into system code data and moving image code data. The system code data are stored into the system code memories 2101 to 2104, and the moving image code data are stored into the video code memories 2105 to 2108.

When the respective code data have been stored, the video decoder 2109 and the system decoder 2110 decode the respective data, and output the decoded data to the editing operation unit 2207. In the editing operation unit 2207, the user sets settings of deletion/holding objects, change of arrangement, moving image start timing, frame rate and the like. The video decoder 2209 and the system decoder 2110 arbitrarily perform decoding in accordance with the editing operation.

Figure 48:
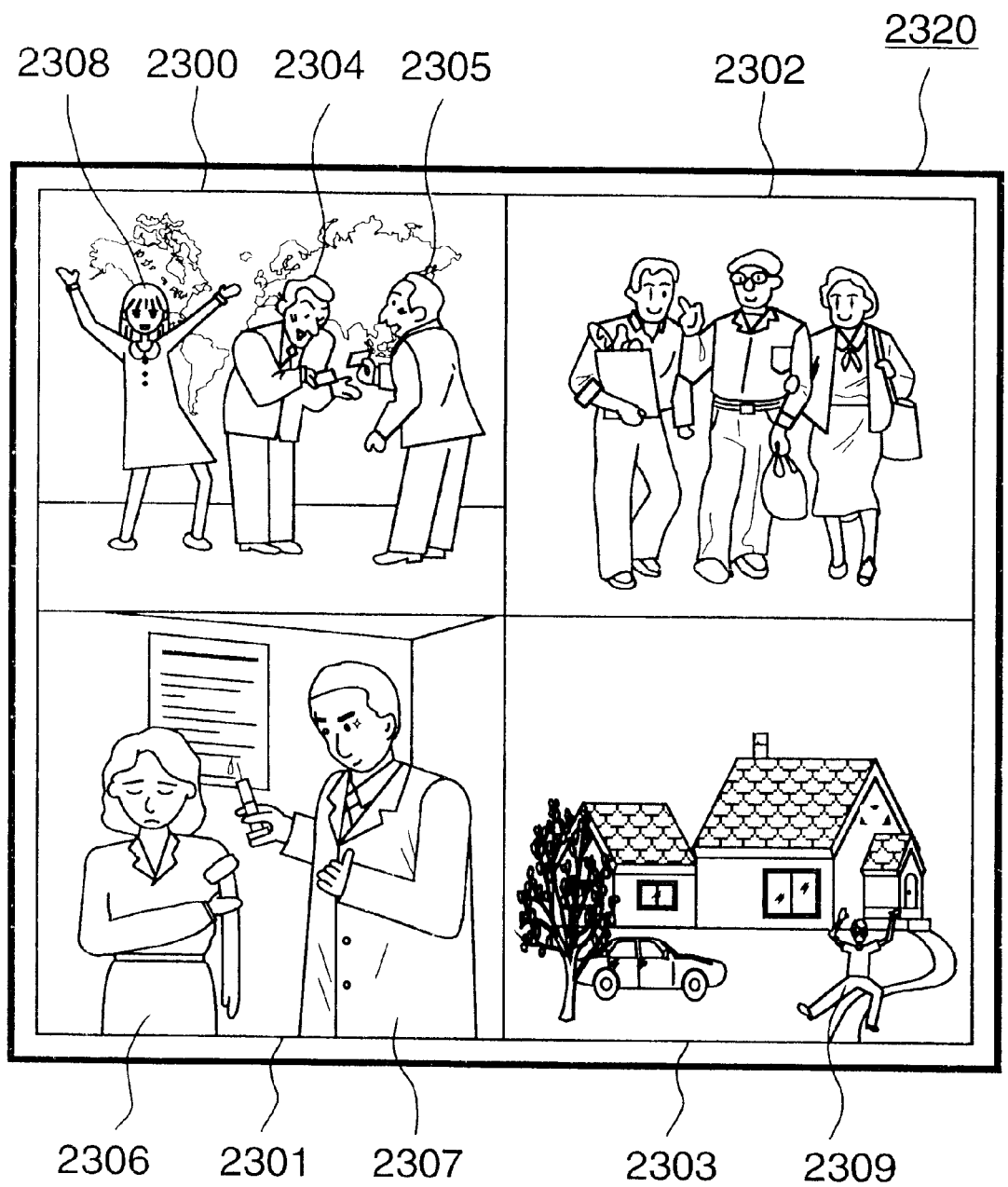
FIG. 48 is an example of a synthesized image.

FIG. 48 shows an example of an image synthesized from the images shown in FIGS. 46A to 46D. That is, a new image 2320 is generated by editing and synthesizing the four images. The size of the image 2320 is defined with CIF format because the QCIF four images are synthesized without overlapping with each other. In the image 2320, the background object 2300, the object 2302, the background objects 2303 and 2301 are arranged, from an upper left position in a clockwise manner. Further, the men objects 2304 and 2305 are moved horizontally in rightward direction (edited). The object 2308 is enlarged and moved onto the background object 2300 (edited).

The system code synthesizer 2111 reads out the system code data from the system code memories in accordance with the results of synthesizing, then generates new system code data with arrangement information corresponding to these deformation and movement, and outputs the new system code data to the multiplexer 2114.

Next, the changing condition accompanying synthesizing of respective objects will be described below.

First, regarding the background object 2300, coordinates, start timing and the like have not been changed. Regarding the background object 2301, its coordinates (0,0) has been changed to (0,144). Regarding the object 2302, its coordinates (0,0) has been changed to (176,0). Regarding the background object 2303, its coordinates (0,0) has been changed to (176,144).

Regarding the men objects 2304 and 2305, coordinate values for the rightward movement have been added to their coordinates. Regarding the objects 2306 and 2307, the coordinates have been changed in correspondence with the change of the coordinates of the background object 2301 from (0,0) to (0,144), so as to move the absolute positions downward by "144". Regarding the object 2308, new coordinates have been generated based on the expansion designation (magnification ratio) and a new distance from the origin (0,0). Regarding the object 2309, its coordinates have been changed in correspondence with the change of the coordinates of the background object 2303 from (0,0) to (176,144), so as to move the absolute position rightward by "176" and downward by "144".

Note that in horizontal movement of object, the system code synthesizer 2111 merely adds the amount of movement to the coordinates of display position with respect to the code data of the object, however, in expansion or deformation processing, generates commands corresponding to those processing and newly performs coding. Note that system code in the MPEG4 standard is similar to the CG language VRML, therefore, detailed commands are approximately similar to those in the VRML or ISO/IEC14496-1.

Figure 49:
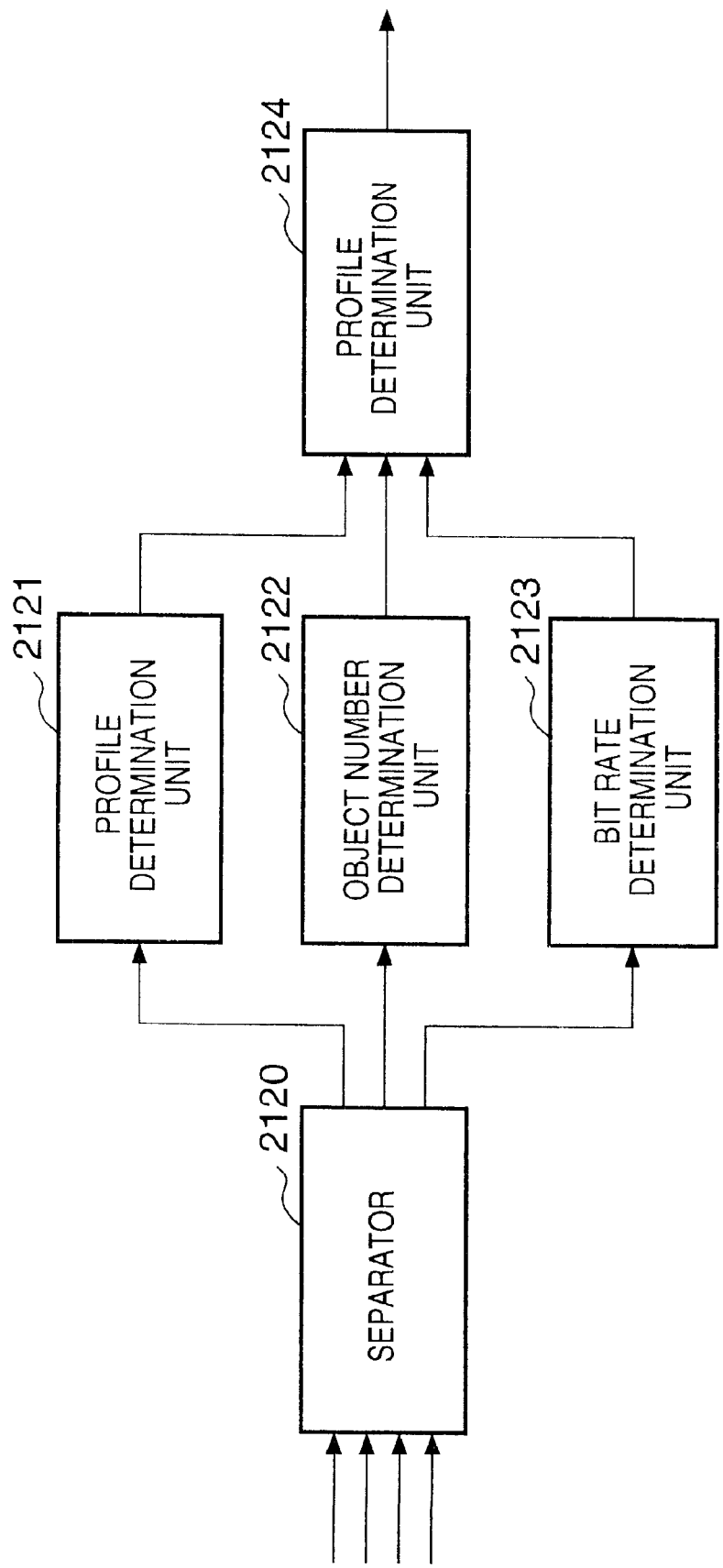
FIG. 49 is a block diagram showing the detailed construction of a header processor.

On the other hand, the header processor 2112 generates a new header in correspondence with the results of editing of the system code data. FIG. 49 is a block diagram showing the detailed construction of the header processor 2112. In FIG. 49, numeral 2120 denotes a separator which separates input header information for respective codes and determine output destinations; 2121, a profile determination unit; 2122, an object number determination unit; 2123, a bit rate determination unit; and 2124, a profile determination unit which determines a profile.

In the header processor 2112, the separator 2120 extracts PLI code, VOSC and bitrate code from header information of the respective objects, from video code memories 2105 to 2108, and inputs the extracted code into the profile determination unit 2121, the object number determination unit 2122 and the bit rate determination unit 2123. The profile determination unit 2121 decodes the PLI code and detects the highest profile and level from profiles and levels of images to be synthesized. The object number determination unit 2122 counts the number of objects included in the code data by counting the VOSC. The bit rate determination unit 2123 detects the respective bit rates by decoding the bitrate code, and obtains the total sum of the bit rates. The outputs from the respective determination units are inputted into the profile determination unit 2124.

The profile determination unit 2124 determines profile and level satisfying the highest profile, the number of objects and bit rate, by referring to the profile table as shown in FIG. 28. In the present embodiment, the highest profile of the four images to be synthesized is Core profile and level 2, the number of objects of the synthesized images is 10, and the total sum of the bit rates is 684 kbps. Accordingly, the profile and level satisfying these conditions is, according to the profile table, Main profile and level 3. The profile determination unit 2124 generates new PLI code based on Main profile and level 3, and outputs the PLI code.

The multiplexer 2114 multiplexes the system code data generated by the system code synthesizer 2111 and the code data of moving image. The moving image code data is reproduced by reading the code, where profile-related code or the like is corrected, from the header processor 2112, or arbitrarily reading the code data stored in the video code memories 2105 to 2108, and multiplexing the read data. Then, the multiplexed code data is outputted to the storage device 2209 and the decoder 2210.

[Processing Procedure]

FIG. 50E shows code data obtained as a result of multiplexing by the multiplexer 2114. It is understood from FIG. 50E that all the code data shown in FIGS. 50A to 50D are synthesized, i.e., all the objects in FIGS. 46A to 46D are included. Note that in the multiplexed code data, user data may be positioned prior to the code data of the respective objects, or intensively positioned in a predetermined position within the code data.

Figure 51:
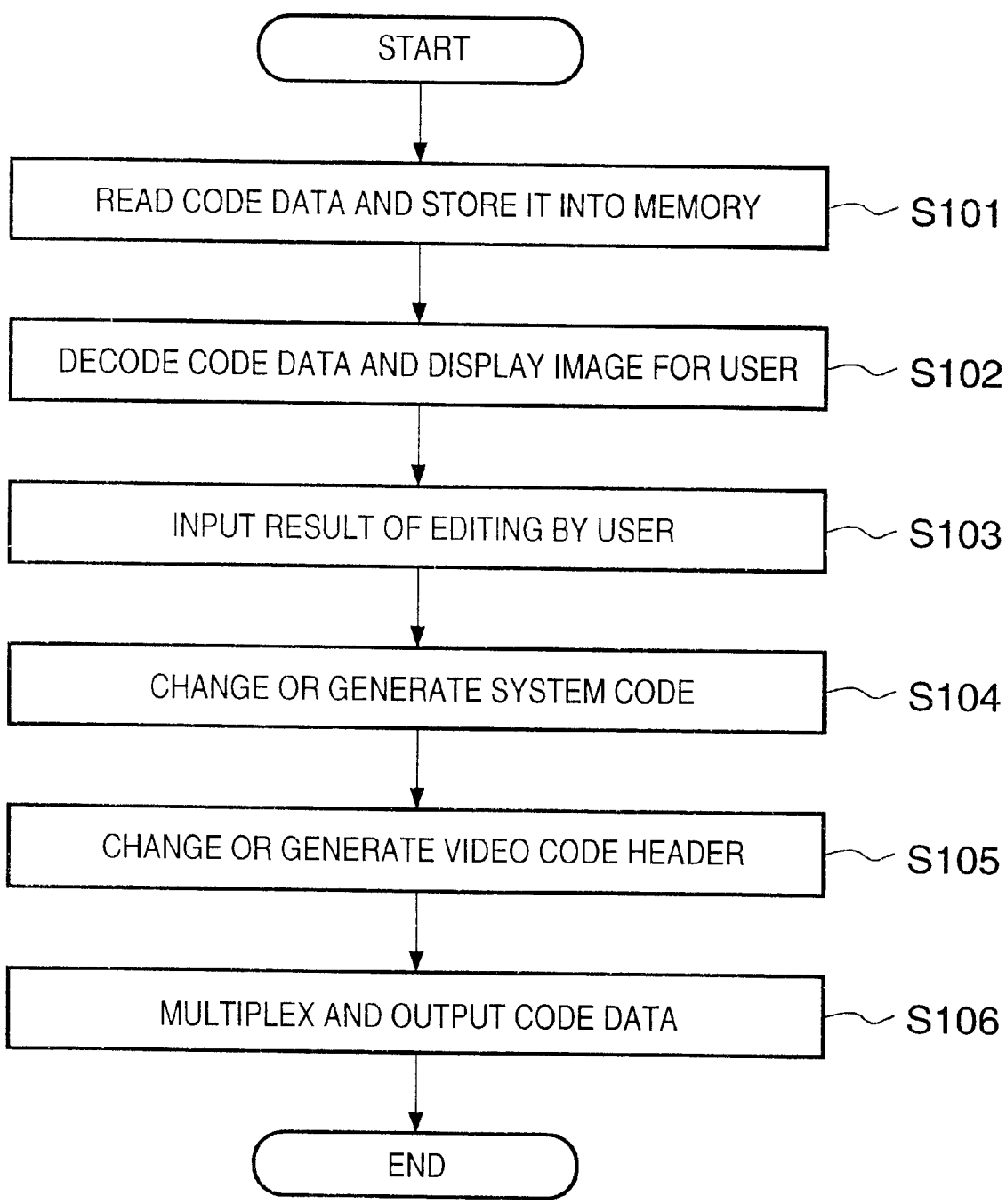
FIG. 51 is a flowchart showing image processing according to the tenth embodiment.

FIG. 51 is a flowchart showing image processing according to the present embodiment. When the apparatus has been started, code data of images are inputted from the respective image input means (storage devices 2201 and 2202, encoder 2204 and communication interface 2206), and stored into the code memories 2101 to 2104 and 2105 to 2108 (step S101). Then, the code data are respectively decoded, and images represented by the decoded data are presented to the user (step S102). Thereafter, the results of the user's edition at the editing operation unit 2207 is obtained (step S103), and the system code is changed (step S104) in accordance with the obtained results of editing. Further, the header of moving image code data are changed in accordance with the profile and level, the number of objects, the bit rate and the like, so as to generate new code (step S105). Then, in the multiplexer 2114, the system code data and video code data are multiplexed and outputted (step S106).

As code data synthesized by the image editing unit 2208 is inputted into the decoder 2210, the decoder 2210 easily detects the scale of input code data to be decoded, the number of necessary decoders and the like. Accordingly, it can be easily determined whether or not decoding is possible without actually decoding the code data. For example, even if it is determined that decoding is impossible, the code data can be temporarily stored into the storage device 2209 and decoded when a necessary number of decoders are provided.

Note that the arrangement of the system code memories 2101 to 2104 and the video code memories 2105 to 2108 of the present embodiment is not limited to that in FIG. 47, however, more code memories may be provided, or one memory may be divided into a plurality of areas. Further, a storage medium such as a magnetic disk may be employed.

According to the present embodiment, when code data of different profiles and/or levels are synthesized, profile and level are re-defined. Since the scale of code data to be inputted, a necessary number of decoders and the like are obtained in advance, in the decoder 2210, it can be easily determined whether or not decoding is possible.

Eleventh Embodiment

Hereinbelow, an eleventh embodiment of the present invention will be described. Note that the general construction of the moving image processing apparatus of the eleventh embodiment is similar to that of the above-described tenth embodiment in FIG. 45, therefore, an explanation of the construction will be omitted. In the eleventh embodiment, the user designates an arbitrary profile using the editing operation unit 2207, and the image editing unit 2208 generates code data based on the designated profile.

[Construction]

Figure 52:
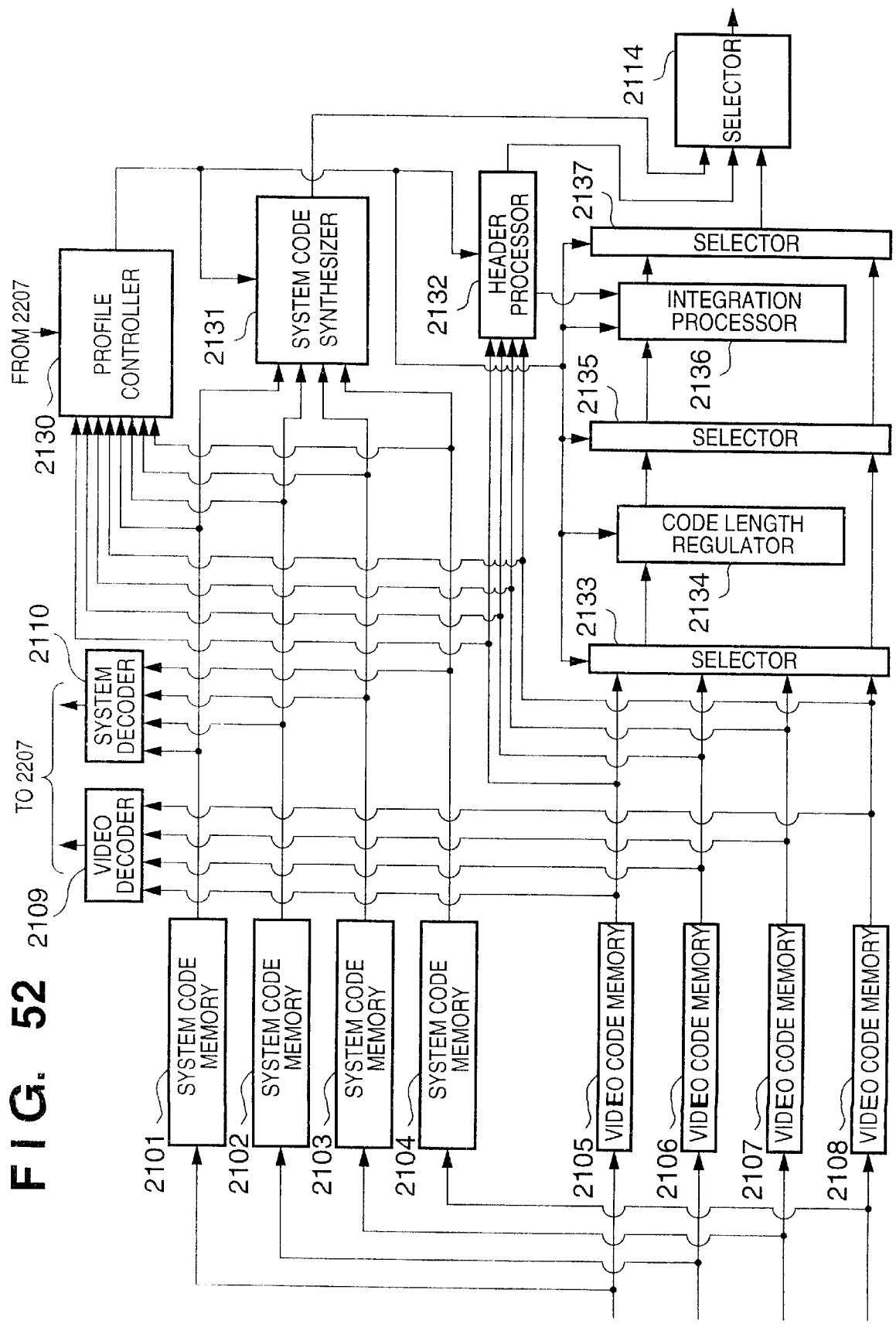
FIG. 52 is a block diagram showing the construction of the image editing unit according to an eleventh embodiment of the present invention.

FIG. 52 is a block diagram showing the detailed construction of the image editing unit 2208 according to the eleventh embodiment. In FIG. 52, elements corresponding to those in FIG. 47 of the tenth embodiment have the same reference numerals, and explanations of the elements will be omitted. In the eleventh embodiment, the MPEG4 coding method is employed as a moving image coding method, however, any other coding method is applicable as long as it encodes a plurality of objects within an image.

Numeral 2130 denotes a profile controller which performs various controls to synthesize input plural image data in correspondence with a profile designated from the editing operation unit 2207; 2131, a system code synthesizer which synthesizes system code; 2132, a header processor which synthesizes and changes header of video code; 2134, a code length regulator which regulates code lengths of respective objects; 2136, an integration processor which performs integration processing on objects; and 2133, 2135 and 2137, selectors which switch respective input/output in accordance with an instruction from the profile controller 2130.

As in the case of the above-described tenth embodiment, the code data inputted from the storage devices 2201, 2202, the encoder 2204 and the communication interface 2206 are separated into system code data and moving image code data, and stored into the system code memories 2101 to 2104 and the video code memories 2105 to 2108.

Note that in the eleventh embodiment, the code data inputted from the storage devices 2201 and 2202, the encoder 2204 and the communication interface 2206 are the same as those in the above-described tenth embodiment. Accordingly, the respective images are the same as those in FIGS. 46A to 46D, and the code data in FIGS. 50A to 50D are obtained by encoding the respective images. Note that in the eleventh embodiment, code data (VO data A) of Core profile and level 2 and at a bit rate of 1024 kbps is inputted from the storage device 2201. Similarly, code data (VO data B) of Core profile and level 1 and at a bit rate of 384 kbps is inputted from the storage device 2202. Similarly, code data (VO data C) of Simple profile and level 3 and at a bit rate of 384 kbps is inputted from the encoder 2204, and code data (VO data D) of Core profile and level 2 and at a bit rate of 768 kbps is inputted from the communication interface 2206.

In this embodiment, these code data have information unique to the respective objects as user data. The objects in the eleventh embodiment are "people", "background" and "non-cut-out screen image". As user data of a "man" object, information indicating that the type of objects is "man", personal information of the man (sex, age, profession and the like), further, action of the man in the image (e.g., the men objects 2304 and 2305 are discussing, the man object 2307 is giving an injection to the girl object 2306). These object-unique information are utilized upon editing operation such as object search.

When the respective code data have been stored into the code memories, the video decoder 2109 and the system decoder 2110 respectively decode the code data and output the decoded data to the editing operation unit 2207. At the editing operation unit 2207, the user operates settings such as selection of deletion/holding objects, change of arrangement, moving image start timing and frame rate, thus, the synthesized image 2320 as shown in FIG. 48 is obtained, as in the case of the tenth embodiment.

[Setting of Profile and Level]

As described above, in the eleventh embodiment, the user can arbitrarily set the profile and level of code data to be outputted, from the editing operation unit 2207. Accordingly, when the generated code data is delivered by broadcasting or the like, the user can adjust the profile and level of the code data to those of a decoder to receive the code data. Hereinbelow, a case where the user has designated Core profile and level 2 at the editing operation unit 2207 will be described.

The user's designation of profile and level is inputted, with the results of editing, into the profile controller 2130. The synthesized image 2320 shown in FIG. 48 includes 10 objects, and the total sum of the bit rates is 2560 kbps. Further, in Core profile and level 2 designated by the user, the maximum number of objects is 8, and the maximum bit rate is 2048 kbps, according to the profile table in FIG. 28. To perform decoding of the designated profile at the designated level, the number of objects of the synthesized image must be reduced by two, and the bit rate must be controlled to 2048 kbps.

The profile controller 2130 reduces code length of code data based on the following conditions in the numerical priority order.

(1) Code length is reduced from the highest profile level
(2) Code length is reduced from a highest bit rate
(3) All the code lengths are reduced Hereinbelow, the bit rate of the VO data A is reduced from 1024 kbps to 512 kbps by reducing the code length of the VO data A based on these conditions.

Further, to reduce the number of objects, two objects may be synthesized into one object, for example. In the eleventh embodiment, objects to be integrated are determined from a plurality of objects, by referring to node information in the system code stored in the system code memories 2101 to 2104. That is, parent-child relation of nodes are referred to, and objects having the same parent are integrated.

Hereinbelow, the object integration processing according to the eleventh embodiment will be described.

Figure 53D:
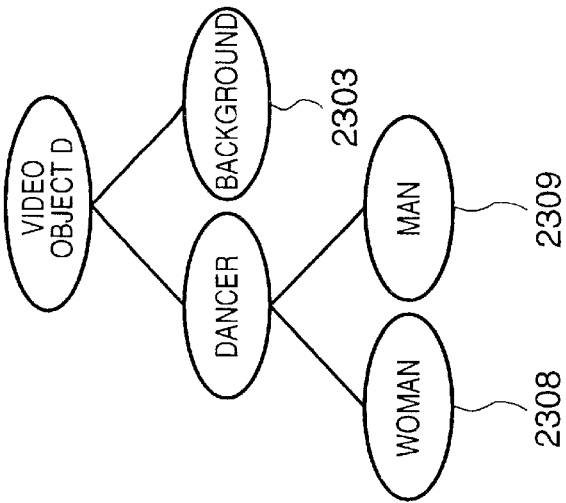
FIGS. 53A to 53D are examples of node trees showing the relation among respective objects.
Figure 53C:
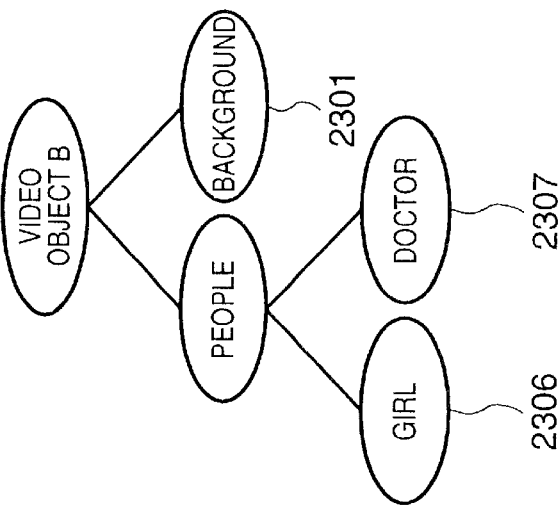
Figure 53B:
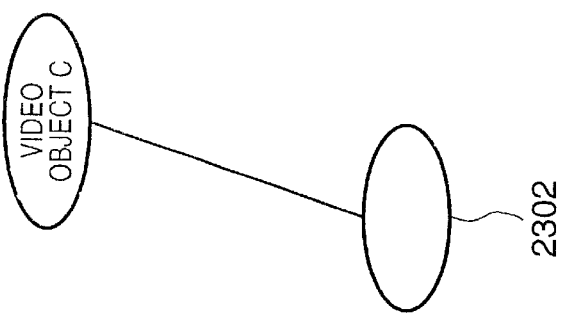
Figure 53A:
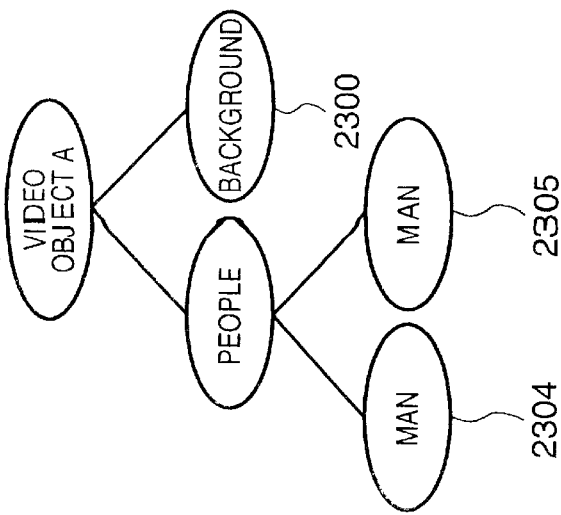

FIGS. 53A to 53D show node statuses of the respective objects in the eleventh embodiment. FIG. 53A shows a node relation of the image in FIG. 46A. The code data is divided into the background 2300 and People node representing people, further, the People node is a parent of the "men" objects 2304 and 2305. Similarly, FIG. 53B shows a node relation of the image in FIG. 46B; FIG. 53C, a node relation of the image in FIG. 46C; and FIG. 53D, a node relation of the image in FIG. 46D. That is, in FIG. 53A, the "men" objects 2304 and 2305 are connected to the People node; in FIG. 53B, the "girl" object 2306 and the "doctor" object 2307 are connected to the People node; in FIG. 53D, the "woman" object 2308 and the "man" object 2309 are connected to a dancer node.

Accordingly, in the eleventh embodiment, the objects connected to the People and dancer nodes indicative of people are determined as objects to be integrated for respective images. That is, in the image in FIG. 46A, the objects 2304 and 2305 are integrated. Similarly, in the image in FIG. 46B, the objects 2306 and 2307 are integrated; in the image in FIG. 46D, the objects 2308 and 2309 are integrated. By this integration, the number of objects in the synthesized image becomes seven, and the number of objects satisfies Core profile and level 2.

The profile controller 2130 instructs the system code synthesizer 2131 to newly reproduce the arrangement information of the respective objects after the object integration. The system code synthesizer 2131 generates system code data in the state where the objects are integrated, as in the case of the tenth embodiment.

At the same time, the profile controller 2130 instructs the header processor 2132 to newly generate header information of the respective objects after the object integration. That is, the size of image is changed to CIF(352×288), the bit rate is set to 2048 kbps, and the PLI code is set to Core profile and level 2. Further, code such as VOL_width, VOL_height, VOP_width, VOP_heigh and bitrate of the integrated objects are corrected.

The selector 2133 switches a data path so as to pass the object of the image in FIG. 46A (VO data A) through the code length regulator 2134, and not to pass the other objects through the code length regulator 2134, under the control of the profile controller 2130.

Figure 54:
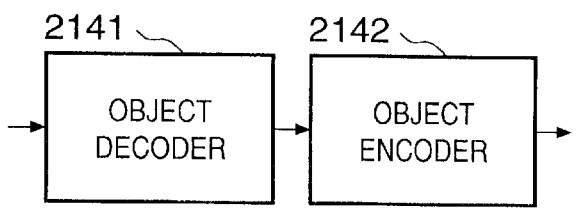
FIG. 54 is a block diagram showing the construction of a coding length regulator.

FIG. 54 is a block diagram showing the construction of the coding length regulator 2134. An object decoder 2141 decodes input video code data, and an object encoder 2142 encodes the decoded data using quantization coefficients greater than those in the initial encoding. That is, the bit rate can be reduced by re-encoding the objects of the image in FIG. 46A by rough quantization.

The selector 2135 switches a data path such that the combinations of the objects 2304 and 2305, the objects 2306 and 2307 and the objects 2308 and 2309 are inputted the integration processor 2136, under the control of the profile controller 2130.

The detailed construction of the integration processor 2136 is the same as that of the object integrator 1123 of the seventh embodiment in FIG. 34. Accordingly, explanations of the construction and processing of the integration processor 2136 will be omitted.

The code data on synthesized color image information and code data on mask information are inputted via a selector 2137 into the multiplexer 2114, and are multiplexed to code data of one object. The result of the system code synthesizer 2131, the header generated by the header processor 2132, and code data corresponding to the header are sequentially inputted via the selector 2137 into the multiplexer 2114, and multiplexed and outputted.

Figure 57:
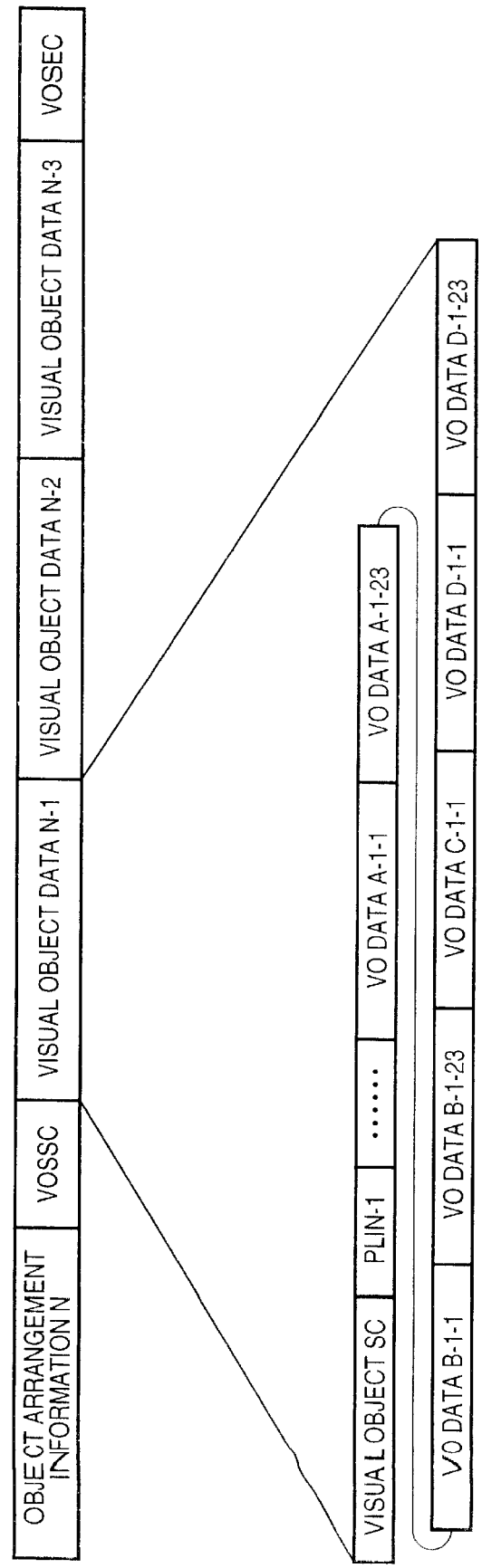
FIG. 57 is an example of code data of a synthesized image.

FIG. 57 shows the data structure of code data outputted from the image editing unit 2208 of the eleventh embodiment. In FIG. 57, in the video object data, the newly-set PLI code (PLIN-1 in FIG. 57) is provided at the head. Then the VO data A-1-1 corresponding to the background object 2300, and the VO data A-1-23 corresponding to the object synthesized from the objects 2302 and 2304 follow. Further, the VO data B-1-1 corresponding to the background object 2301, the VO data B-1-23 corresponding to the object synthesized from the objects 2306 and 2307, the VO data C-1-1 corresponding to the object 2302, the VO data D-1-1 corresponding to the background object 2303, and the VO data D-1-23 corresponding to the object synthesized from the objects 2308 and 2309 follow. That is, seven video objects exist in one Visual Object.

The code data obtained as above is stored into the storage device 2209, or decoded by the decoder 2210 and displayed as an image as shown in FIG. 48 on the display unit 2211.

As described above, according to the eleventh embodiment, when code data of different profiles and levels are synthesized, profile and level are re-defined, and further, the number of objects and the bit rate can be regulated. Thus, code data of profile and level desired by the user can be obtained.

Further, respective objects within an image can be arbitrarily synthesized by integrating objects based on the relation among the objects (nodes) described in the system code. That is, a synthesizing procedure closer to a user's intuitive synthesizing procedure can be realized.

Modification of Eleventh Embodiment

Figure 55:
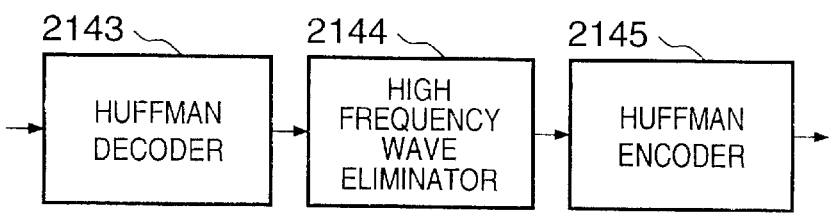
FIGS. 55 and 56 are block diagrams showing the constructions of the code length regulator according to modifications of the eleventh embodiment.

FIG. 55 is a block diagram showing a modified construction of the code length regulator 2134 according to the eleventh embodiment. If input video code data has been motion compensated, a Huffman decoder 2143 decodes the quantization DCT coefficients. The Huffman decoder 2143 inputs the obtained quantization DCT coefficients into a high frequency eliminator 2144, to eliminate high frequency components by replacing the high frequency components with "0". Then, a Huffman encoder 2143 encodes the output from the high frequency eliminator 2144. That is, the code length can be reduced by eliminating high frequency components of the object and re-encoding the data.

Figure 56:
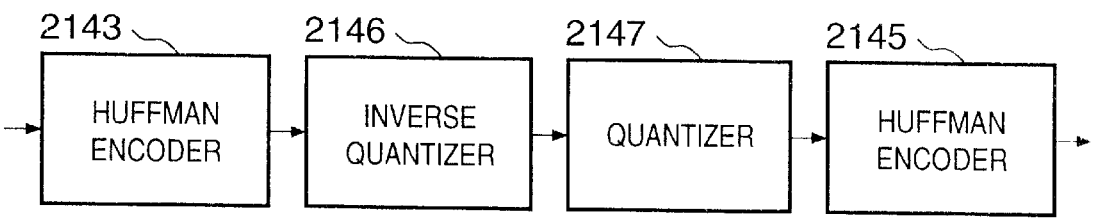

FIG. 56 is a block diagram showing another modified construction of the code length regulator 2134. If input video code data has been motion compensated, the Huffman decoder 2143 decodes the quantization DCT coefficients. Then, an inverse quantizer 2146 performs inverse quantization on the obtained quantization DCT coefficients, then a quantizer 2147 quantizes the obtained DCT coefficients using quantization coefficients greater than those used in the initial coding. Then the Huffman encoder 2145 encodes the data. That is, the code length can be reduced by decoding code data of a motion compensated object and re-encoding the data with rough quantization.

Note that in the eleventh embodiment, objects to be integrated may be selected using information unique to the respective objects, described independently of the user data or code data, in addition to the relation among the objects indicated by nodes. That is, objects having similar attributes ("people", "profession" and the like) may be integrated. Further, the objects 2307 and 2306 may be integrated based on the attributes indicating actions of "people" objects such as "giving an injection" and "taking an injection" as selection conditions.

Further, objects to be integrated may be selected by the combination of plural conditions such as object size, code length, location relation and user's instruction.

Further, in the eleventh embodiment, objects are integrated based on the relation among the objects (nodes) described in the system code, however, the number of object may be reduced by deleting objects selected based on the nodes. In this case, the bit rate can be reduced at the same time.

Note that the arrangement of the system code memories 2101 to 2104 and the video code memories 2105 to 2108 is not limited to that in FIG. 47, but more code memories may be provided or one memory may be divided into a plurality of areas. Further, a storage medium such as a magnetic disk may be employed.

As described above, according to the tenth and eleventh embodiments, one code data based on a predetermined standard can be obtained by synthesizing a plurality of code data, encoded for a plurality of image information (objects). Further, the synthesized code data may de decoded by a decoder of arbitrary coding specifications. Further, the number of objects and the code length of the code data can be regulated.

Further, in the above-described respective embodiments, the object 0 is background, however, the object 0 is not limited to the background but may be a moving image of a general object or the like.

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

The present invention is not limited to the above embodiments and various changes and modifications can be made within the spirit and scope of the present invention. Therefore, to appraise the public of the scope of the present invention, the following claims are made.

What is claimed is:

1. A data processing apparatus having decoding means for decoding code encoded in image object units, said apparatus comprising:

detection means for detecting a number of objects included in input code and a number of objects decodable by said decoding means; and control means for controlling the number of objects of the input code, based on the number of objects and the number of decodable objects detected by said detection means.

2. The apparatus according to claim 1, wherein if said number of objects is greater than said number of decodable objects, said control means reduces the number of objects included in said code to said number of decodable objects.

3. The apparatus according to claim 1, further comprising:

extraction means for extracting location information of the objects included in said code; and combining means for combining code of a plurality of objects, based on an instruction from said control means and the location information extracted by said extraction means.

4. The apparatus according to claim 3, wherein said combining means combines code of a plurality of objects away from each other by a distance therebetween, wherein said distance being shorter than other distances between objects calculated from said location information.

5. The apparatus according to claim 1, further comprising:

extraction means for extracting motion information indicative of motions of the objects included in said code; and combining means for combining a plurality of objects based on an instruction from said control means and the motion information extracted by said extraction means.

6. The apparatus according to claim 5, wherein said combining means combines code of a plurality of objects having the motion information similar to each other.

7. The apparatus according to claim 1, further comprising:

extraction means for extracting code lengths of the objects included in said code; and combining means for combining a plurality of objects based on an instruction from said control means and the code lengths extracted by said extraction means.

8. The apparatus according to claim 7, wherein said combining means combines code of a plurality of objects having code lengths shorter than other code lengths.

9. The apparatus according to claim 1, further comprising initialization means for determining a coding method for encoding the input code in frame units, and initializing said control means based on the result of determination.

10. The apparatus according to claim 9, wherein said initialization means determines whether said code is encoded based on interframe correlation or encoded based on intraframe information.

11. The apparatus according to claim 10, wherein if said code is encoded based on the intraframe information, said initialization means initializes said control means.

12. The apparatus according to claim 1, wherein said code is code of a still image.

13. The apparatus according to claim 1, wherein said code is code of a moving image.

14. A data processing method for decoding code encoded in image object units, said method comprising the steps of:

detecting the number of objects included in input code and the number of objects decodable by said means; and controlling the number of objects of the input code, based on the number of objects and the number of decodable objects detected at said detection step.

15. The method according to claim 14, wherein at said control step, if said number of objects is greater than said number of decodable objects, the number of objects included in said code is reduced to said number of decodable objects.

16. A computer program product comprising a computer readable medium having computer program code, for executing data processing which decodes code encoded in image object units, said product comprising:

detecting procedure code for detecting a number of objects included in input code and a number of decodable objects; and controlling procedure code for controlling the number of objects of the input code, based on the number of objects and the number of decodable objects detected in said detection procedure.

17. A data processing apparatus for processing a data array to reproduce an image with a plurality of coded image objects, said apparatus comprising:

detection means for detecting a number of image objects included in said data array; and control means for controlling the number of image objects included in said data array based on the number of image objects detected by said detection means.

18. The apparatus according to claim 17, wherein if said number of image objects is greater than a predetermined number, said control means reduces the number of image objects included in said data array.

19. The apparatus according to claim 18, wherein said predetermined number is a number of objects which can be processed by decoding means for decoding said data array.

20. The apparatus according to claim 18, wherein said control means reduces the number of image objects by deleting an image object.

21. The apparatus according to claim 20, wherein said control means obtains code lengths of the respective image objects in said data array, and deletes the image object based on the obtained code lengths.

22. The apparatus according to claim 21, wherein said control means deletes sequentially from an image object having the shortest code length.

23. The apparatus according to claim 20, wherein said control means obtains image sizes of the respective image objects in said data array, and deletes the image object based on the obtained image sizes.

24. The apparatus according to claim 23, wherein said control means deletes sequentially from an image object having the minimum size.

25. The apparatus according to claim 20, further comprising setting means for setting a priority order of the image objects in said data array, wherein said control means deletes the image object based on the priority order set by said setting means.

26. The apparatus according to claim 20, wherein said control means reduces the number of the image objects by integrating a plurality of image objects.

27. The apparatus according to claim 26, further comprising selection means for selecting a plurality of image objects included in said data array, wherein said control means integrates the plurality of image objects selected by said selection means.

28. The apparatus according to claim 27, wherein said control means comprises decoding means for decoding the plurality of image objects selected by said selection means, synthesizing means for synthesizing the plurality of image objects decoded by said decoding means, and coding means for encoding an image object synthesized by said synthesizing means, so as to integrate the plurality of image objects selected by said selection means.

29. The apparatus according to claim 28, wherein said control means further comprises counting means for counting code lengths of the plurality of image objects selected by said selection means, and wherein said coding means controls coding parameters based on the results of counting by said counting means.

30. The apparatus according to claim 27, wherein said control means comprises separation means for separating the plurality of image objects selected by said selection means into color information and mask information, color information synthesizing means for synthesizing the color information separated by said separation means, mask information synthesizing means for synthesizing the mask information separated by said separation means, and multiplexing means for multiplexing the color information synthesized by said color information synthesizing means and the mask information synthesized by said mask information synthesizing means.

31. The apparatus according to claim 27, wherein said selection means enables manual selection of a plurality of image objects.

32. The apparatus according to claim 27, wherein said selection means selects a plurality of image objects based on spatial location information of the respective image objects.

33. The apparatus according to claim 27, wherein said selection means selects a plurality of image objects, one of which including the other.

34. The apparatus according to claim 27, wherein said selection means selects a plurality of image objects away from each other by a distance less than a predetermined value.

35. The apparatus according to claim 27, wherein said selection means obtains code lengths of the respective image objects in said data array, and selects an image object based on the obtained code lengths.

36. The apparatus according to claim 35, wherein said selection means selects sequentially from an image object having the shortest code length.

37. The apparatus according to claim 27, wherein said selection means obtains image sizes of the respective image objects in said data array, and selects the image object based on the obtained image sizes.

38. The apparatus according to claim 37, wherein said selection means selects sequentially from an image object having the minimum image size.

39. The apparatus according to claim 37, further comprising setting means for setting a priority order of the image objects in said data array, wherein said selection means selects the image object based on the priority order set by said setting means.

40. The apparatus according to claim 17, wherein said data array is code data adapted to or based on the MPEG4 standard.

41. A data processing method for processing a data array to reproduce an image with a plurality of coded image objects, said method comprising the steps of:

detecting a number of image objects included in said data array; and controlling the number of image objects included in said data array based on the number of image objects detected at said detection step.

42. A computer program product comprising a computer readable medium having computer program code, for executing data processing which processes a data array to reproduce an image with a plurality of coded image objects, said product comprising:

detection procedure code for detecting a number of image objects included in said data array; and control procedure code for controlling the number of image objects included in said data array based on the number of image objects detected in said detection procedure.

* * * * *